United States Patent
Bertino

(10) Patent No.: US 10,667,453 B2
(45) Date of Patent: Jun. 2, 2020

(54) AGRICULTURAL MOTOR VEHICLE

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama-SP (BR)

( * ) Notice: Subject to any disclaimer, the term of this patent is extended or adjusted under 35 U.S.C. 154(b) by 282 days.

(21) Appl. No.: 15/902,484

(22) Filed: Feb. 22, 2018

(65) Prior Publication Data
US 2019/0254220 A1  Aug. 22, 2019

(51) Int. Cl.
*A01D 41/00* (2006.01)
*A01D 51/00* (2006.01)
(Continued)

(52) U.S. Cl.
CPC .......... *A01B 51/026* (2013.01); *A01F 12/446* (2013.01); *B62D 21/18* (2013.01);
(Continued)

(58) Field of Classification Search
CPC ..... A01B 51/026; A01B 59/03; A01B 69/008; A01D 34/04; A01D 61/008; A01D 41/00; A01D 41/12; A01D 41/127; A01D 41/1277; A01D 41/02; A01D 43/006; A01D 51/00; A01D 67/00; A01F 7/62; A01F 12/446;
(Continued)

(56) References Cited

U.S. PATENT DOCUMENTS

| 4,164,985 A * | 8/1979 | Bobard ................ A01B 59/043 180/53.1 |
| 4,266,625 A * | 5/1981 | Garner .................. B62D 11/04 172/272 |

(Continued)

FOREIGN PATENT DOCUMENTS

| BR | 7702491 | 1/1978 |
| BR | 7902586 | 7/1979 |
| BR | 0904513 | 4/2011 |

OTHER PUBLICATIONS

U.S. Appl. No. 15/855,441, filed Dec. 27, 2017, Bertino, et al., BR-102017005429.

*Primary Examiner* — Robert E Pezzuto
(74) *Attorney, Agent, or Firm* — B. Aaron Schulman, Esq.; Stites & Harbison, PLLC

(57) ABSTRACT

An agricultural motor vehicle able to connect to a variety of agricultural implements, and comprising a structural set having four parts: a lower chassis, an intermediate structure, a front complementary structure, and a rear complementary structure. The set is supported over a set of front traction wheels and a set of smaller rear wheels and also houses a vibrating sieve, above which is located a beating cylinder, the front edge of which connects to a concentrating guiding roller and a hinged inlet nozzle, as well as a cockpit and a grain dumper located over the set. Preceding the grain dumper is a clean grain collection gutter, a motor power set, a suction cleaning set, a clean grain elevator and lastly, a retractable side belt, whose lower edge is hinged at its midpoint and located on the upper edge of the intermediate structure.

18 Claims, 78 Drawing Sheets

(51) Int. Cl.
  *A01B 51/02* (2006.01)
  *A01F 12/44* (2006.01)
  *B62D 21/18* (2006.01)
  *A01D 61/02* (2006.01)
  *B07B 1/00* (2006.01)

(52) U.S. Cl.
  CPC .............. *A01D 61/02* (2013.01); *B07B 1/005* (2013.01); *B60G 2300/08* (2013.01)

(58) Field of Classification Search
  CPC ........ A01F 12/184; A01F 12/10; A01F 12/22; A01F 15/04; A01F 15/0875; A01G 18/70; B60G 9/022; B62D 11/04; B62D 21/18; B62D 21/186; B62D 33/0617; B62D 49/06; B62D 49/065; B62D 49/02; B62D 49/0607
  USPC ......... 56/10.1, 122; 172/114, 125, 245, 272, 172/292, 439; 180/6.48, 53.1, 234, 312, 180/314, 327; 280/408, 781, 834
  See application file for complete search history.

(56) References Cited

U.S. PATENT DOCUMENTS

| | | | | |
|---|---|---|---|---|
| 6,119,442 | A * | 9/2000 | Hale | A01D 41/1277 56/10.2 H |
| 8,534,412 | B2 * | 9/2013 | Huhn | B60G 9/022 180/312 |
| 9,949,433 | B2 * | 4/2018 | Li | A01D 34/04 |
| 10,343,188 | B2 * | 7/2019 | Ivanovich Orsyk | B07B 11/02 |
| 10,506,769 | B2 * | 12/2019 | Bertino | A01B 69/008 |

* cited by examiner

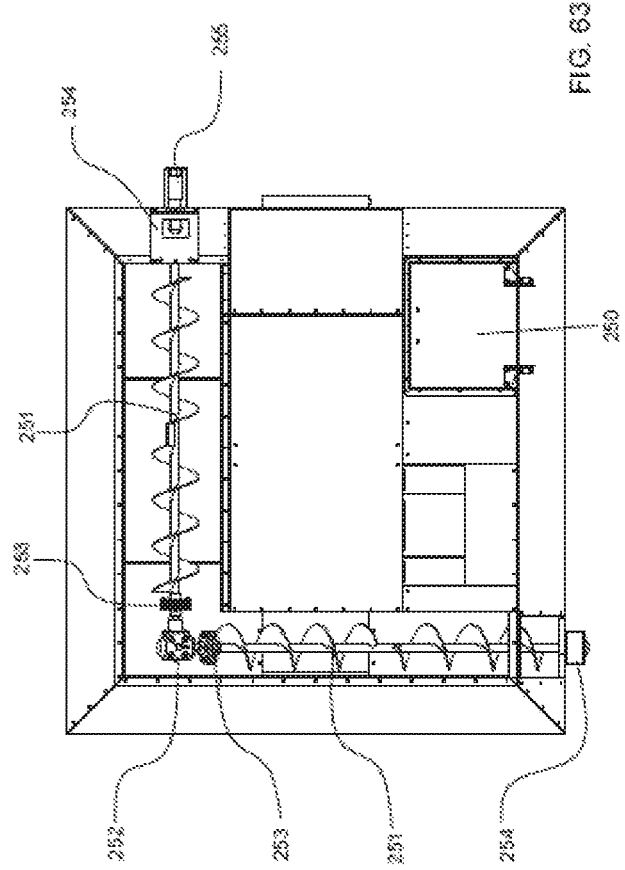

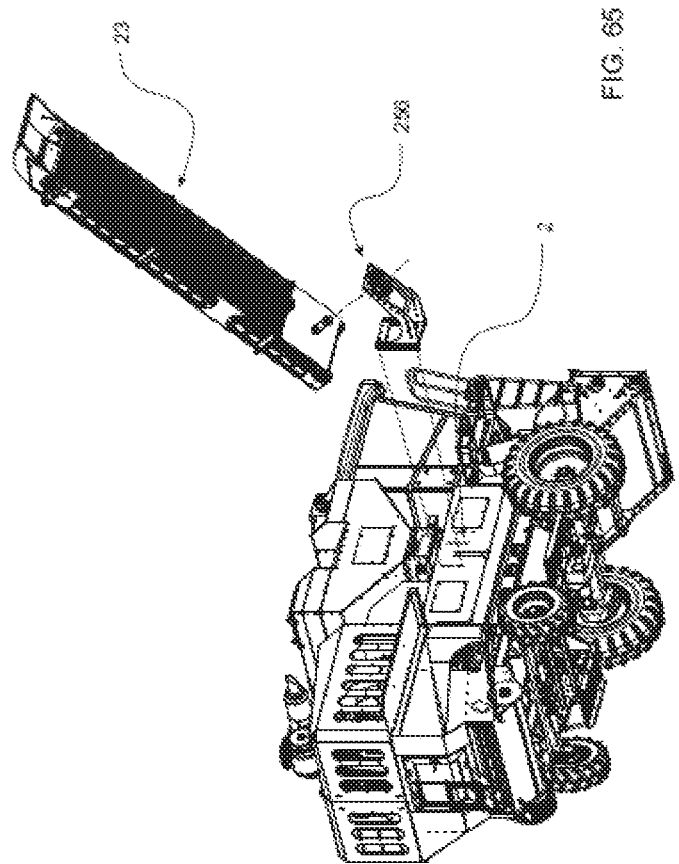

G-G

AGRICULTURAL MOTOR VEHICLE

FIELD OF THE INVENTION

The present Application relates generally to motor vehicles for use in agriculture, and more particularly to technical and functional improvements applied to an agricultural motor vehicle, designed to receive various implements coupled to its front part, allowing for the harvest, collection and processing of a variety of agricultural products.

STATE OF THE ART

There are currently a considerable variety of known motor vehicles especially designed for use in the agricultural field. Typically these are mobile machines based on a combustion engine, usually powered by diesel, often also presenting various means to enable their front region to receive different agricultural implements. Thus, the same motor vehicle is able to perform different processes for a wide range of crops, such as: harvest, collection, cleaning procedures for products and/or other services. Examples of such are taught by the documents: BR0904513, BR7902586 BR7702491-5 and BR1020170054292.

The existing motor vehicles offer means for coupling of different agricultural implements, and consequently the performance of a considerable variety of processes for different crops, however existing motor vehicles are usually complex machines intended for large producers, and consequently, this kind of equipment is not viable for some, especially small and medium-sized producers.

Another disadvantage of the machines as currently known is the lack of means to enable the motor vehicle itself to maintain its center of gravity when working on highly sloped terrains, i.e. the means to compensate for high slopes on the soil. There are many situations in which sowing is performed on highly sloped terrain and, in this situation, it would be ideal for the equipment to be kept level to avoid a lack of balance which could even result in the overturning or tumbling of the set. To address this issue, a system to compensate for the soil level would be required, whereby slopes would be neutralized by the system, keeping the motor vehicle always horizontally leveled. This system would allow the center of gravity of the machine to be kept constant independently of the degree of sloping of the terrain, making the use of the set far safer.

To solve the issues as noted above, the agricultural motor vehicle BR1020170054292 was developed and filed on Mar. 17, 2017. This motor vehicle is based on a combustion engine, but providing a simpler form for use of the produced force and, for that purpose, it is interconnected to hydraulic pumps which activate various hydraulic engines and cylinders, and thus all the sets integrated within the motor vehicle are activated. This allows the performance of different works, such as harvest, collection and processing of different kinds of grains and cereals. The document BR1020170054292 recites a compact chassis, able to gather together all of the functional parts of the set, not only those which are permanently located over the motor vehicle, but also those implements which are able to be interchanged to perform different functions/services, making the set ideal for use by large, medium-sized and small producers. On the other hand, document BR1020170054292 also teaches a grain dumping system for the collection of harvested grains. Said dumper is of the tilting type, i.e. when it reaches its full loading level it is unloaded by means of a sidewardly tilting movement performed by hydraulic cylinders, allowing it to tilt the load onto a desired place or into another compartment such as within a transport vehicle.

Despite the motor vehicle of document BR1020170054292 having solved various inconveniences in the state of the art, many improvements remain to be introduced, especially for the unloading system of the dumper, including significant changes to the structure and other added devices.

Improvements are also required for the wheels of the machine, to provide means to compensate for slopes on the ground and to allow the machine to always keep its center of gravity vertically oriented.

SUMMARY OF THE INVENTION

The present Application seeks to provide an agricultural motor vehicle having an even more compact structure than previously known motor vehicles. The motor vehicle is defined by four parts integrated with each other, a lower part constituting the chassis, wherein its lower side has the assembly details of the front and rear wheels, while on the upper side it receives an intermediate assembling structure of a vibrating sieve, above which the same structure has lengthwise embedded a beating cylinder, which is a rotating first cleaning set. A further two structures are also assembled on the edges of the intermediate structure, wherein the first one is a front complementary structure and the other a rear complementary structure, the former housing a concentrating roller and a front nozzle which is designed to receive different agricultural implements, such as collecting platforms, harvesters and others. The rear complementary structure houses an assembly for: a motor power unit, a suction second cleaning set, a crosswise transporter and a clean grain elevator leading to a grain dumper which, is settled over the intermediate structure which, finally, also constitutes an assembly point for a side retractable unloading beltangled for grains accumulated inside the grain dumper. The grain dumped in this case is fixed, however on its base there is a small belt which, combined with the other side retractable belt, allows the load to be quickly and efficiently transferred.

Another improvement introduced by the motor vehicle of the present Application is found in how the main chassis of the machine is supported over the front and rear wheels, with both front and rear wheels combined with a level-compensating pantographic system. This system is controlled by hydraulic activators guided by the operator. Therefore, the activators activate the pantographic parts, so that the chassis of the machine can be moved upwards and downwards at various levels, i.e. the system may independently rise and lower the front portion, the rear portion and the right and left sides. Using these resources, the operator may combine the movements to always keep the machine chassis horizontal, consequently maintaining the center of gravity of the set and compensating for the slopes of the land. This considerably increases the safety rate during operation of the machine.

Therefore, the mechanical improvements as introduced in the present Application result in functional and technical advantages for the motor vehicle. Firstly, the front nozzle has means for coupling different agricultural implements to the machine, especially collecting platforms and harvesting platforms as are normally used for a considerable variety of grain crops. Plants are collected with grains and guided to pass through the inside nozzle, wherein jaws and belts allow them to be guided crosswise to the concentrating guiding roller, which is assembled crosswise just behind the front nozzle. There is already a pre-cleaning stage performed during this passage, since the nozzle and the roller have resources for this purpose. The crosswise concentrating guiding roller concentrates the material and guides it to a lengthwise beating cylinder, wherein a cleaning stage is performed and completed with a vibrating belt and a suction cleaning set. Clean grain passes through the rear crosswise transporter and then on to the elevator, so that it may be released inside the grain dumper.

BRIEF DESCRIPTION OF THE DRAWINGS

FIGS. 56 to 63 are isometric views and enlarged isometric details showing crosswise details of the subsets forming the grain dumper.

FIGS. 64 to 74 are isometric views, partial section views and enlarged isometric details, detailing the retractable side belt.

DETAILED DESCRIPTION OF THE INVENTION

Figure 1:
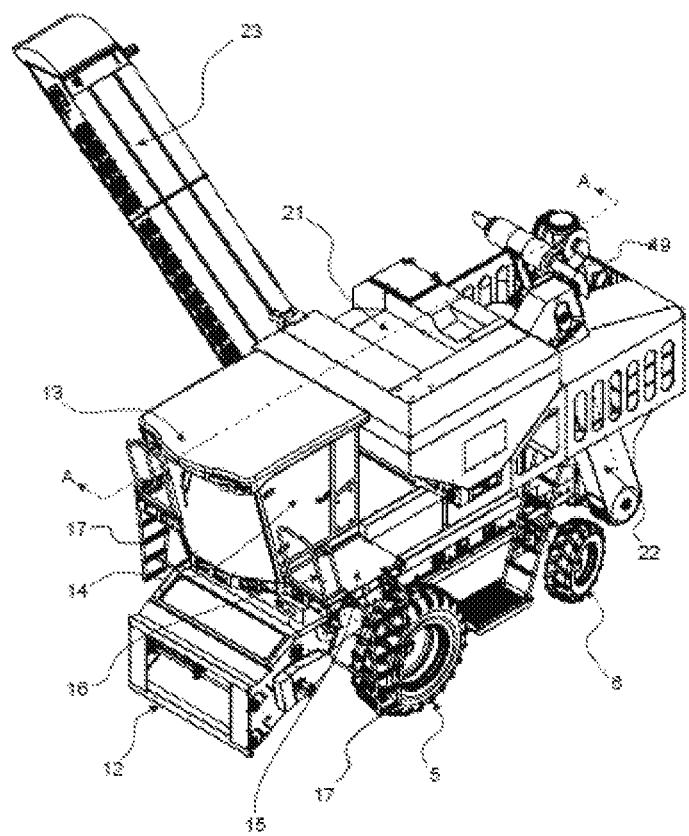
FIG. 1 is a perspective view at an upper front angle, showing the motor vehicle as fully assembled.
Figure 2:
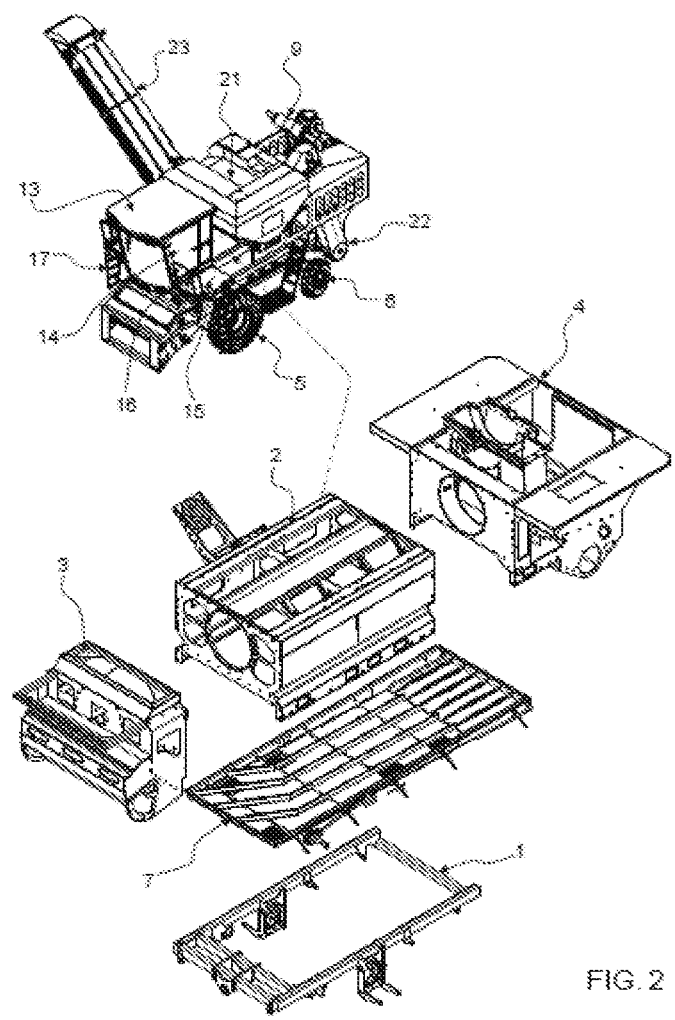
FIG. 2 shows isometric views of the assembled motor vehicle and an exploded detail, highlighting its structural part.
Figure 3:
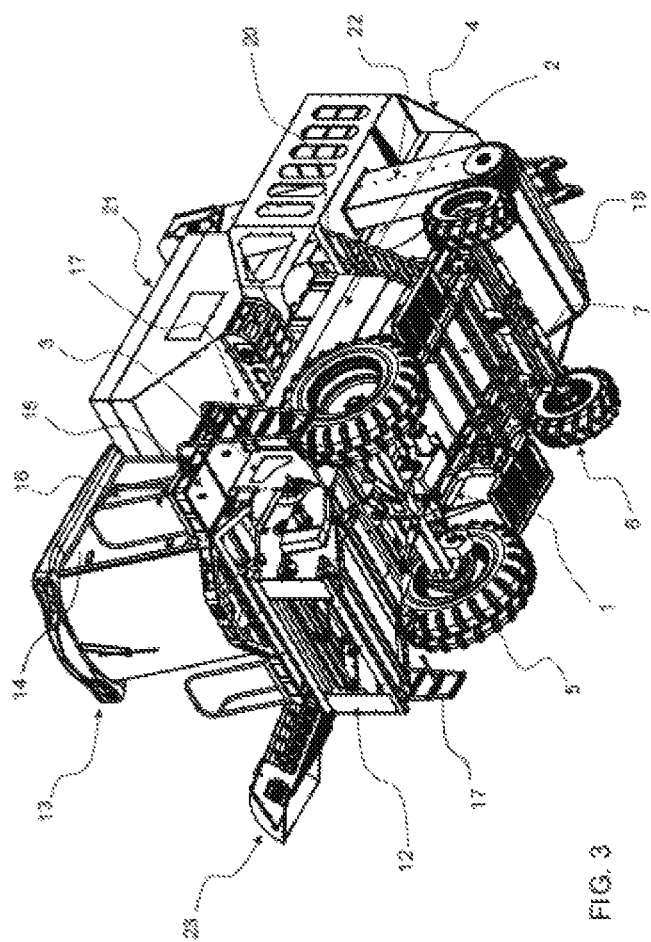
FIG. 3 shows an isometric view at a lower front angle of the assembled motor vehicle.
Figure 4:
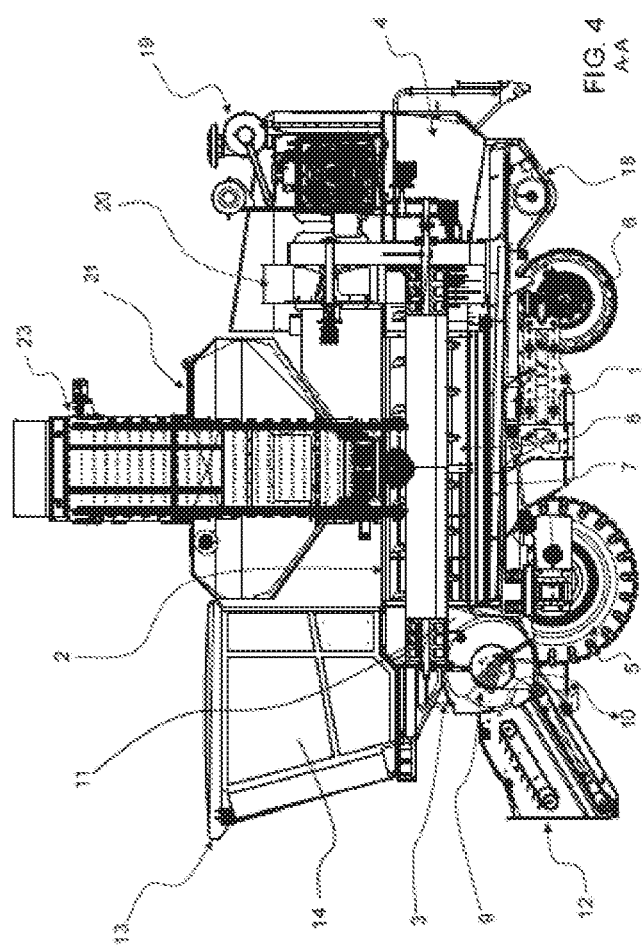
FIG. 4 is an "A-A" section view as shown by FIG. 1.

The invention will be described for the purposes of illustration only in connection with certain embodiments; however, it is to be understood that other objects and advantages of the present invention will be made apparent by the following description of the drawings according to the present Application. While a preferred embodiment is described, this is not intended to be limiting. Rather, the general principles set forth herein are considered to be merely illustrative of the scope of the present invention and it is to be further understood that numerous changes may be made without straying from the scope of the present invention.

FIGS. 1 to 4 illustrate the agricultural motor vehicle of the present Application, comprising a structural set in four portions combined with each other, the four portions being a lower chassis (1), over which a first intermediate structure (2) is assembled, having two lengthwise prolongations, defined as a front complementary structure (3) and a rear complementary structure (4).

There are two 4×2 wheel sets assembled underneath the chassis (1), the first being a front set of traction wheels (5), with larger wheels, and the second a rear set of wheels (6) with smaller wheels.

Assembled over the chassis (1) and under the intermediate structure (2) is a vibrating sieve (7) for cleaning collected grains, extending itself from the rear side of the frontal complementary structure (3) until the inner side of the rear complementary structure (4).

A beating cylinder (8) is assembled inside the intermediate structure (2), lengthwise above the vibrating sieve (7), the beating cylinder extending itself along nearly the entire length of the vibrating sieve (7) so that the material guided inside the beating cylinder (8) may be separated, retaining branches, leaves and debris larger than grains to be displaced towards the rear part of the machine, while smaller grains and particles, such as sand and earth, fall over the vibrating sieve (7). Subsequently, particles smaller than grains are released directly over the soil, while grains and other larger particles remain to be displaced towards the rear part of the machine.

A concentrating guiding roller (9) is assembled crosswise inside the front complementary structure (3), having a cylindrically shaped case with the front and rear sides open, forming a frontal inlet opening (10) for the material to be processed, and a rear outlet (11) which is in communication with the beating cylinder (8). Consequently, the concentrating guiding roller guides and displaces the material to be processed until it reaches the inner side of the beating cylinder (8).

A hinged inlet nozzle (12) is assembled as a set with the beating cylinder (8), the nozzle comprising the front part of the set, and presenting variable means to receive various agricultural implements as work fronts, generically known as platforms. Said work fronts/platforms may considerably vary depending on the function to be performed, for example they may be harvesting platforms, collecting platforms and/or other work fronts which may eventually be put into operation with the present motor vehicle. Said work fronts usually have resources for plants to be harvested and/or collected and guided to the inside of the machine, wherein they go through a cleaning process to separate the grains from undesired materials.

A cockpit (13) having a side door (14) is assembled over the front complementary structure (3), occupying approximately one third of the width of the set, the remaining width of the set comprising side walkways (15) with guardrail frames (16) and stairs (17).

A clean grain collection gutter (18) is assembled crosswise underneath the rear complementary structure (4), where it occupies the whole terminal crosswise extension of the vibrating sieve (7).

A motor power set (19) is assembled overtop of the rear complementary structure (4), and a second, suction cleaning set (20) is assembled in front of the motor power set (19).

A grain dumper (21) is assembled crosswise over the intermediate structure (2) in between the cockpit (13) and the suction cleaning set (20).

A slightly sloped clean grain elevator (22) is coupled at its upper edge to, and flowing into, the respective upper part of the grain dumper (21), the grain elevator having its lower edge interconnected to the clean grain collection gutter (18).

A retractable side belt (23), the lower edge of which is hinged at the midpoint as well as on the upper edge of the intermediate structure (2), is located on the right side of the motor vehicle.

Figure 5:
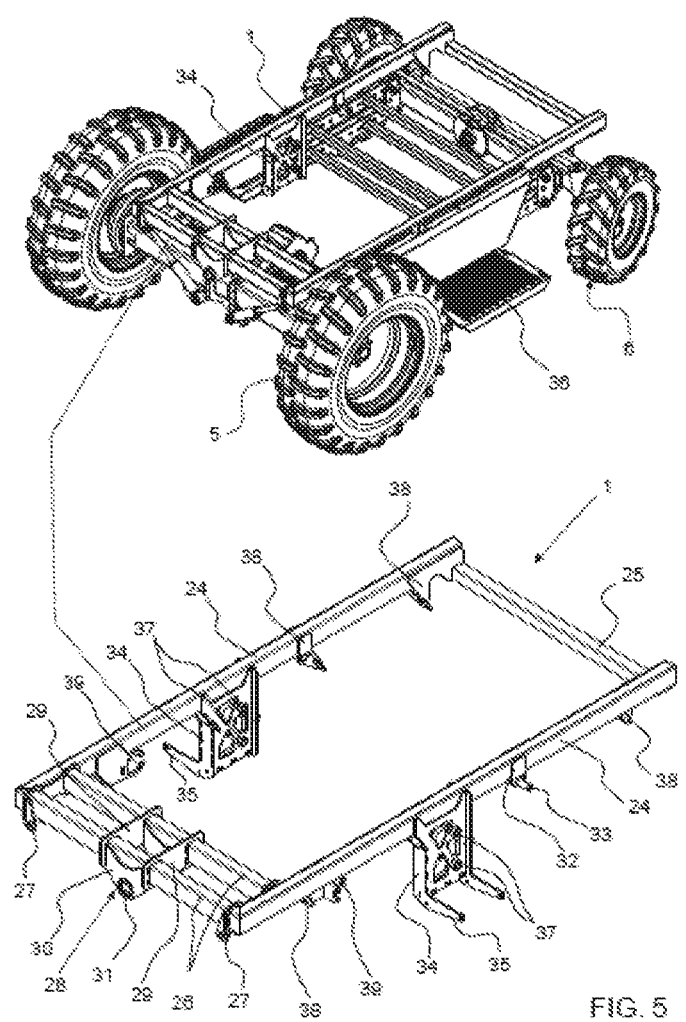
FIGS. 5 and 6 show isometric views of the wheels and the lower chassis of the motor vehicle.
Figure 6:
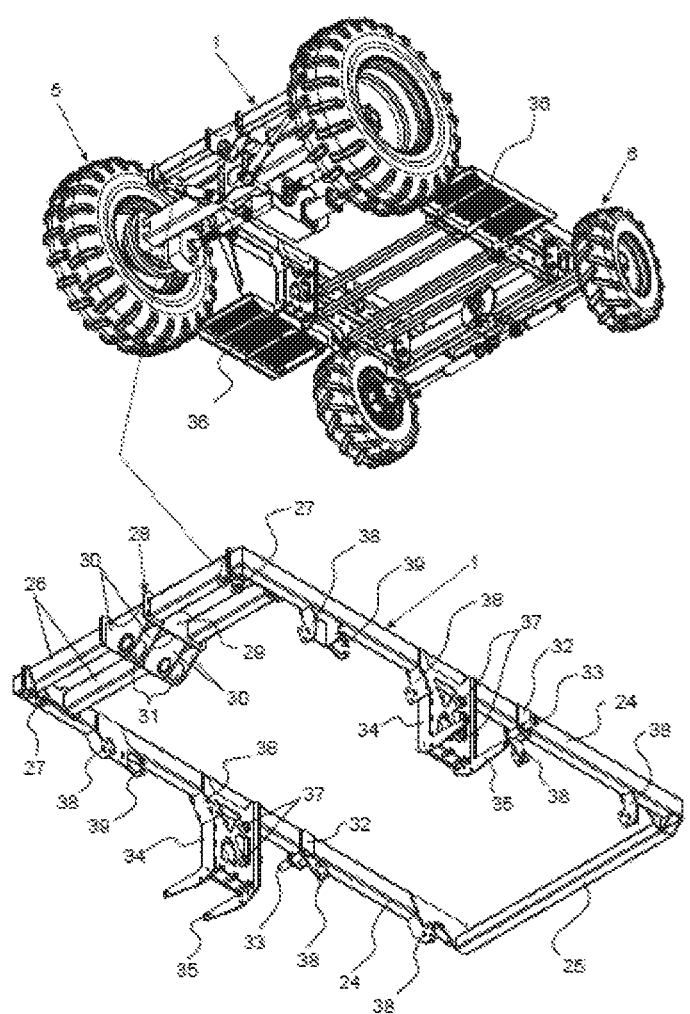

FIGS. 5 and 6 illustrate in detail the lower chassis (1), comprising a set of quadrangular tubes, including two side stringers (24), one on each side, interconnected by a rear beam (25) as well as by two front beams (26) which are parallel, very close to each other, and limited at their ends by supports in the form of lower parallel ears (27). The front beams (26) are interconnected in the middle by a support (28). The support is formed by two side rectangular plates (29), having triangular plates (30) located in between, which are spaced in parallel with their vertices turned downward and are pierced lengthwise by a bush (31) which, jointly with the lower ears (27), form hinged assembly means for the front set of traction wheels (5).

The side stringers (24) have side supports (32), one on each side, located on the first upper third, with each side support having a pin (33) extending crosswise outwardly.

The side stringers (24) also have other "L"-shaped supports (34) located in the middle, having one on each side, each comprising a fork-shaped branch (35) extending horizontally outwards and configuring support for a step (36) for access to the higher parts of the motor vehicle. Meanwhile, the other, vertical, branch of each L-shaped support has its upper edge fixed in the middle on the respective side stringer (24) of the chassis (1). Said vertical branch has bushes (37) which, jointly with the pins (33), configure means for hinged fixation of the rear set of wheels (6).

Figure 7:
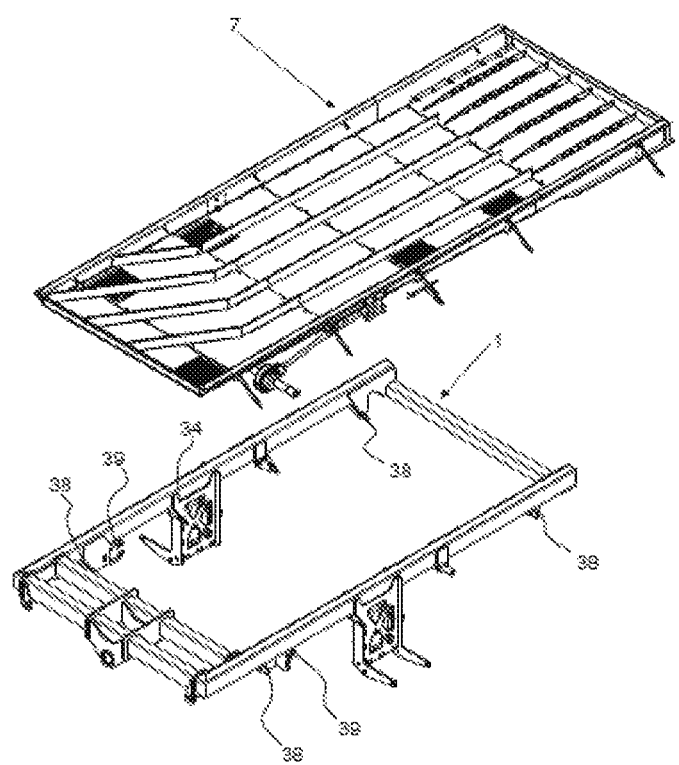
FIG. 7 shows an exploded isometric view, highlighting the chassis and the vibrating sieve which is assembled over it.

As illustrated in FIGS. 6 and 7, the side stringers (24) have further sloped supports (38), three on each side, and one additional sloped support on each side towards the front end of the side stringers which is integrated with a semicircular prolongation (39) that, combined with the other sloped supports (38), configures fixation points for the vibrating sieve (7).

Figure 8:
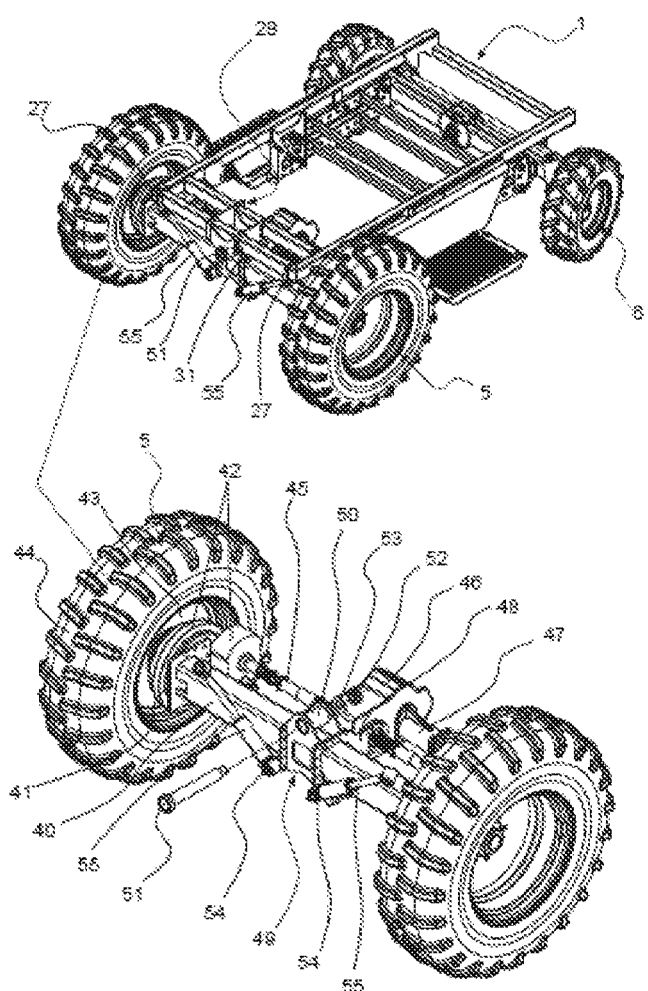
FIG. 8 shows an isometric view of the chassis with the wheels and an enlarged detail, highlighting the embodiment details of the front wheels.

FIG. 8 shows the front set of traction wheels (5), the set comprising a quadrangular tube axis (40) limited by square flanges (41) on each end to which first transmission boxes (42) are fixed. On one side the transmission boxes receive rims (43) and their respective pneumatics (44), while, on the other side, the transmission boxes are activated by crosswise cardan axes, (45), both cardan axes interconnected in the middle by another, second transmission box (46), this second transmission box (46) being connected on one side to a hydraulic activation engine (47). The second transmission box (46) is also fixed between two side plates (48) of a support (49) which is fixed in the middle of the quadrangular tube axis (40), the support also formed by two triangular plates interconnected on their upper side by a bush (50) which is aligned to the bushes (31) of the lower chassis (1) and pierced by a hinging pin (51) with a screw (52) and a washer (53) connected to the pin. Additionally, the lower part of the support (49) has hinging points (54) on each side for coupling the respective edges of sloped hydraulic activators (55), the opposed edges of which are equally hinged to the lower ears (27) of the chassis (1).

Figure 9:
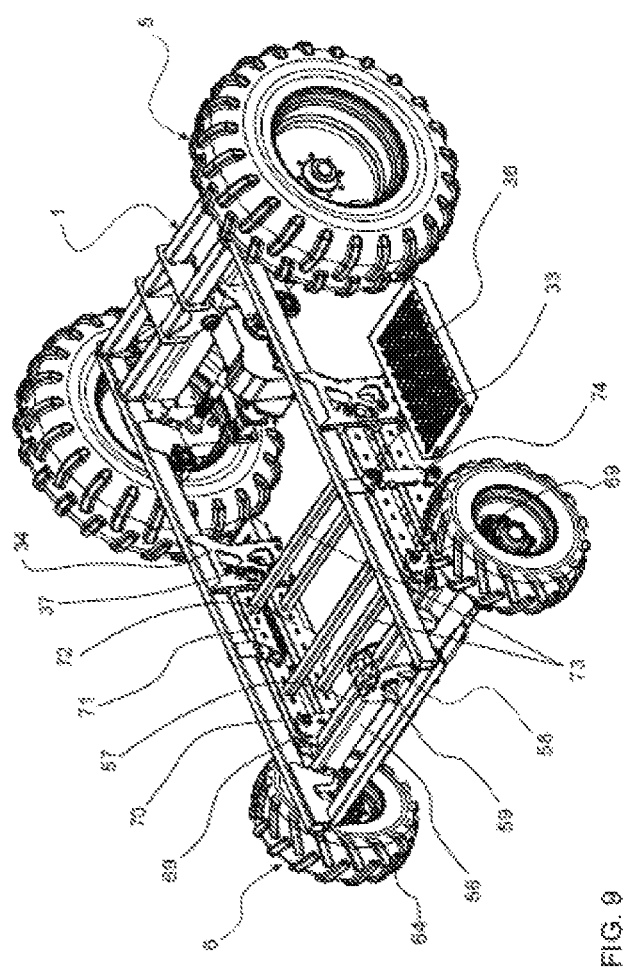
FIGS. 9 to 13 are isometric views and their enlarged details, highlighting the construction of the rear wheels.
Figure 10:
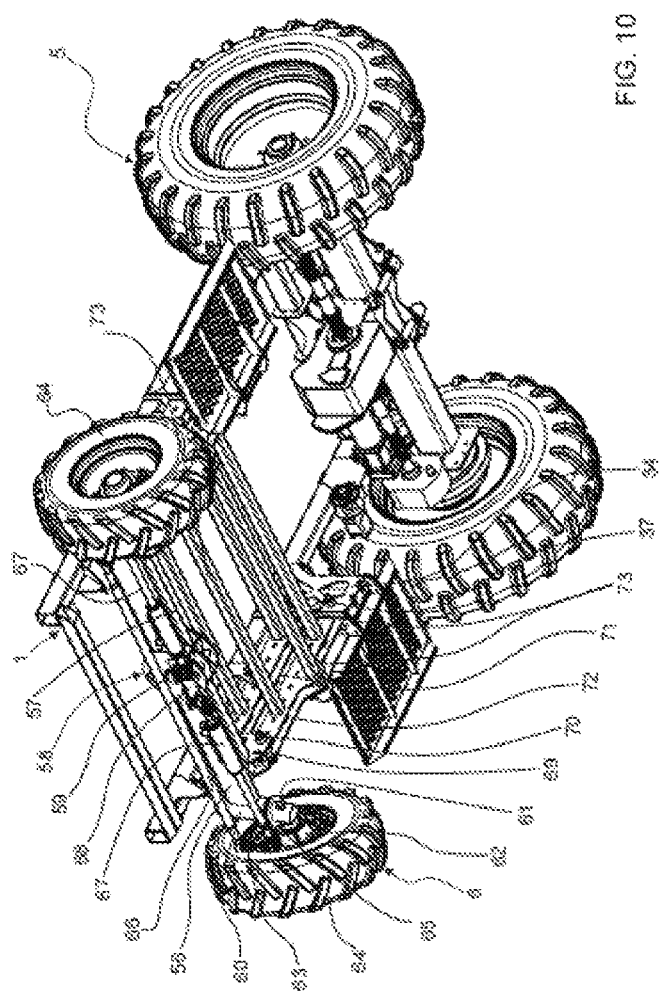
Figure 11:
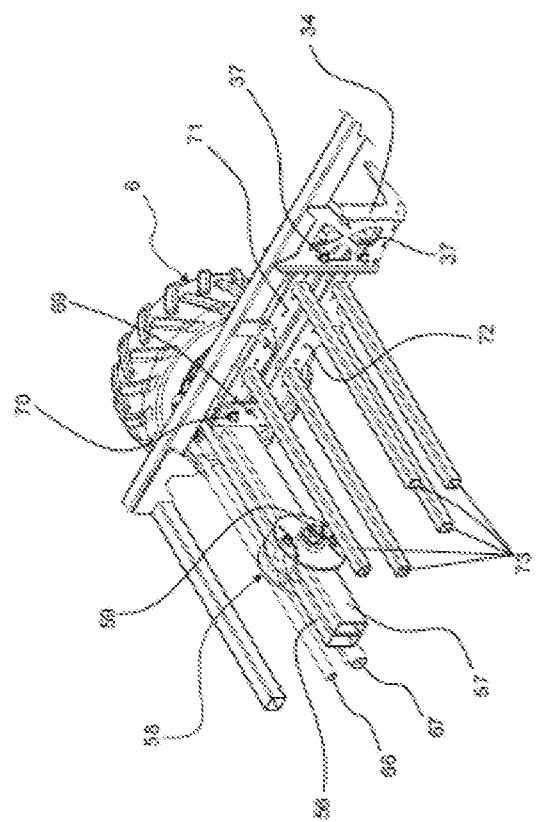
Figure 12:
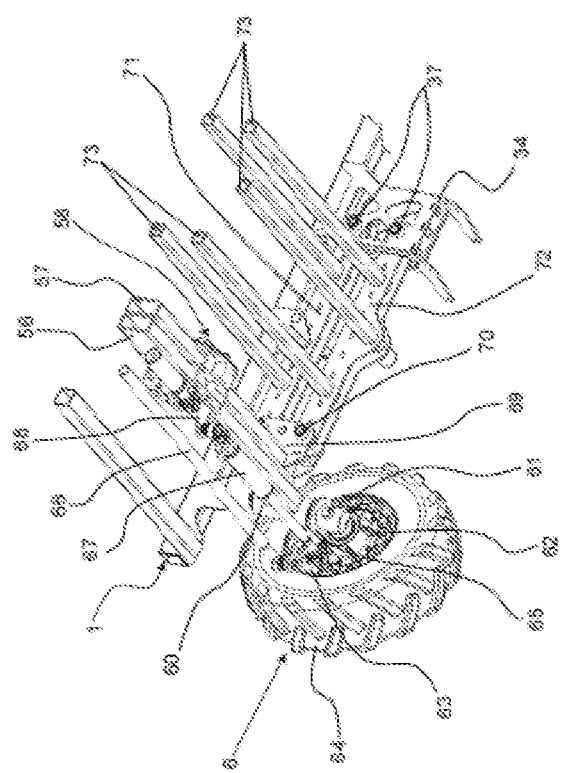

FIGS. 9 to 11 illustrate the rear set of wheels (6), comprising two crosswise axes, namely a rocker axis (56) and a floating axis (57), both comprising rectangular tubes interconnected at their midpoint by a support (58), wherein the rocker axis (56) is hinged by a pin (59) and its edges are also coupled to sets of "L"-shaped vertical axes (60) interconnected at their lower part to edges of horizontally outward turned axes (61) and also coupled to roller cases (62) of the rims (63) and respective pneumatics (64). The vertical axes (60) are interconnected to guiding means and, for that purpose, they have radial arms (65), each one with two hinging points for the respective terminals of stabilizing bars (66) and hydraulic activators (67), the opposed edges of which have their terminals equally hinged to a complement (68) of the support (58), thus forming the set responsible for the drivability of the motor engine.

Figure 13:
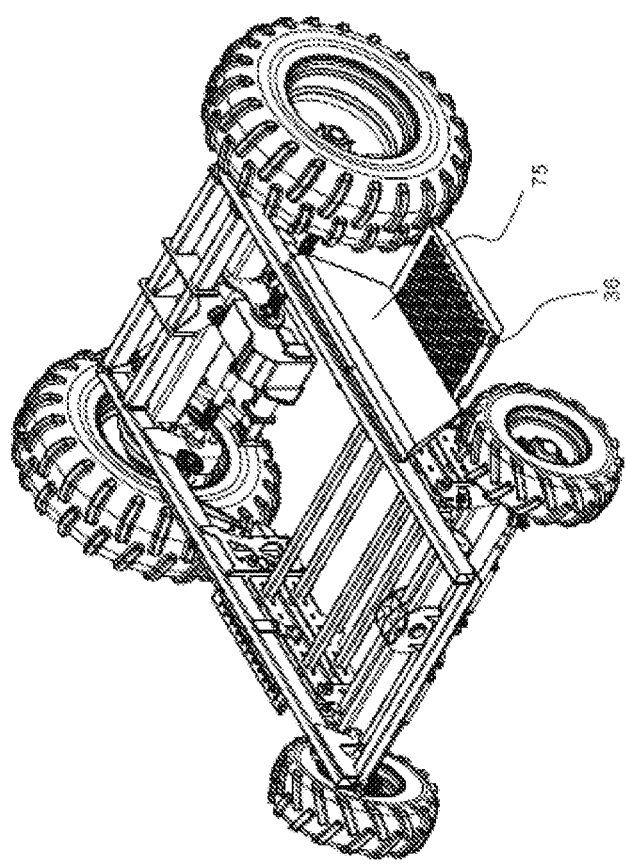

The floating axis (57) has its edges fixed to supports (69), wherein each support receives hinged (70) edges of pairs of upper (71) and lower (72) swinging arms, wherein each pair of swinging arms is formed by ruler-like parallel plates, the opposed edges of which are equally hinged to the bushes (37) of the "L"-shaped supports (34). Additionally, the upper and lower pairs of swinging arms (71) and (72) are interconnected on their inner side to the respective swinging arms on the opposite side by various tube beams (73), forming a pantographic suspension which also includes a side damper (74) on each side, the upper edges of which are hinged to the pins (33), while their lower edges are equally hinged outside and in the middle paths of the pairs of hinging arms (72). Additionally, as illustrated in FIG. 13, all the regions of moving parts of the side dampers (74) are covered by side caps (75) located above the steps (36).

Figure 14:
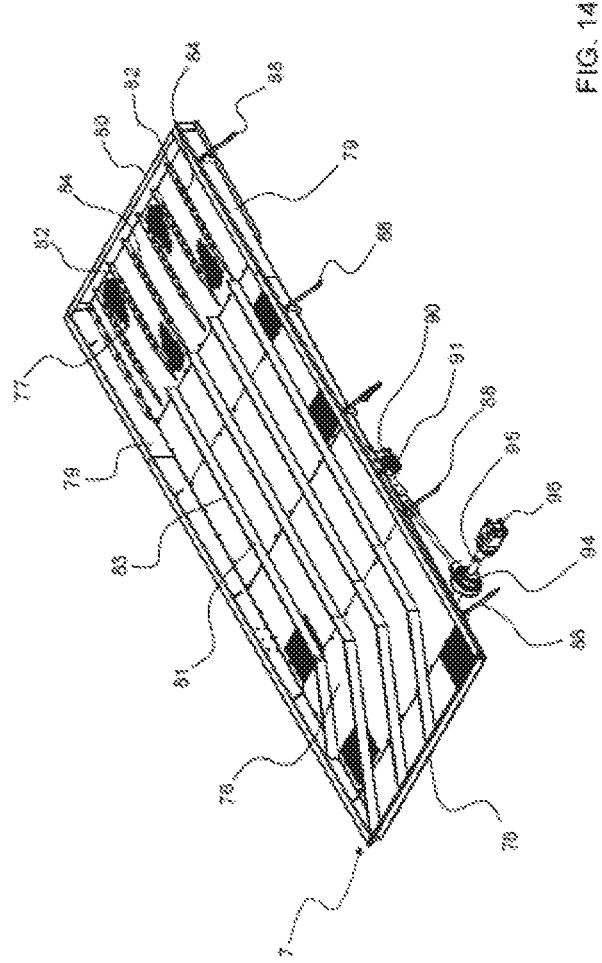
FIGS. 14 to 16 are isometric views and their enlarged details, highlighting the construction of the vibrating sieve.

FIG. 14 illustrates embodiment details of the vibrating sieve (7), comprising a shallow rectangular gutter shape, having its bottom part formed by perforated plates which are the sieves per se, with one longer sieve with smaller mesh (76) and a shorter outlet sieve with larger mesh (77), all surrounded by a front wall (78) and two side walls (79), the side walls interconnected by a rear beam (80). Also, over each of the sieves (76) and (77), corresponding parallel lengthwise guiding rulers (81) and (82) are assembled. The guiding rulers of the longer sieve (76) have upper indented edges (83) working as jaws to move branches and leaves towards the rear part of the machine, while the guiding rulers of the shorter outlet sieve (82) have side scales (84) to guide the flow of material, especially grains.

Figure 15:
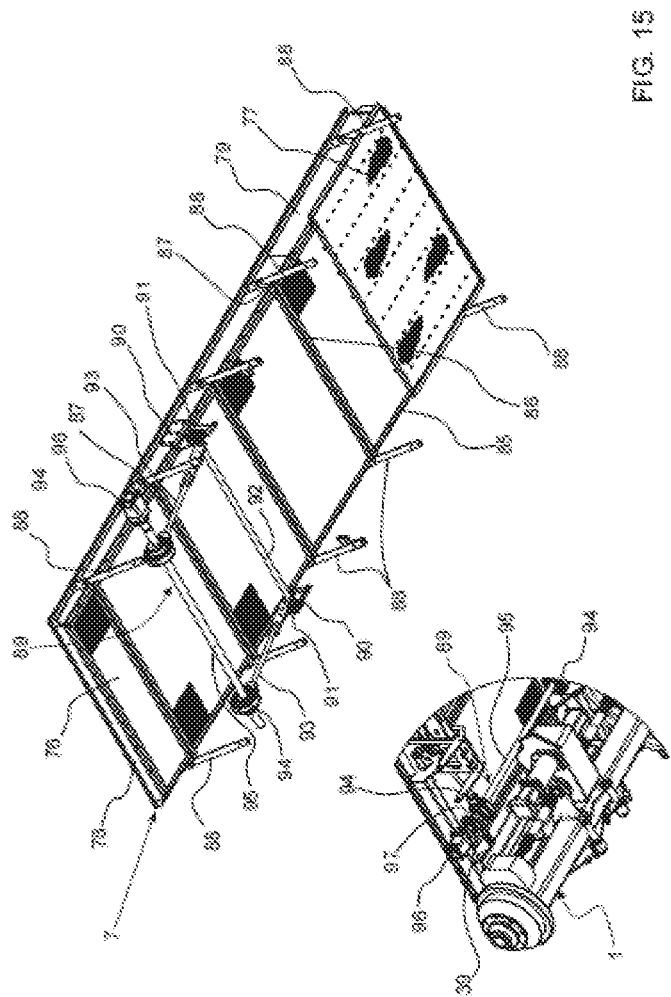
Figure 16:
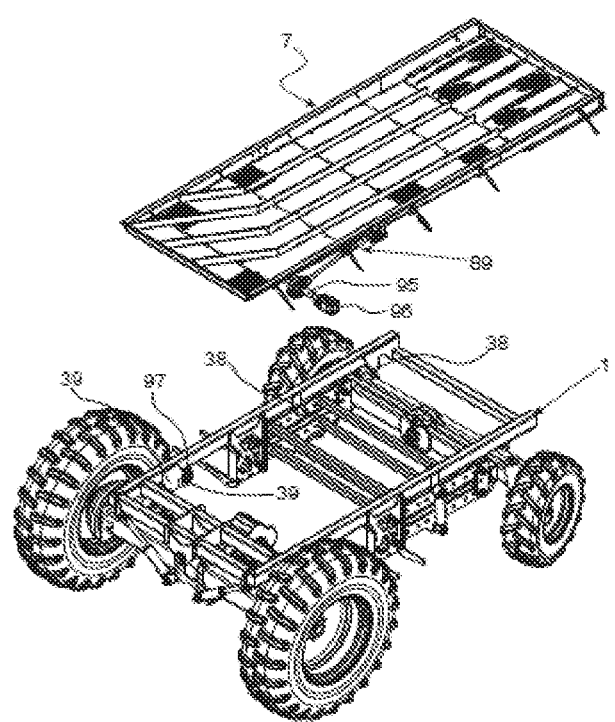

On the lower side of the vibrating sieve, as seen in FIGS. 15 and 16, the longer and shorter sieves (76) and (77) have a complementary structure in the form of a frame (85) with beams (86) adding fixing points (87) for various blade springs (88) sloped downwarsdly, the lower edges of which are coupled to the sloped supports (38) of the lower chassis (1). Consequently, the whole set is able to vibrate with movements frontwards and backwards, thanks to said blade springs (88), the movement caused by a vibrating set (89) assembled at the lower part of the vibrating sieve (7). The vibrating set has, for that purpose, side supports (90), one on each side, having their upper edges fixed to the external side of the side walls (79), while the lower edges of the side supports are provided with support bushings (91) for a swinging axis (92), which also has two parallel arms (93) one on each side and sloping to the front, both arms with their distal ends equally having eccentric bearings (94) pierced by an axis (95) which, besides having one of its edges coupled to a hydraulic engine (96), is supported over bearings (97) assembled on the semicircular prolongations (39) of the lower chassis (1). Thus, the hydraulic engine (96) activates said axis (95) which, on the other hand, activates the eccentric bearings (94) which, jointly with the parallel arms (93) send rotating movements in alternate straight movements which are applied to the set of the vibrating sieve (7). Consequently, the whole of the material over the vibrating sieve is moved to the rear, so as to perform a cleaning and separation stage of the material.

Figure 17:
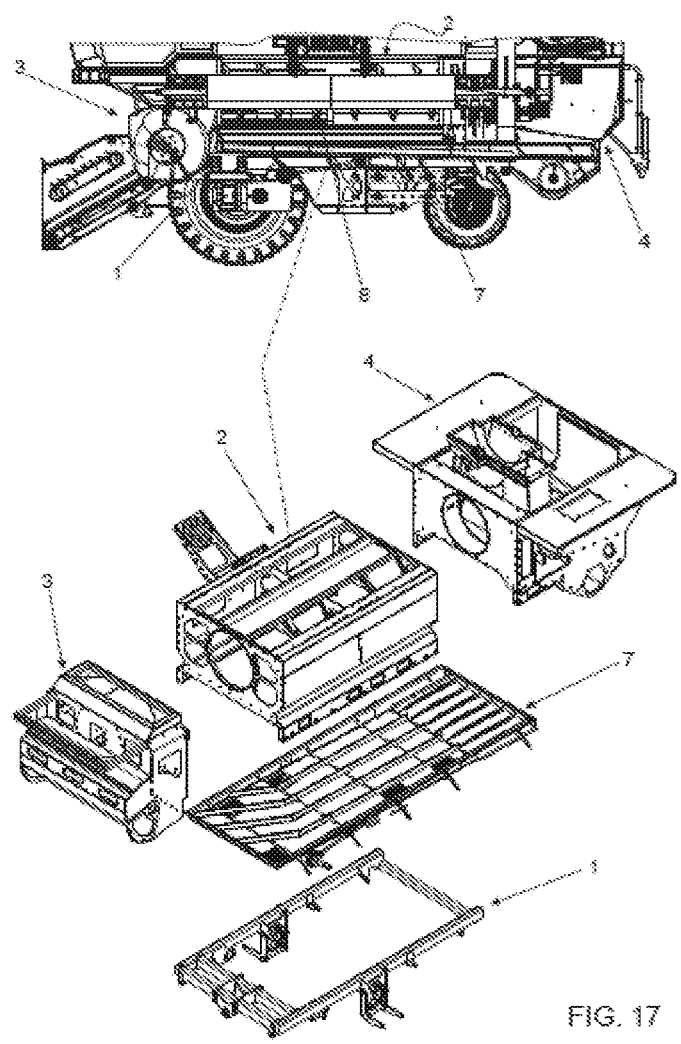
FIGS. 17 to 19 show a crosswise cut detail to illustrate the position of the intermediate structure, and also shows the intermediate structure in isolation under different angles.
Figure 18:
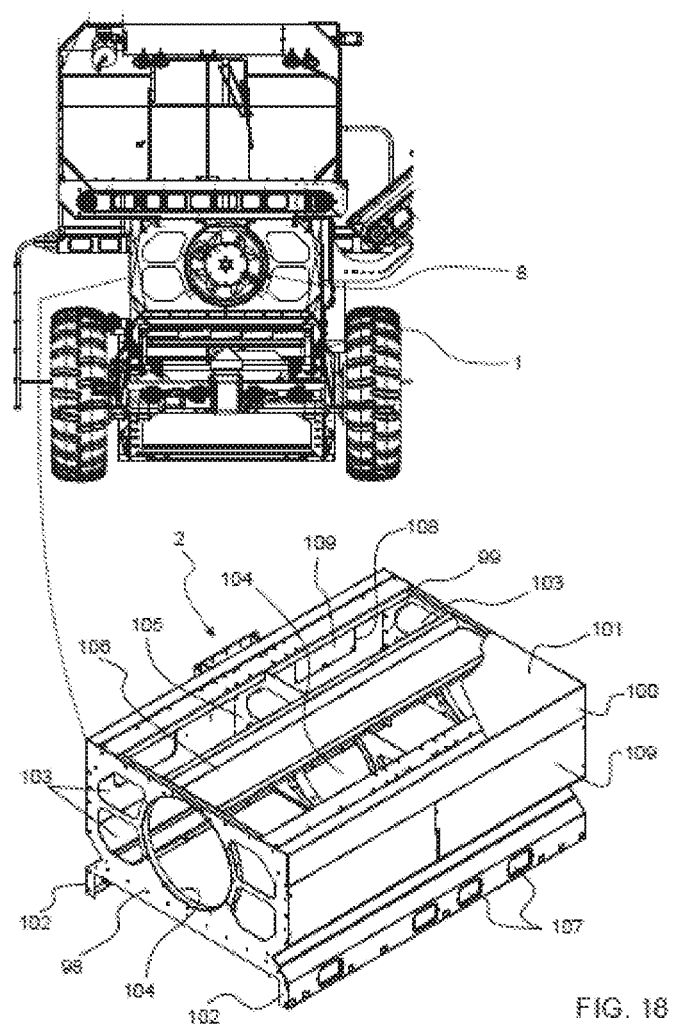
Figure 19:
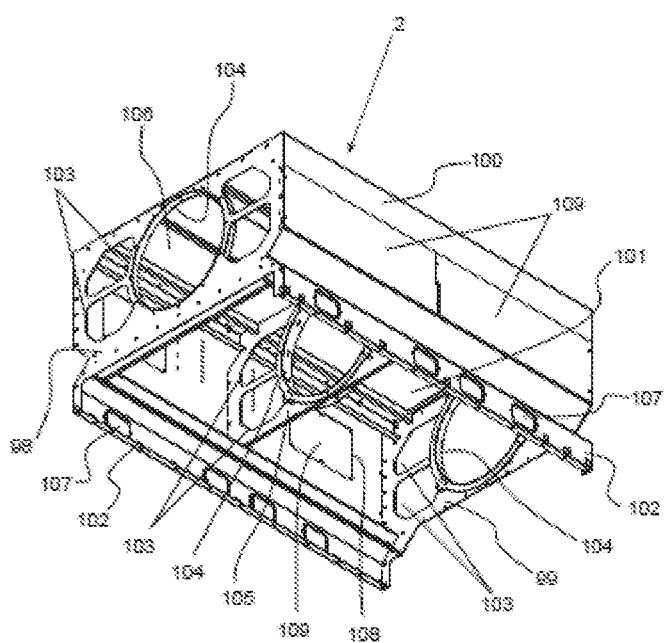

FIGS. 17 to 19 illustrate in detail the intermediate structure (2), comprising folded and welded plates in a parallelepipedally shaped structure, having a front vertical wall (98), a rear vertical wall (99) and two side vertical walls (100), and including an upper closing plate (101) formed by a single plate, while the lower side of the structure is fully open and the lower edges of the side walls form stringers (102) adjusted over the lower chassis (1), where they are fixed, so that the intermediate structure may also be fitted in between the front complementary structure (3) and the rear complementary structure (4). The front (98) and rear (99) walls each have cornered openings (103) and a circular central opening (104), wherein the same geometry is repeated identically on an intermediate wall (105), so that the three walls form a hollow hub, which, combined with an upper curved plate part (106), forms a lengthwise circular housing for assembly of the beating cylinder (8). The side walls (100) have a row of smaller lower openings (107) on the stringers (102) and other larger upper openings (108) with caps (109), appropriate for maintenance of the internal sets.

Figure 20:
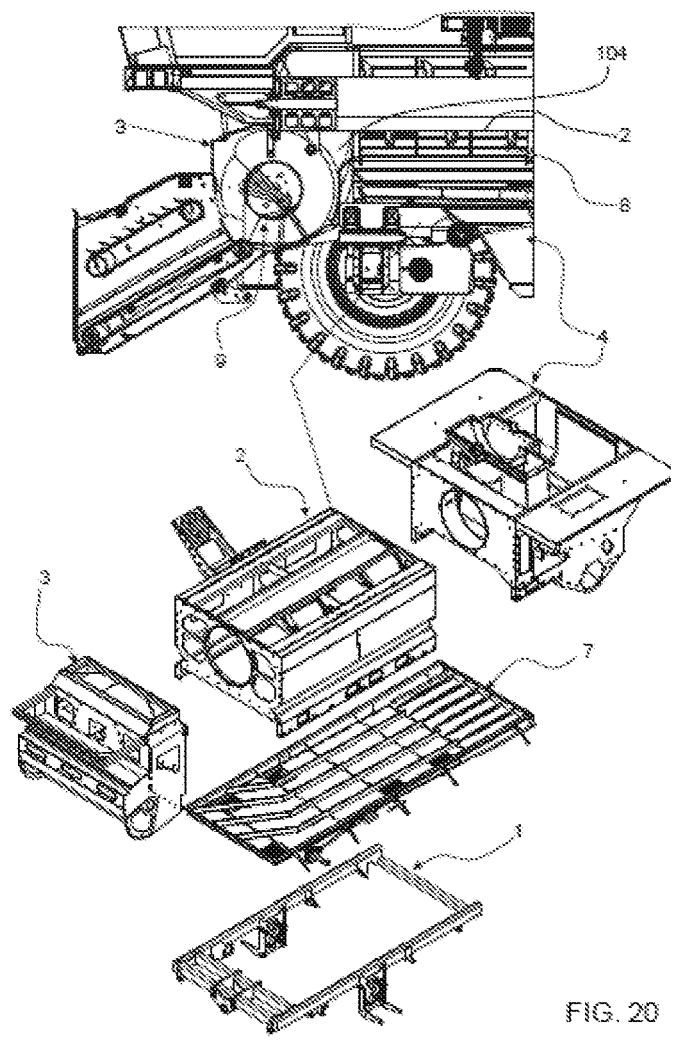
FIGS. 20 to 24 show enlarged details of section A-A, showing the front region of the machine and isometric views showing embodiment details of the front complementary structure.
Figure 21:
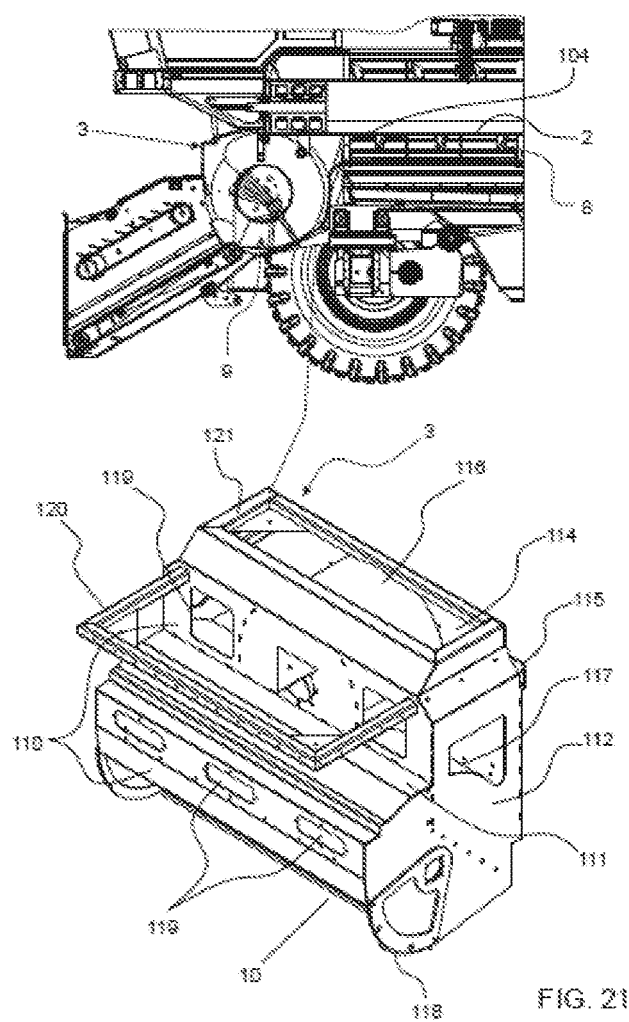
Figure 22:
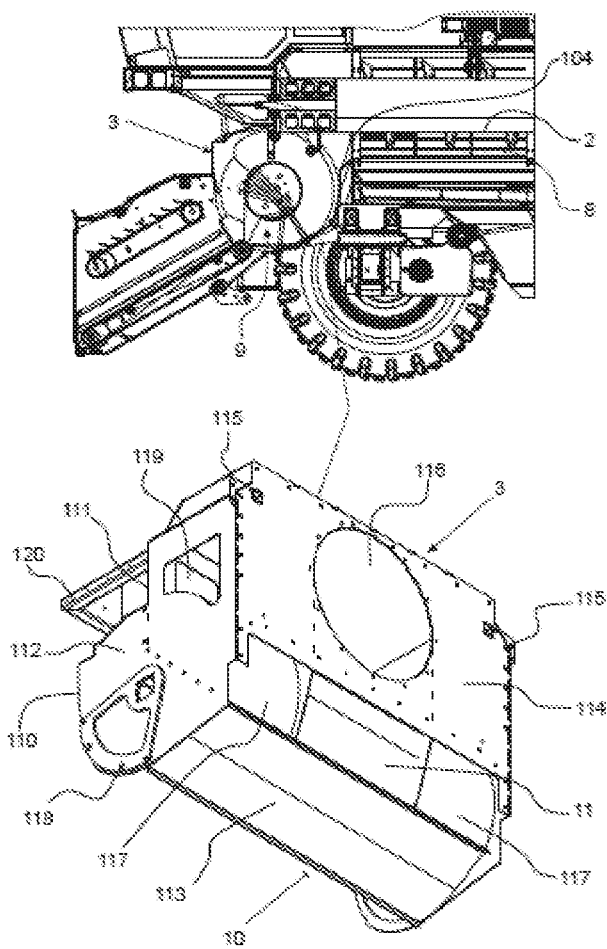

FIGS. 20 to 22 illustrate in detail the front complementary structure (3), comprising a box, having a front wall (110) on two vertical planes separated by an intermediate 90° horizontal step (111), two vertical side walls (112), a curved lower wall (113) and a vertical rear wall (114).

The rear wall (114) has side fixing flaps (115), and also houses the rear outlet (11), above which it has a circular opening (116), axially aligned to the circular central openings (104) of the intermediate structure (2) for assembly of the beating cylinder (8).

The lower wall (113) is slightly rounded and combines with other roundings (117) and (118) of the side walls (112) and a lower part of the front wall (110) to form the frontal inlet opening (10), such that, in that internal path, a somewhat circular housing for assembly of the concentrating guiding roller (9) is formed.

Figure 23:
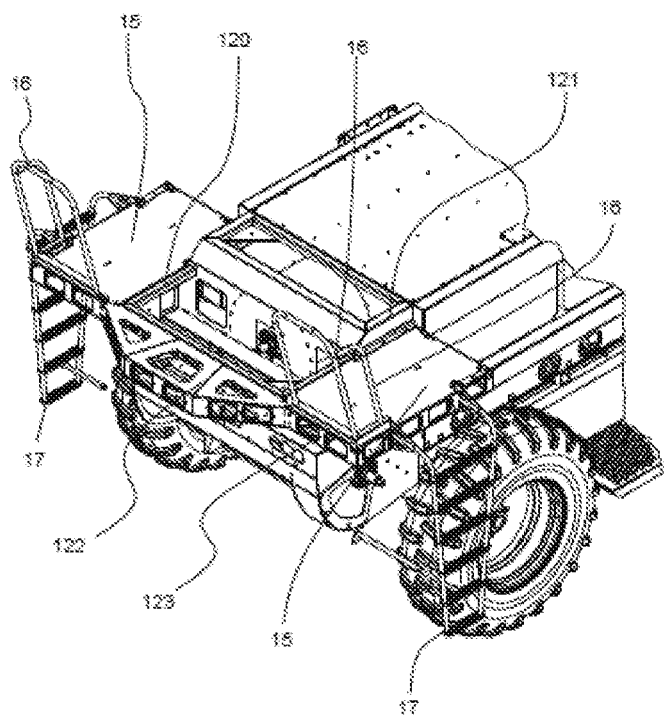
Figure 24:
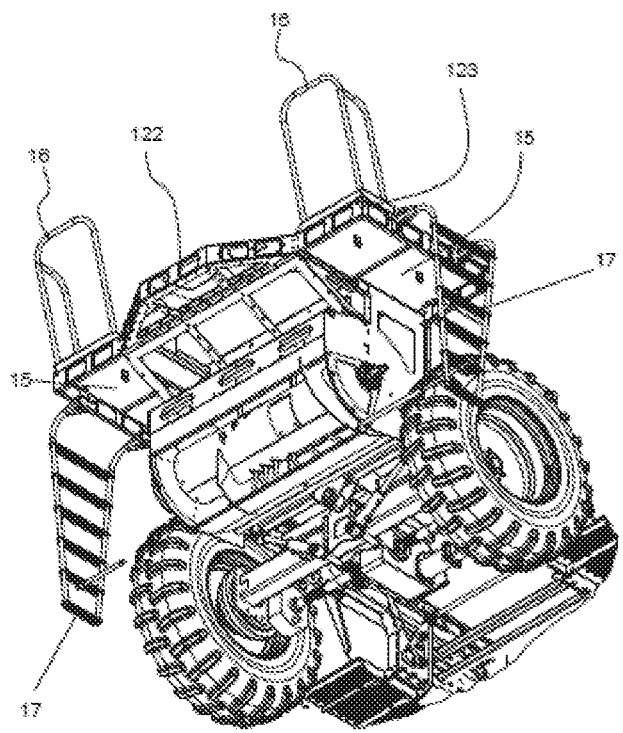
Figure 25:
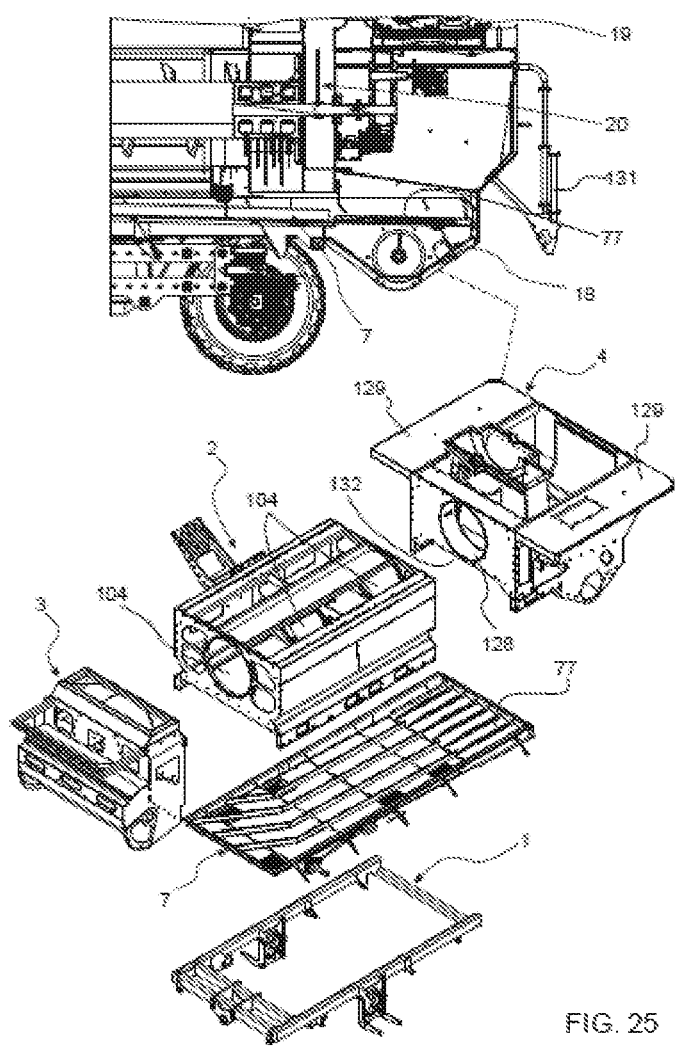
FIGS. 25 to 28 are enlarged details of section A-A, showing the rear region of the machine and isometric views showing embodiment details of the rear complementary structure.
Figure 26:
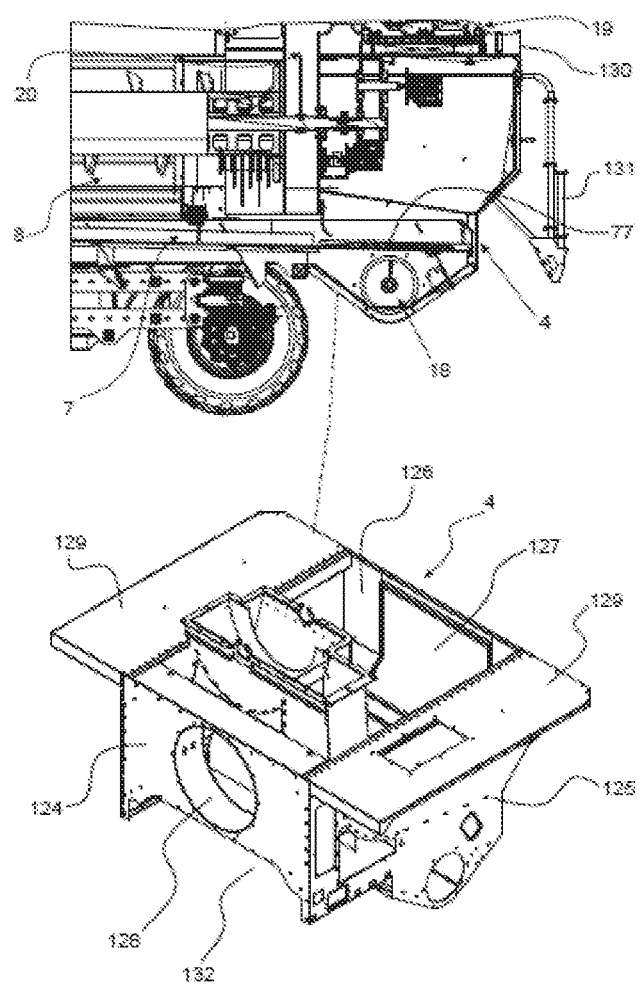
Figure 27:
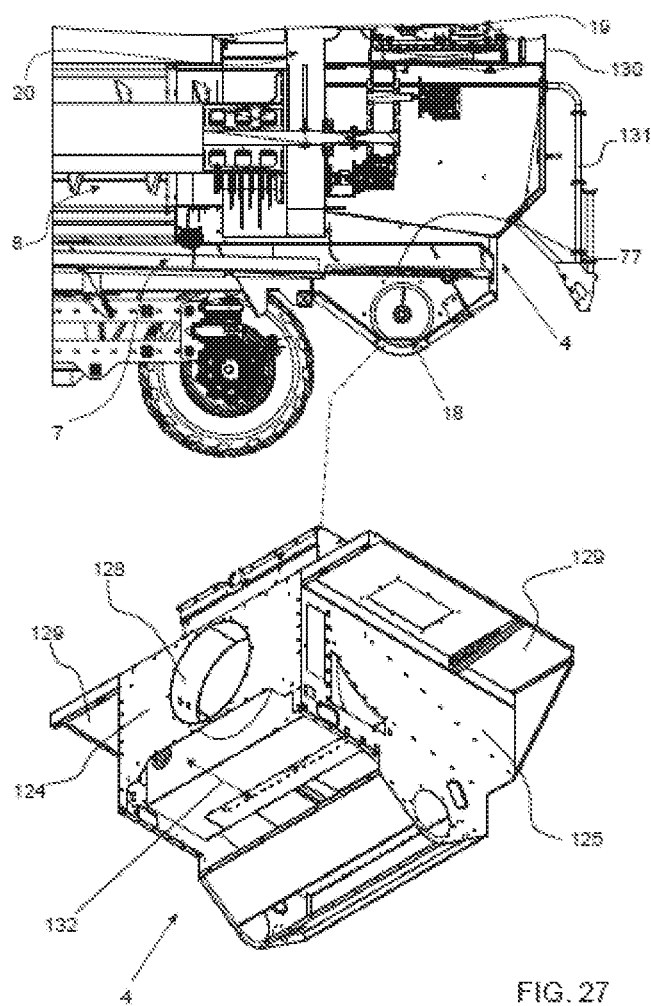
Figure 28:
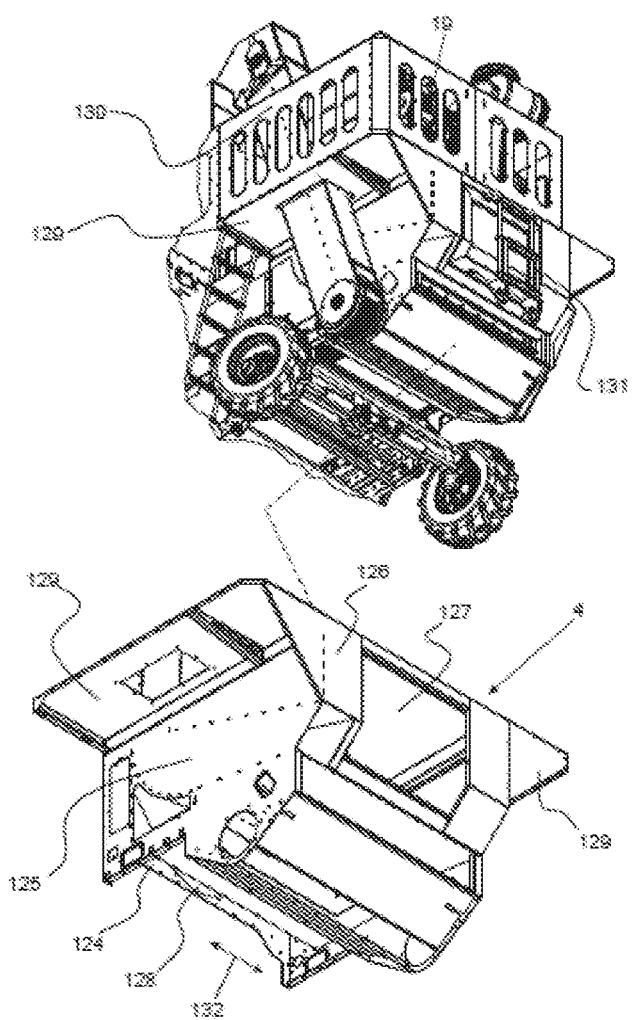
Figure 29:
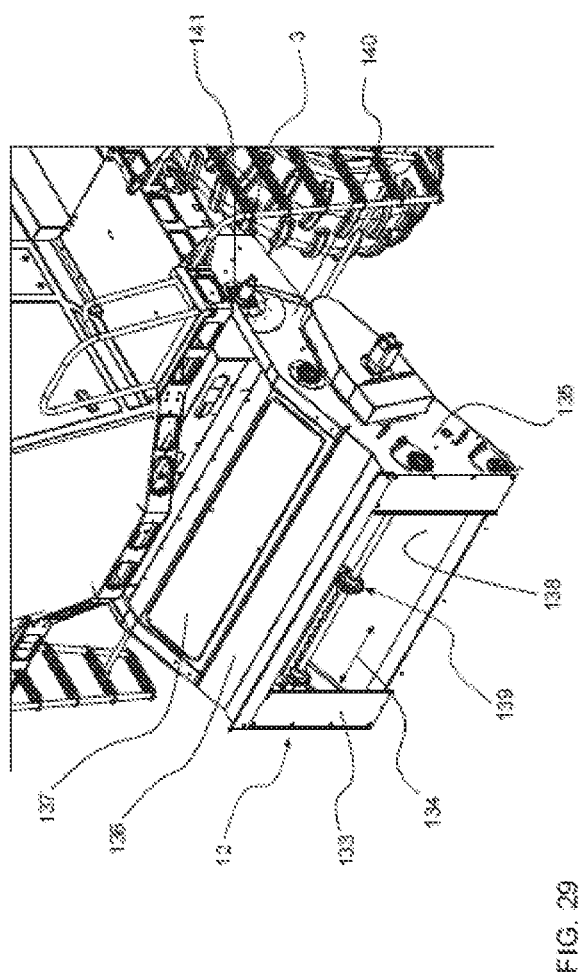
FIGS. 29 to 33 show enlarged isometric views of details and section A-A, showing the front region of the machine and details of the hinged inlet nozzle.
Figure 30:
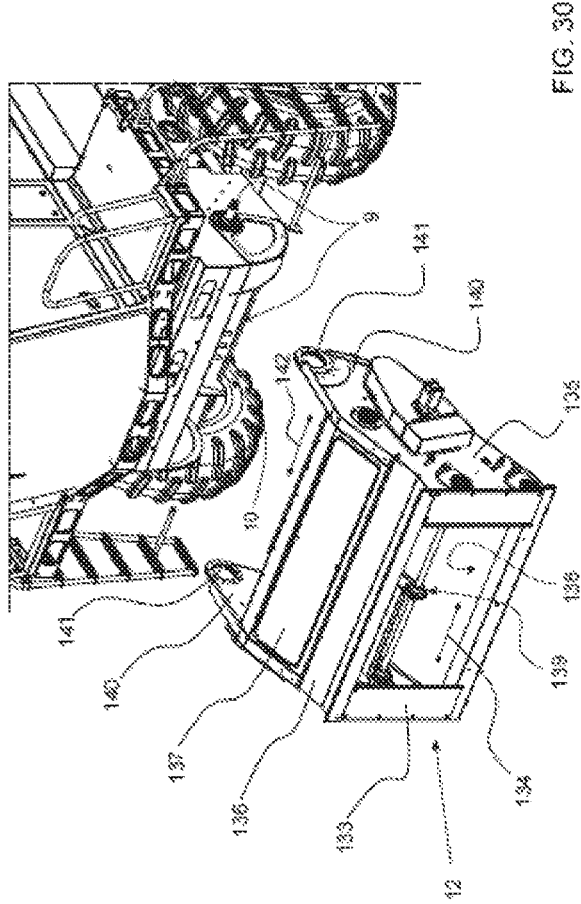

The front wall (110) also includes rectangular openings (119), and, above the intermediate 90° step (111), a lying "U"-shaped support (120) which, on the other hand, is horizontally connected to the upper part of the front wall in the form of a rectangular frame (121) so as to form a support cradle for a cockpit (13). The support cradle, as illustrated in FIGS. 23 and 24, receives a structural complement (122) advancing to the inside of the intermediate 90° step (111) as well as upon the same "U"-shaped support plane (120), the structural complement also expanding laterally, forming the support platform (123) for the cockpit (13), the side walkways (15) and the stairs (17).

FIGS. 25 to 28 illustrate in detail the rear complementary structure (4), comprising a box built of welded plates, forming a rear continuity of the intermediate structure (2). The rear complementary structure is formed by vertical walls, having a front wall (124), side walls (125) and a rear wall (126), between which an assembly compartment is formed for the motor power set (19) and for the suction cleaning set (20).

The rear wall (126) has a wide outlet opening (127) for inspection, while the opposite wall or front wall (124), besides having a circular opening (128), is opposed to the respective wall of the intermediate structure (2), wherein said circular opening (128) is in axial alignment with the central openings (104) of the intermediate structure, forming an assembly tunnel for the beating cylinder (8).

The side walls (125) have located at their upper edges a crosswise complement turned outwardly and having a rectangular shape configuring a platform (129), over which a vertical surrounding casing (130) is located, so as to encapsulate the motor power set (19), and having a set of rear foldable stairs (131) for access. The side walls (125) are prolonged downwards and integrated at their lower edges with the clean grain collection gutter (18). Additionally, forwardly of the integration with the clean grain collection gutter, those same lower edges of the side walls have upwardly facing recesses forming a drawer-shaped fitting (132), to receive the terminal part of the vibrating sieve (7) that is formed by the larger mesh sieve (77) and ends over the clean grain collection gutter (18).

FIGS. 29 to 33 illustrate in detail the hinged inlet nozzle (12), comprising a case with an ordinarily vertical front region, having a frame (133) and comprising a large inlet opening (134) for the materials to be processed, the frame (133) integrated to side walls (135) and an upper wall (136), the upper wall having an inspection cap (137), while the bottom of the hinged inlet nozzle having a belt (138), above which and located very close to the upper wall (136) is assembled a pushing set (139). The belt (138) and the upper wall (136) form a sloped box-shaped set at a high slope over the inlet opening (134).

Figure 31:
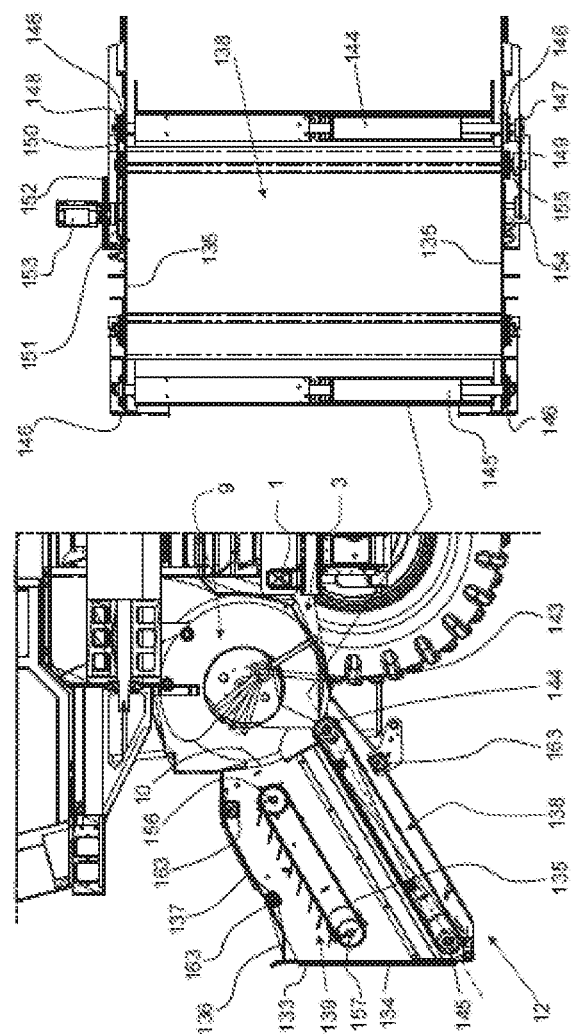
Figure 32:
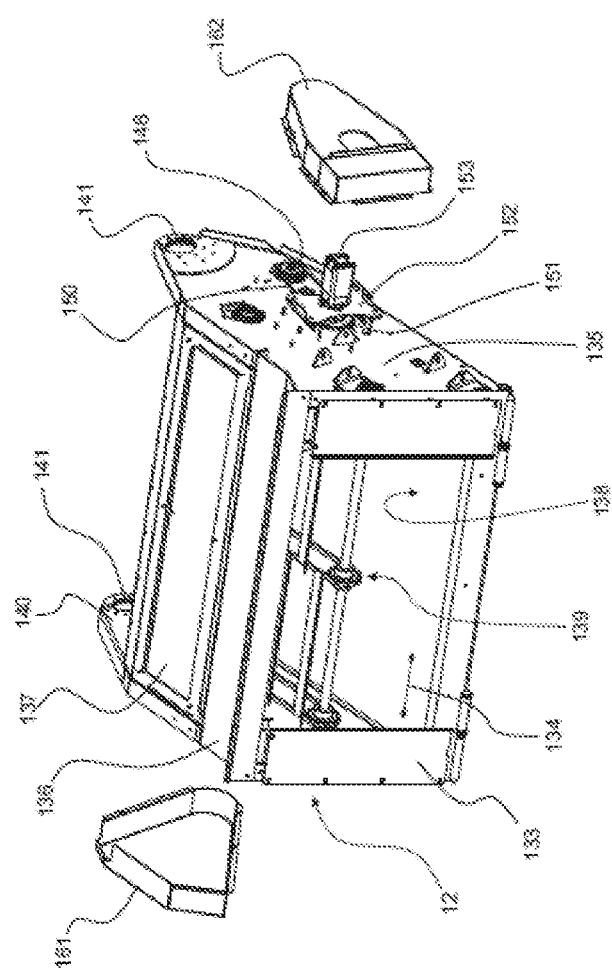
Figure 33:
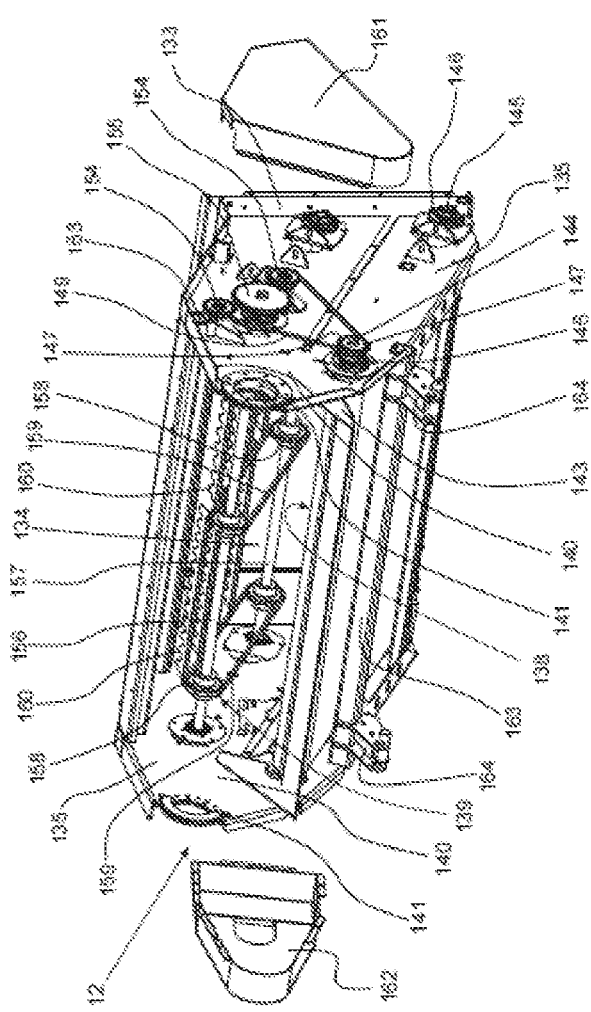

The side walls (135) subsequently taper as they extend towards the rear of the machine in triangular paths forming a rear triangular portion (140) with circular edges (141), the circular edges axially and crosswise aligned and constituting fitting points hinged to the concentrating guiding roller (9) and, at the same time, forming an outlet (142) with a rounded lower end (143) which, on one side, is adjusted to the inlet opening (10) of the front complementary structure (3) and, on the other side, is adjusted to the edge of the belt (138) which, on the other hand (as shown in FIGS. 31 and 33), extends itself supported on two crosswise axes, one upper axis (144) and a lower axis (145), both with their edges borne upon the side walls (135) by means of bearings (146). The upper belt axis (144) has on each of its edges gearings (147) and (148) with their respective chains (149) and (150), wherein a chain (150) on one side is coupled to another second gearing (151), whose axis is borne over a support (152) and the respective side wall (135), wherein it is coupled to a hydraulic engine (153), responsible for activating the belt (138) and simultaneously also activating the other chain (149) which, on one end passes through inverter stretchers (154), and is also coupled to another third gearing (155) which, on the other hand, activates the dragging set (139). The dragging set is equally formed by two axes, having one upper axis (156) and a lower axis (157), both axes borne on the side walls (135), wherein the upper axis is connected to the third gearing (155) and also, between the side walls (135), the upper axis (156) and the lower axis (157) are equally provided with multiple gearings (158), the gearings on the upper axis interconnected by chains (159) to the corresponding gearings on the lower axis, and these chains are interconnected by various crosswise dragging combs (160), the combs moving in the same direction as the belt (138), therefore the space between them forms a displacement tunnel toward the inside of the machine for all of the material to be processed by the set. Side protectors (161) and (162) protect both sides of the transmissions configured by the chains (149) and (150).

The side walls (135) are structurally complemented by tubular beams (163), with two upper beams and one lower beam, the lower beam having raising supports (164).

Figure 34:
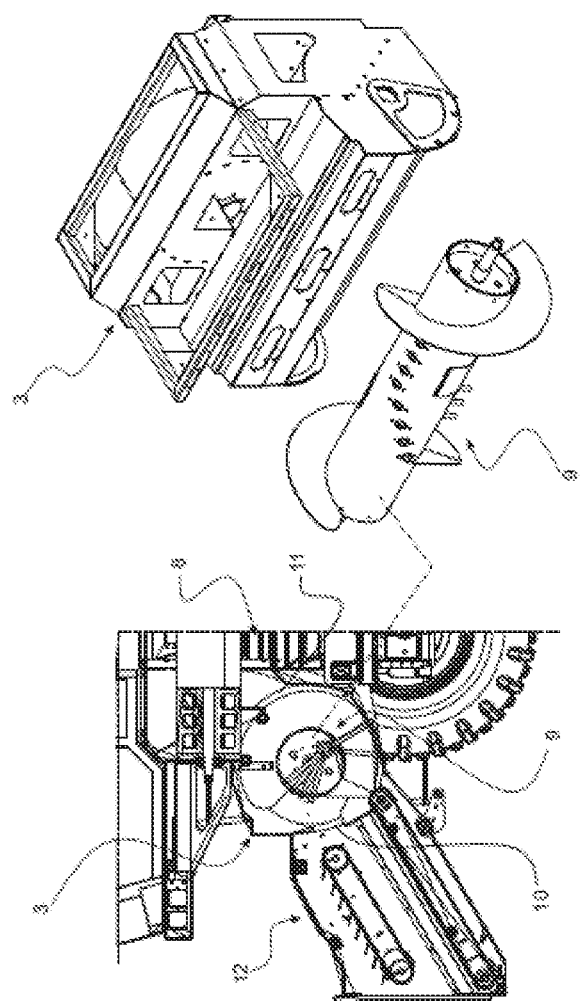
FIGS. 34 to 37 show various enlarged details of the front section of the machine and the concentrating guide roller.
Figure 35:
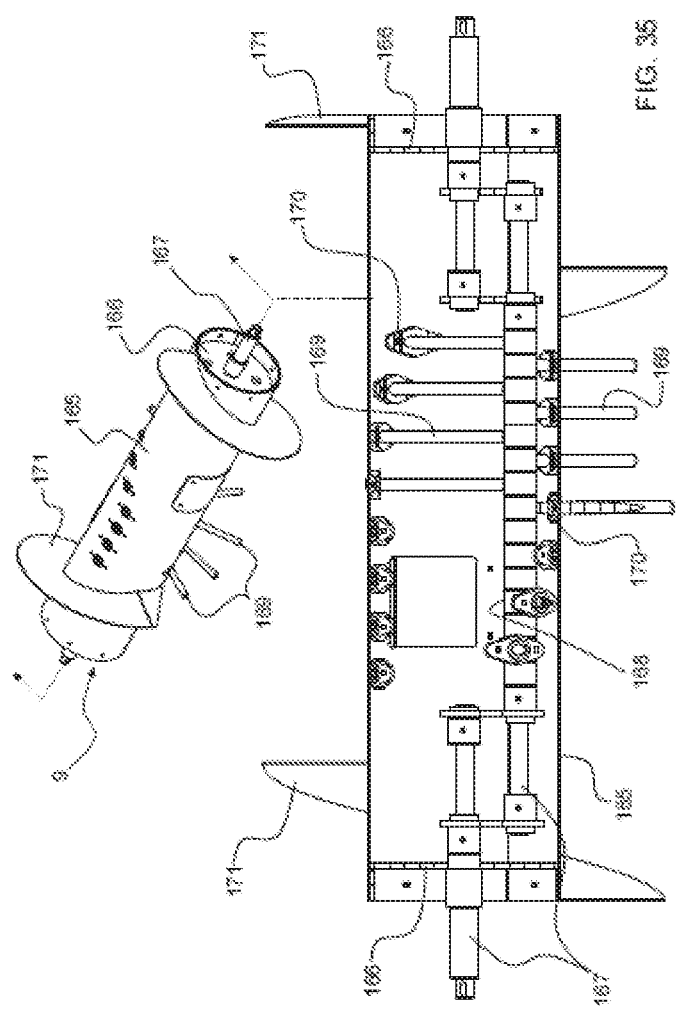

FIGS. 34 and 35 show in detail the concentrating guiding roller (9) assembled inside the front complementary structure (3). The concentrating guiding roller comprises a tubular hub (165), closed by blind flanges (166), pierced by the edges of a crankshaft (167). Along the crankshaft are various connecting rods (168), all of them equally having round shafts (169) radially guided to pierce and to be alternately moved through strainers (170) that are distributed along the diameter of the tubular hub (165). This distribution forms a helical wing of external jaws alternately entering and leaving the tubular hub (165), wherein said jaw wing is located between the paths of two helical screws (171), thus ending the means for the material arriving at the concentrating guiding roller set to be concentrated in the center by the helical screws (171) and simultaneously displaced to the rear of the machine by the round shafts (169) which, thanks to the crankshaft (167), are exposed on the front side, grasps the material, pushes it behind and, at that point, the jaws are again retracted to release the material and allow it to continue its path rearwardly in the machine, i.e. until the rear outlet (11) coinciding with the inlet of the beating cylinder (8).

Figure 36:
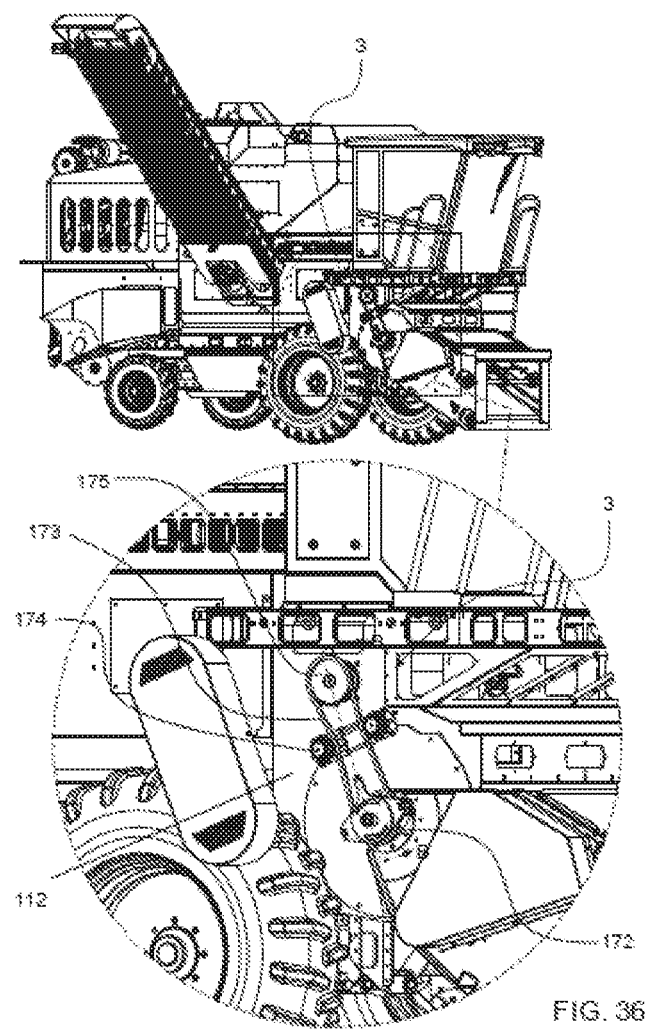
Figure 37:
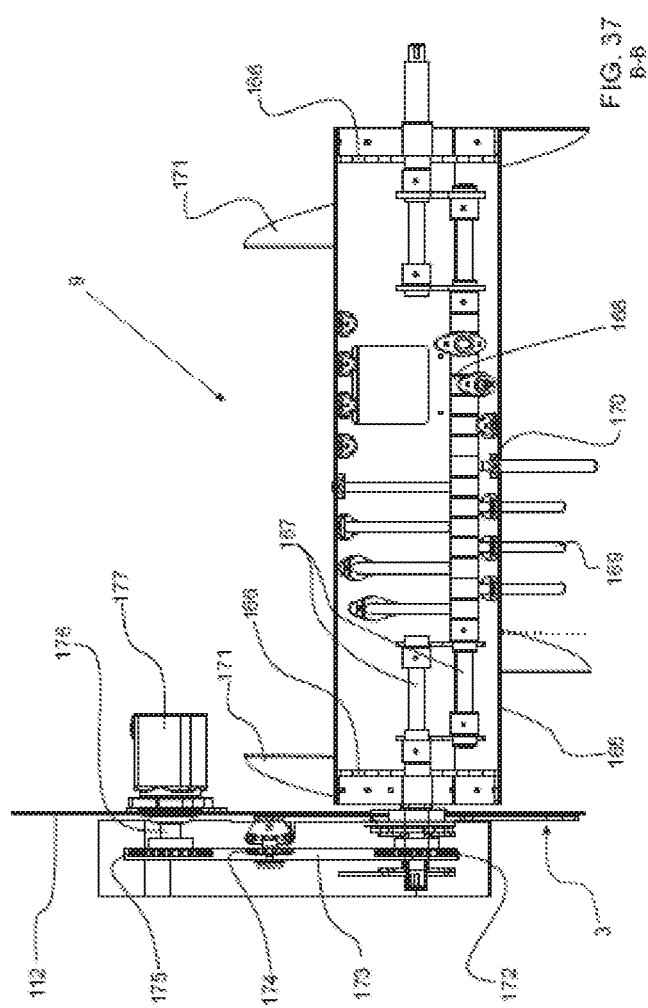

As illustrated by FIGS. 36 and 37, the concentrating guiding roller (9) has the edges of its crankshaft (167) borne on the respective vertical side walls (112) of the front complementary structure (3), wherein one of the crankshaft edges has a first gearing (172) coupled to a transmission chain (173) passing through stretchers (174) and coupled to a second gearing (175) which, on the other side is coupled to the respective edge of the axis (176) of a hydraulic engine (177) also borne on the vertical side wall (112) of the complementary structure (3) and, thus, said hydraulic engine (177) activates the concentrating guiding roller (9). Additionally, the transmission set as defined by the transmission chain (173) is kept embedded and covered by adequate protection.

Figure 38:
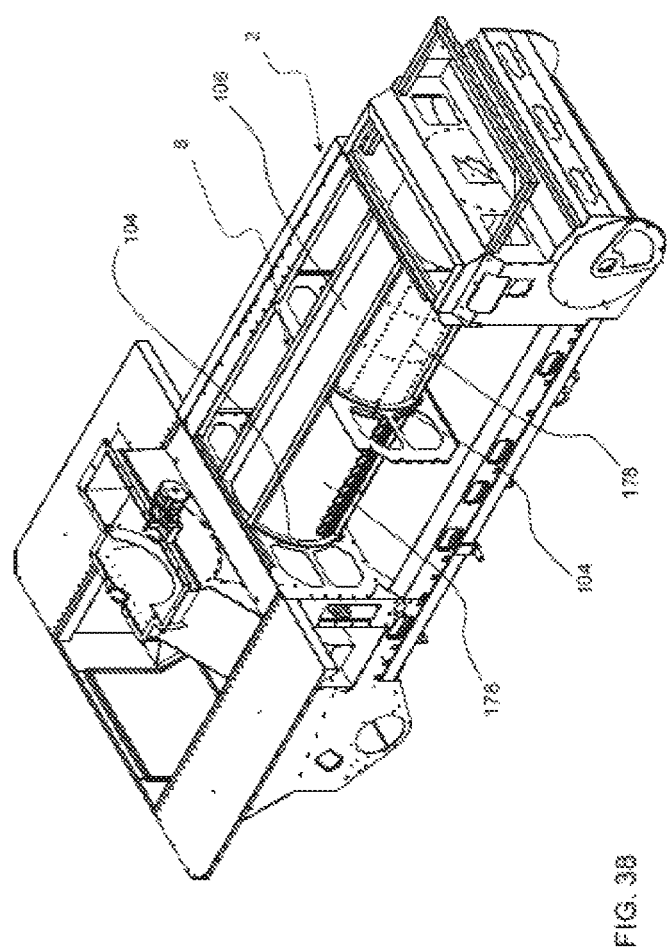
FIGS. 38 to 41 are enlarged detailed views of the A-A section and isometric views highlighting the embodiment details of the beating cylinder.
Figure 39:
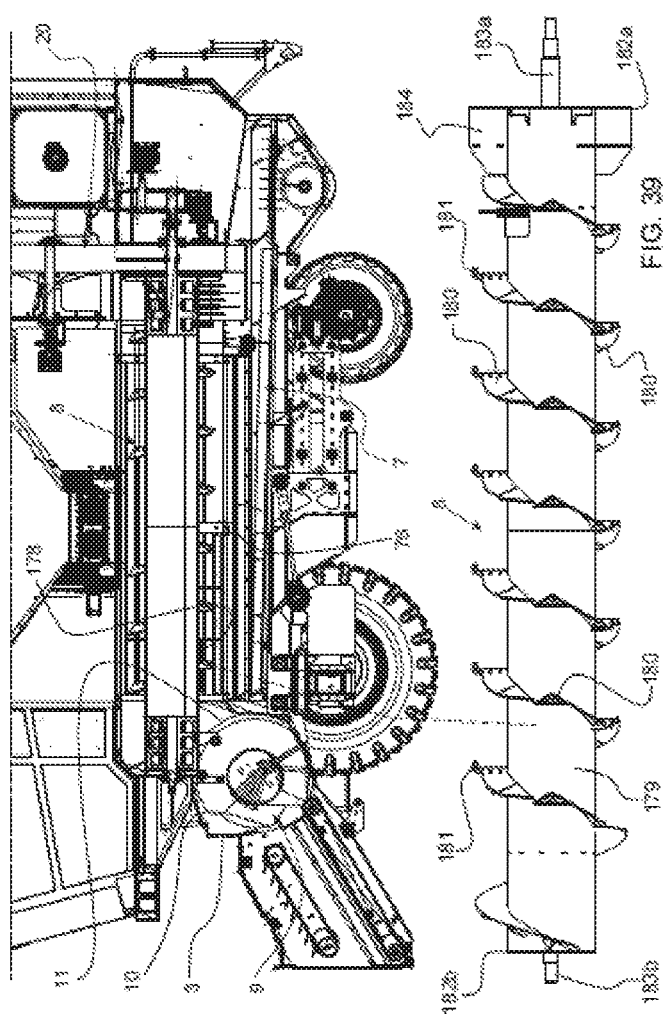

FIGS. 38 and 39 illustrate in detail the beating cylinder (8), comprising a set of cylindrical sieves (178) with different meshes, forming a tunnel and, placed and adjusted inside the circular central openings (104) and the upper curved plate part (106) of the intermediate structure (2). Inside the circular sieves, the beating cylinder (8) per se is located, extending from the rear outlet (11) of the concentrating guiding roller (9) until close to the rear end of the vibrating sieve (7), i.e. along the entirety of the longer sieve with smaller mesh (76), ending inside the suction cleaning set (20). This permits all of the material exiting from the concentrating guiding roller (9) to enter the beating cylinder (8), along which the cleaning process is performed, since, along that path, only grains and smaller particles fall over the vibrating sieve (7), which then performs another cleaning step.

Figure 40:
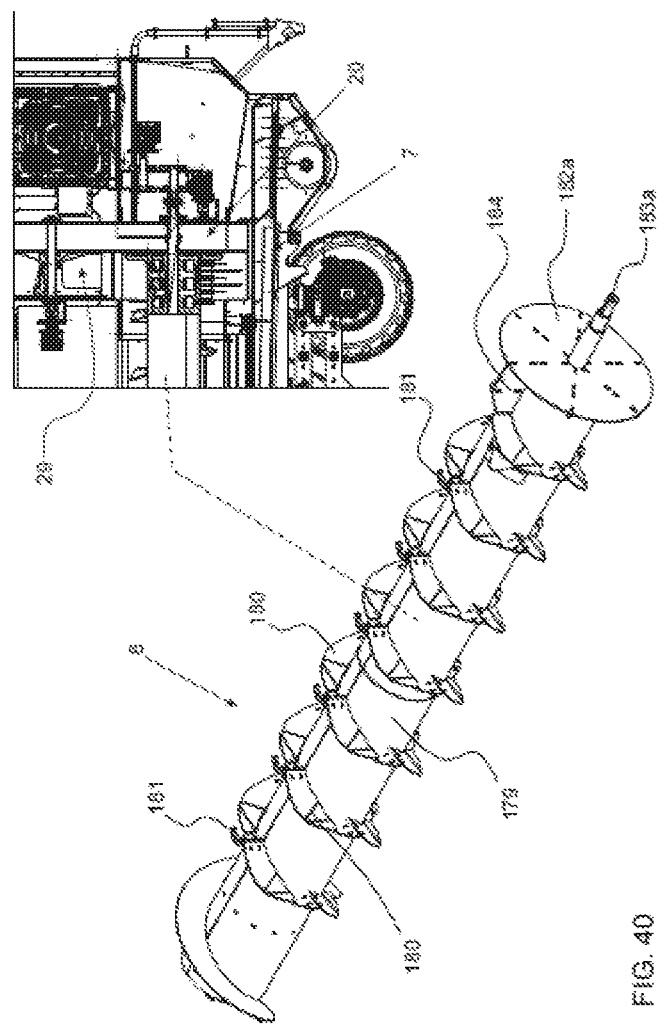
Figure 41:
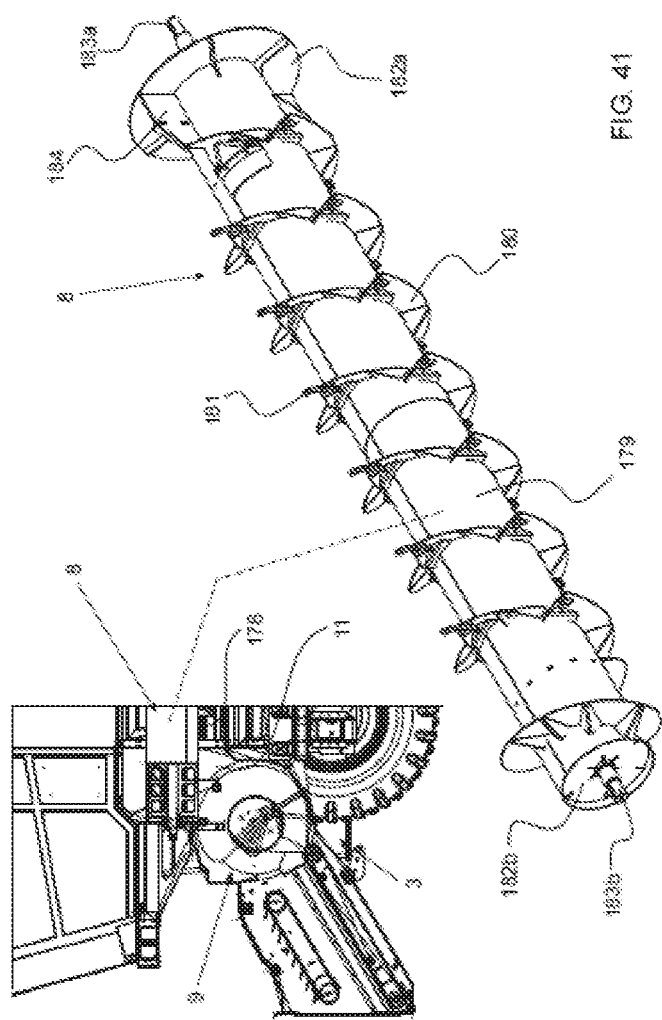

As illustrated in FIGS. 40 and 41, the beating cylinder (8) comprises a tubular hub (179) externally provided with an endless screw (180), wherein along the endless screw and the tubular housing are located angled edges (181) radially turned outwardly. The tubular hub (179) has its edges closed by blind flanges, a larger external flange (182a) on the rear end and a smaller internal flange (182b) on the front end, both flanges having corresponding axis edges, a larger rear axis edge (183a) and a smaller front axis edge (183b), wherein the larger rear axis edge is borne inside the suction cleaning set (20), while the smaller front axis edge is borne on the respective rear wall of the front complementary structure (3) adjacent to the rear outlet (11). The rear edge of the beating cylinder (8) also has substantially short radial fins (184), their height coinciding with the diameter of the largest rear flange diameter (182a), said fins remaining in position inside the suction cleaning set (20), allowing all of the material being shaken inside the beating cylinder (8) to be processed, i.e. grains are released from the rest of the plant, and said grains pass through the cylindrical sieves (178) and fall over the vibrating sieve (7), while the dischargeable parts remain and are displaced rearwardly, towards the suction cleaning set (20).

Figure 42:
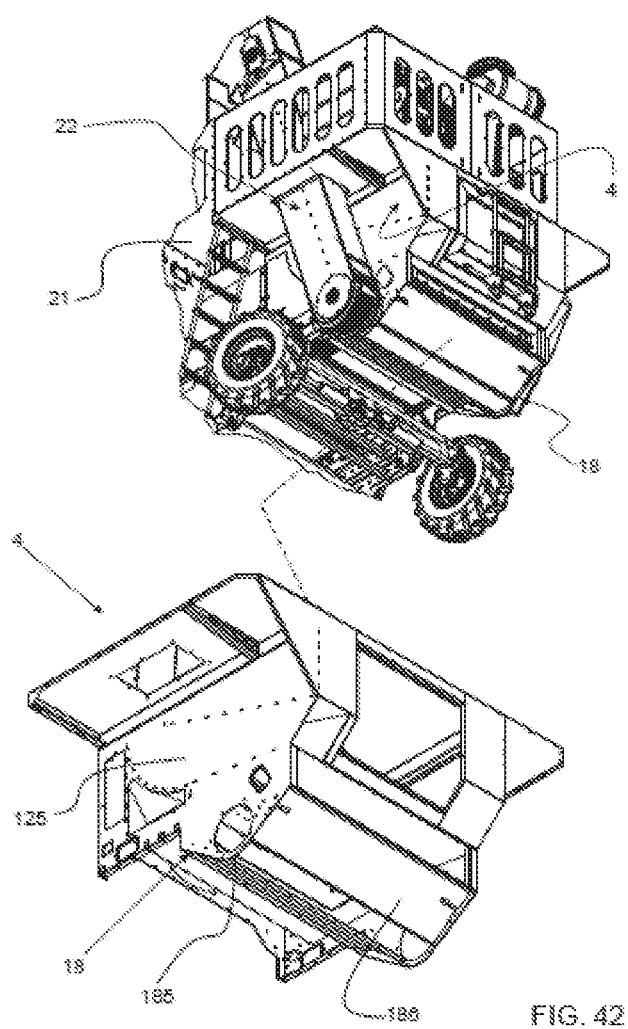
FIGS. 42 to 44 are partial isometric views and enlarged cut details showing the construction of the clean grain collection gutter.
Figure 43:
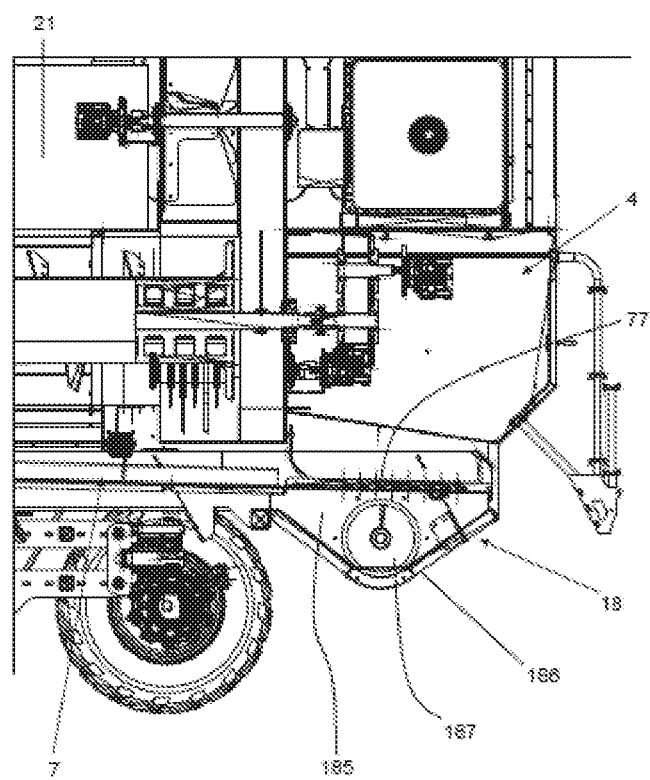
Figure 44:
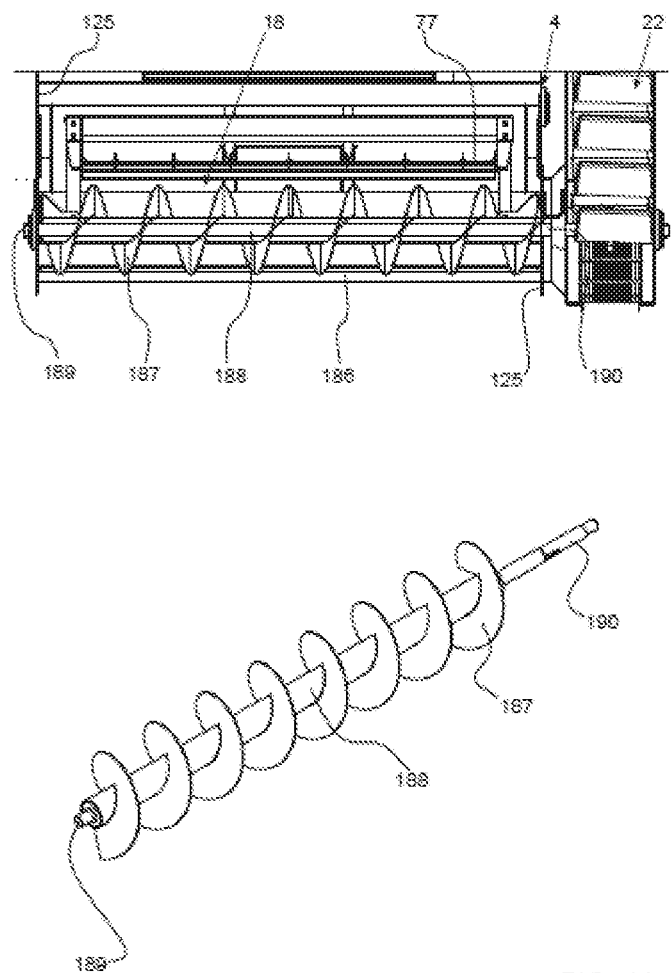

FIGS. 42 to 44 illustrate in detail the clean grain collection gutter (18), which is configured for integration to the lower part of the rear complementary structure (4) and, for that purpose, comprises the tapered side walls (125) of the rear complementary structure forming triangular parts (185) which are closed by caps, forming an open "V"-shaped gutter (186) extending on its width and on the length of the shorter outlet sieve (77) of the vibrating sieve set (7). The gutter having within it an endless helical screw transporter (187) with a tubular hub (188). The tubular hub ends on one side of the axis at a short edge of the axis (189), and on the other side at a long edge of the axis (190), both axis ends borne on the triangular parts (185) of the side walls (125) of the rear complementary structure (4). The long edge of the axis (190) extends itself and pierces the lower edge of the clean grain elevator (22), on which it is borne and becomes an integral part of the clean grain elevator, allowing the grains passing through the outlet sieve (77) to fall inside the clean grain collection gutter (18), where they are guided to the lower edge of the clean grain elevator (22), so as to be transported upwards until reaching the grain dumper (21).

Figure 45:
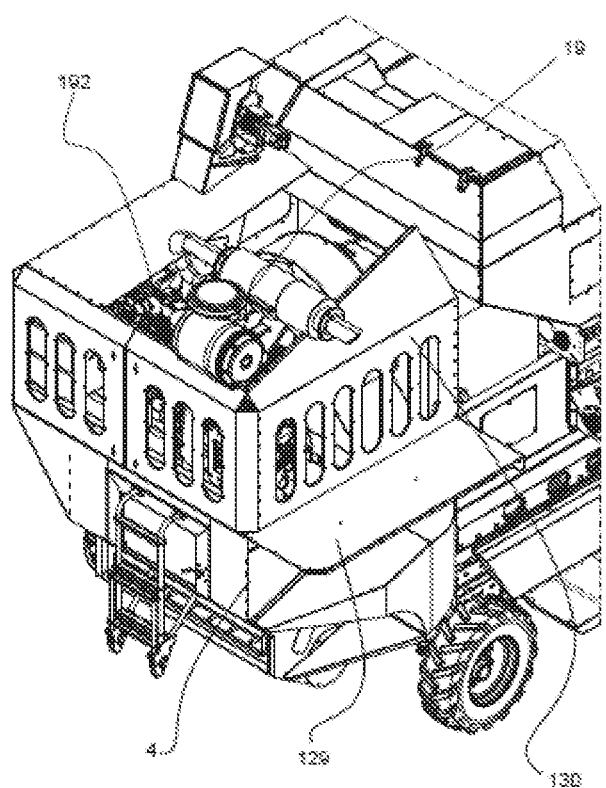
FIGS. 45 to 47 are enlarged isometric details highlighting the motor power set.
Figure 46:
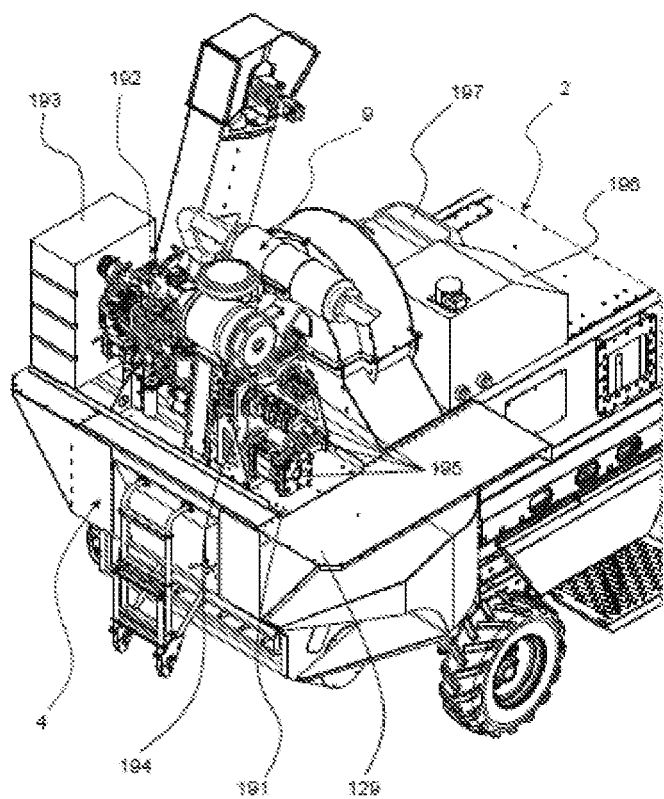
Figure 47:
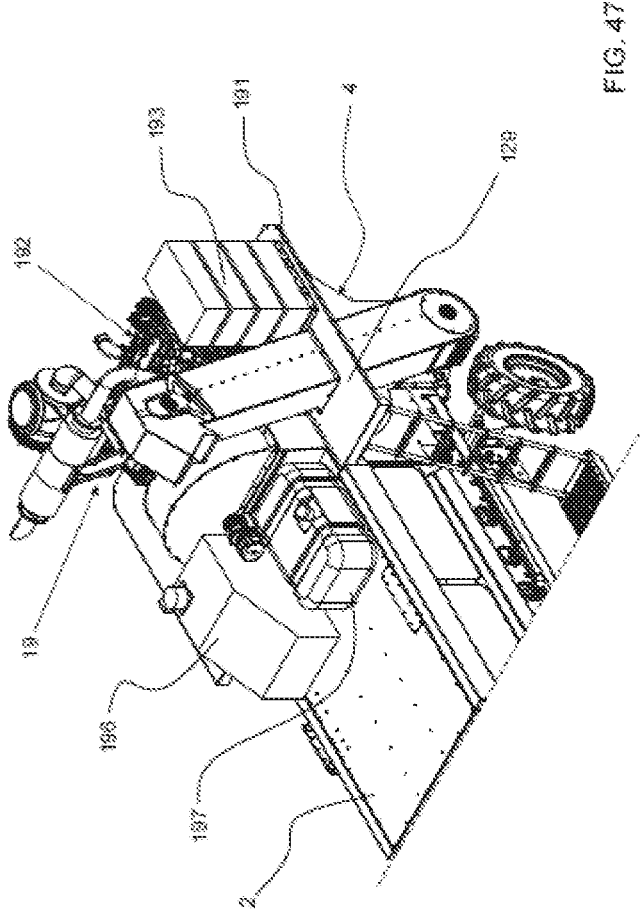
Figure 48:
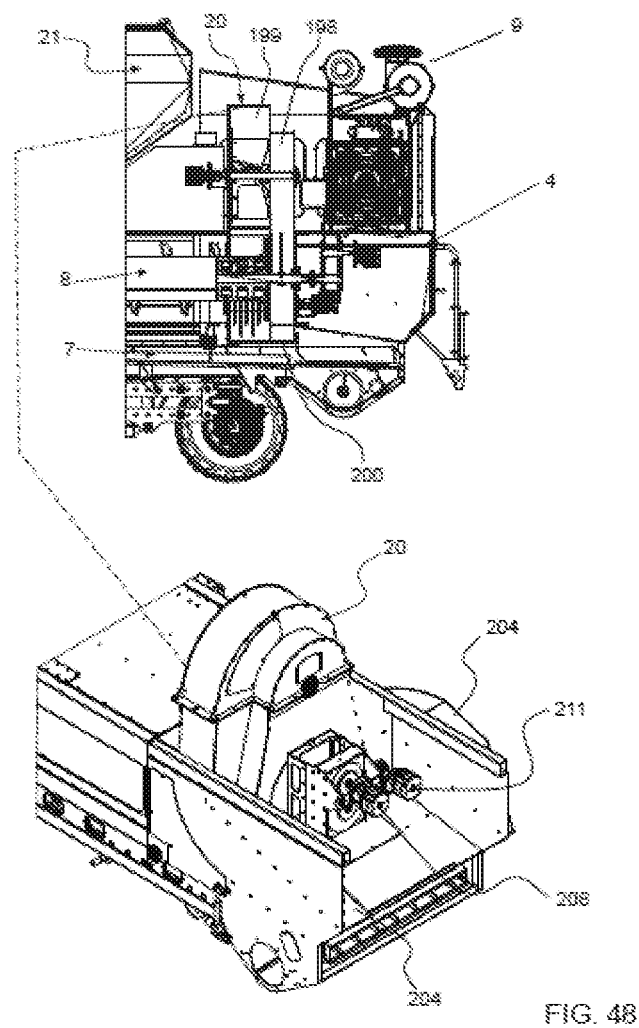
FIGS. 48 to 51 are partial enlarged sections and isometric views, showing the details of the suction cleaning set.
Figure 49:
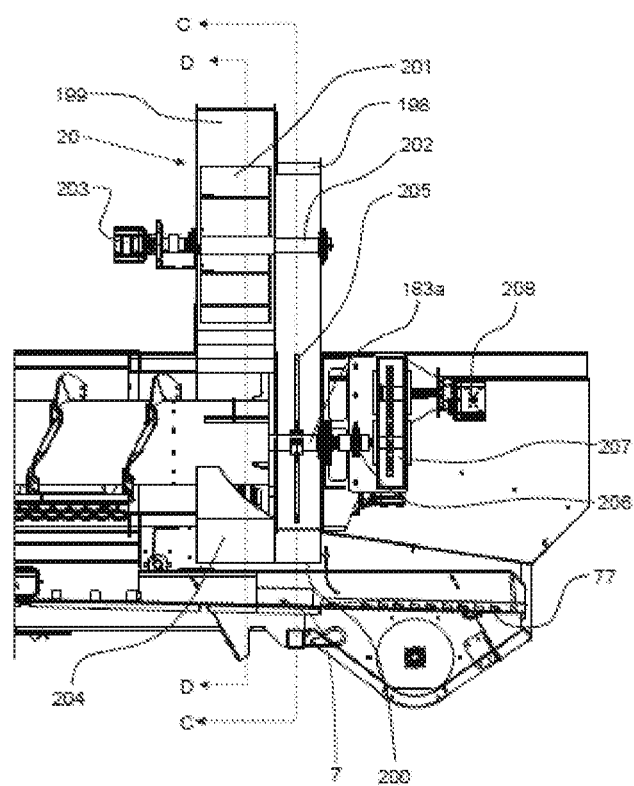
Figure 50:
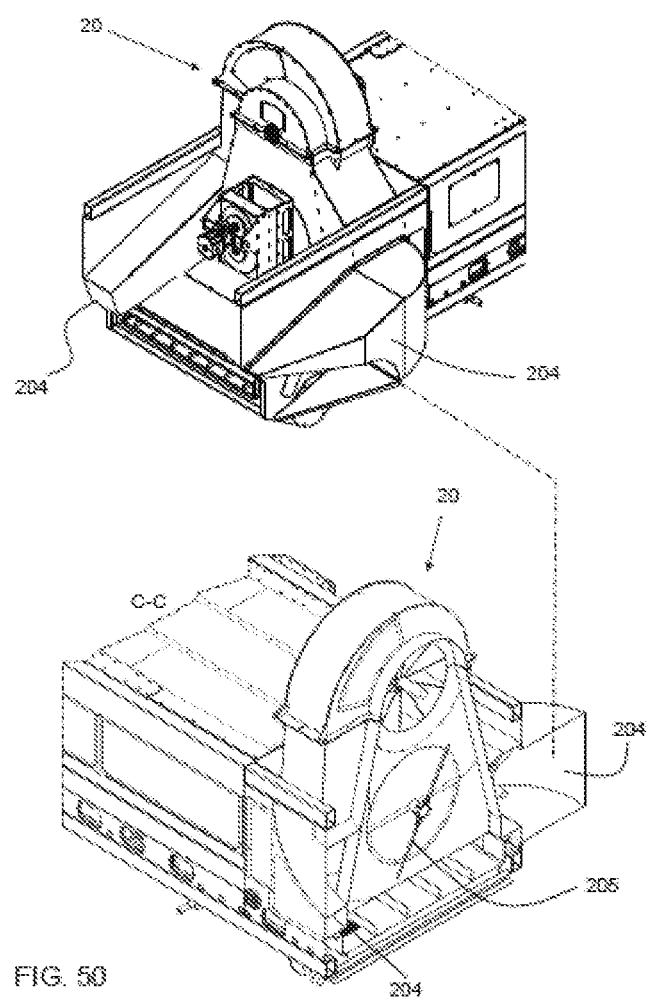

As shown by FIG. 45, the motor power set (19) is assembled crosswise over the platform (129) of the rear complementary structure (4) and protected by the vertical surrounding casings (130). As illustrated by FIGS. 46 and 47, the motor power set (19) is initially formed by a crosswise plate base (191), assembled crosswise over the rear complementary structure (4), said base constituting a support for an internal combustion engine (192), preferably powered by diesel, having a corresponding cooling unit (193). The internal combustion engine (192) also has its camshaft and a respective steering wheel directly coupled to a transmission box (194), activating hydraulic pumps (195) with different powers, all of them interconnected to a hydraulic oil tank (196), upon the side of which there is a fuel tank (197), with both the oil and the fuel tanks located over the intermediate structure (2). The motor power set is responsible for activating all hydraulic engines of the machine, and consequently all of the hydraulic engines of the machine are duly interconnected to the motor power set (19) by means of hoses (not shown).

FIGS. 48 to 51 illustrate in detail the suction cleaning set (20), which is assembled crosswise inside the rear complementary structure (4) between the motor power set (19) and the grain dumper (21). The suction cleaning set comprises a box divided into two adjacent chambers, a rear chamber (198) and a front chamber (199), assembled crosswise and occupying the entire width of the vibrating sieve (7), wherein the rear chamber (198) has an open base, forming an aspiration nozzle (200) which is located at the end of the vibrating sieve (7) and, at that place the suction cleaning set establishes an upward flow of air by means of a suction turbine (201) assembled at the top of the front chamber (199), whose lengthwise axis (202) is borne lengthwise up on the respective walls of the two chambers (198) and (199), wherein one of the edges of both of the walls is coupled to a hydraulic engine (203). Additionally, said suction turbine also establishes an upward flow of air in the rear chamber (198) and a downward flow of air in the front chamber (199), the lower part of the front chamber being closed but having side outlet tubes(204), one on each side, which are curved and turned rearwardly.

In the front chamber (199) and between the suction turbine (201) and the side outlet tubes (204) is located the edge with fins (184) of the beating cylinder (8), the rear axis edge (183a) of which pierces the respective walls of the rear chamber (198) and, inside it, said rear axis edge (183a) receives a shredding helix (205), the rotation of which shreds suctioned residues to avoid clogging the suction turbine (201). That same rear axis edge (183a), after piercing the rear chamber (198), also receives an elastic coupling (206) for connection to a transmission box (207) with a corresponding hydraulic engine (208) for activating the beating cylinder (8).

Figure 51:
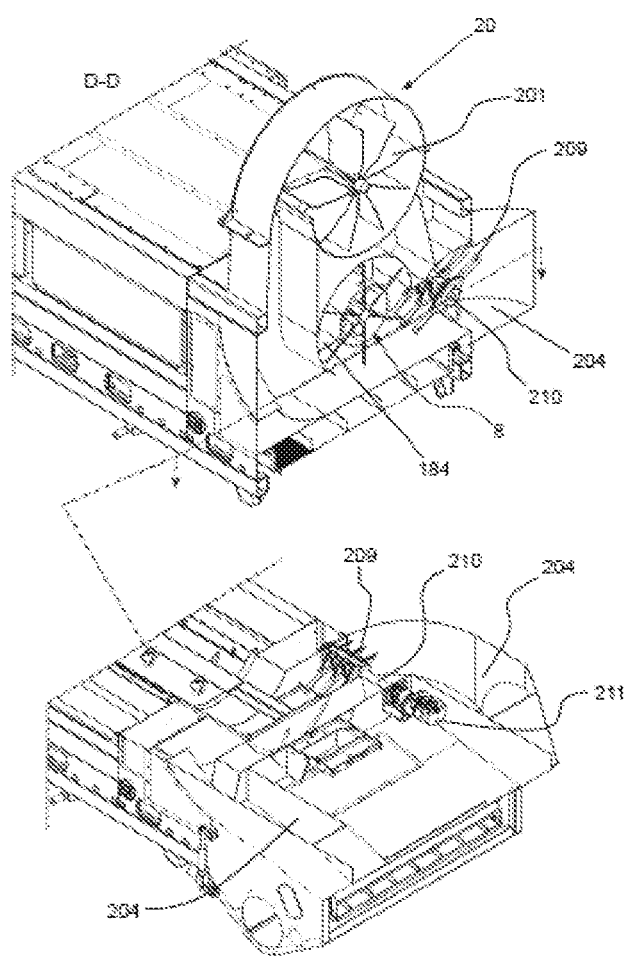

As illustrated in FIG. 51, one of the two side outlet tubes (204) is equally provided with shredding helices (209) assembled on an axis (210) piercing said side outlet tube (204) and coupled to a hydraulic engine (211). This set, similarly to that previously described above, helps avoid material accumulation (clogging) in the side outlet tube (204).

Figure 52:
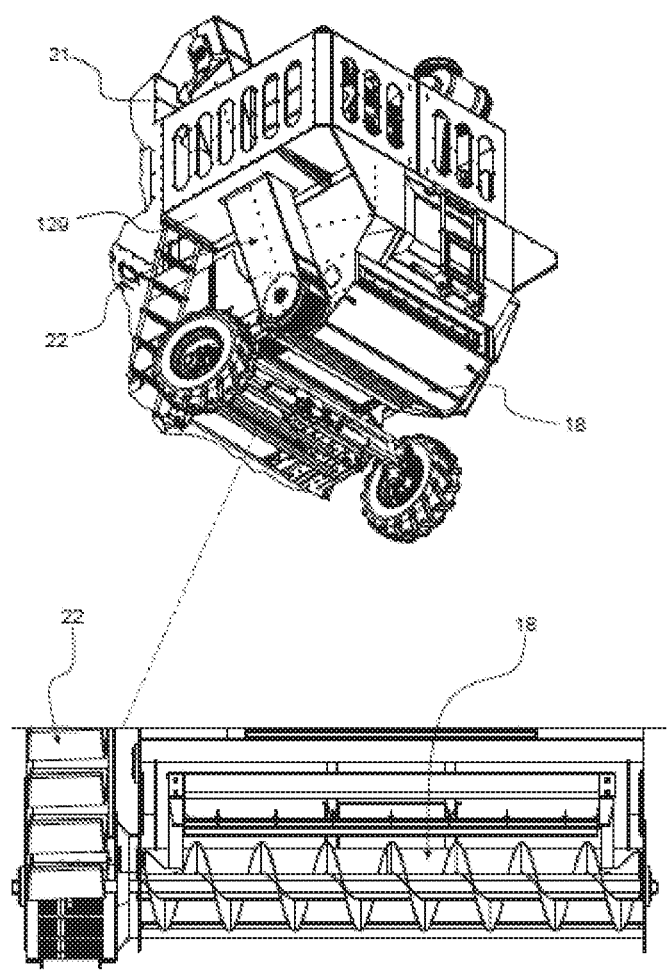
FIGS. 52 to 55 are partial sections and partial isometric views showing enlarged details of the clean grain elevator.

As shown by FIG. 52, it can be seen that the clean grain elevator (22) is assembled on the left side of the machine, with its lower edge interconnected to a clean grain collection gutter (18) and, from there it slopes slightly towards the front of the machine and pierces the platform (129) of the rear complementary structure, so that its upper edge may be interconnected to the grain dumper (21), wherein clean grains are discharged by the grain elevator (22).

Figure 53:
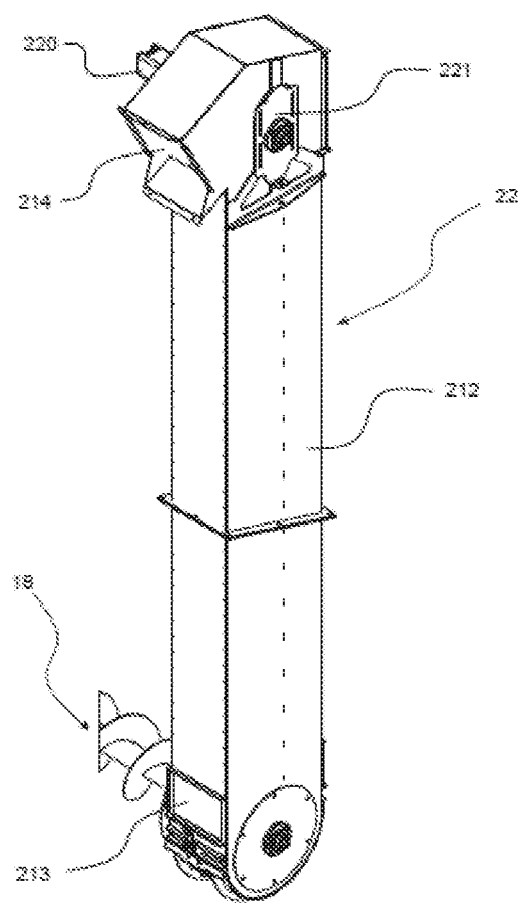
Figure 54:
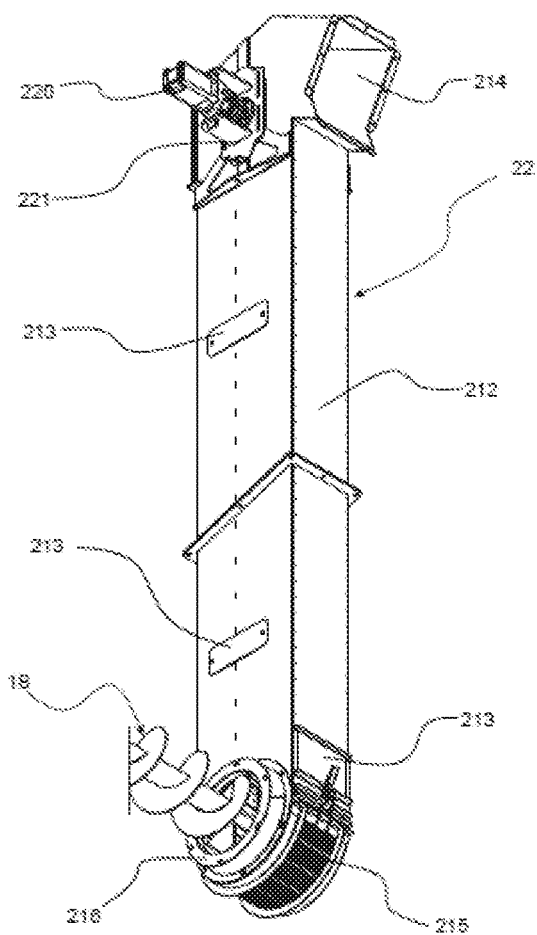
Figure 55:
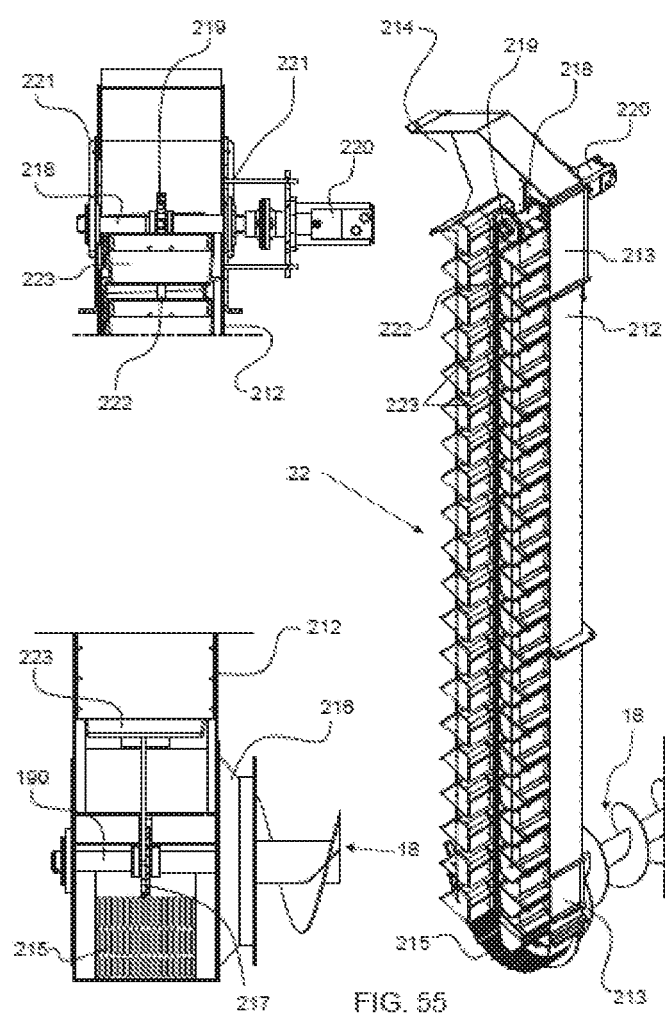

FIGS. 53 to 55 show in detail the clean grain elevator (22), comprising a tube (212) with a rectangular cross-section, having various caps (213) to allow inspection and service, and an elbow-shaped prolongation (214) upon its upper edge, which is guided behind and downwards for connection to the upper part of the grain dumper (21).

The lower edge of the tube (212) is closed by a sieve (215) and at that point, the corresponding side has a circular collar (216) for transition and interconnection with the clean grain collection gutter (18), wherein the circular collar centrally passes and is borne over the long axis edge (190), which receives a lower gearing (217), which also connects to the lower edge of the tube (212), with another axis (218) located at the upper edge of the tube, having an upper gearing (219) and activated by a hydraulic engine (220) assembled on the side of the tube (212) jointly with stretcher side supports (221). The upper and lower gearings (219) and (217) are interconnected by a chain (222), along which shelves (223) are fixed, passing bent over the housing formed on the sieve (215) at the lower end of the tube, where they are filled in with clean grain and displaced up to the elbow-shaped prolongation (214), wherein the shelves (223) unload clean grains which fall by gravity inside the grain dumper (21).

Figure 56:
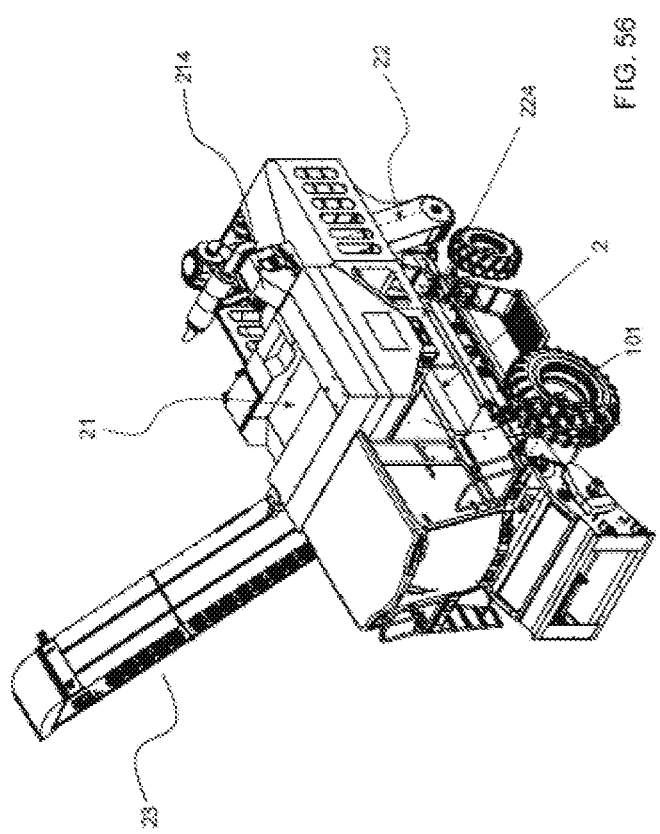
Figure 57:
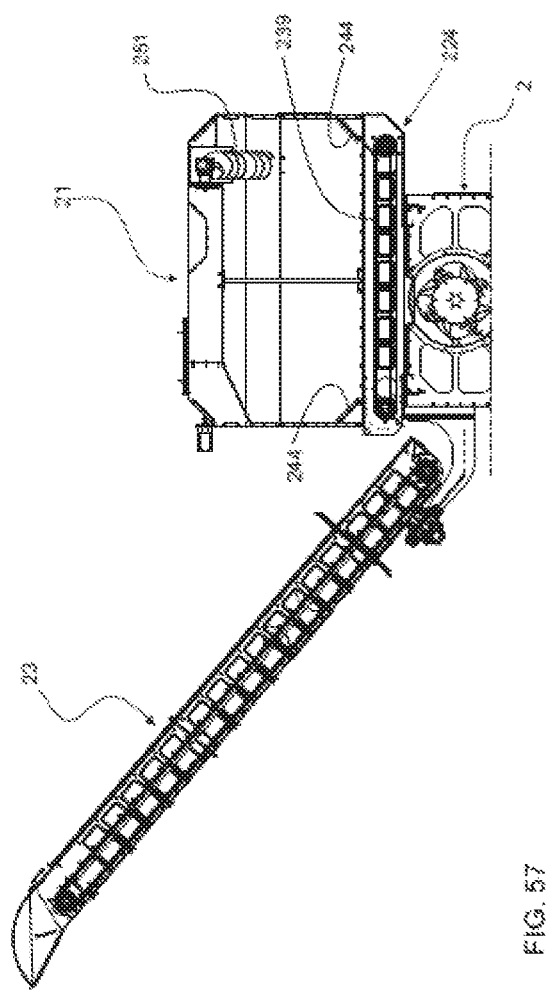

FIGS. 56 to 63 illustrate in detail the grain dumper (21). FIGS. 56 and 57 show the assembly of the grain dumper (21), comprising a rectangular unloading base (224), assembled crosswise over the intermediate structure (2) and aligned with the retractable side belt (23). This layout allows the entire load of the grain dumper (21) to be unloaded from behind, wherein the unloading base (224) displaces the grains upwards to the retractable side belt (23), which on its other end, allows for grain transshipment to the desired place, such as within the dumper of a vehicle.

Figure 58:
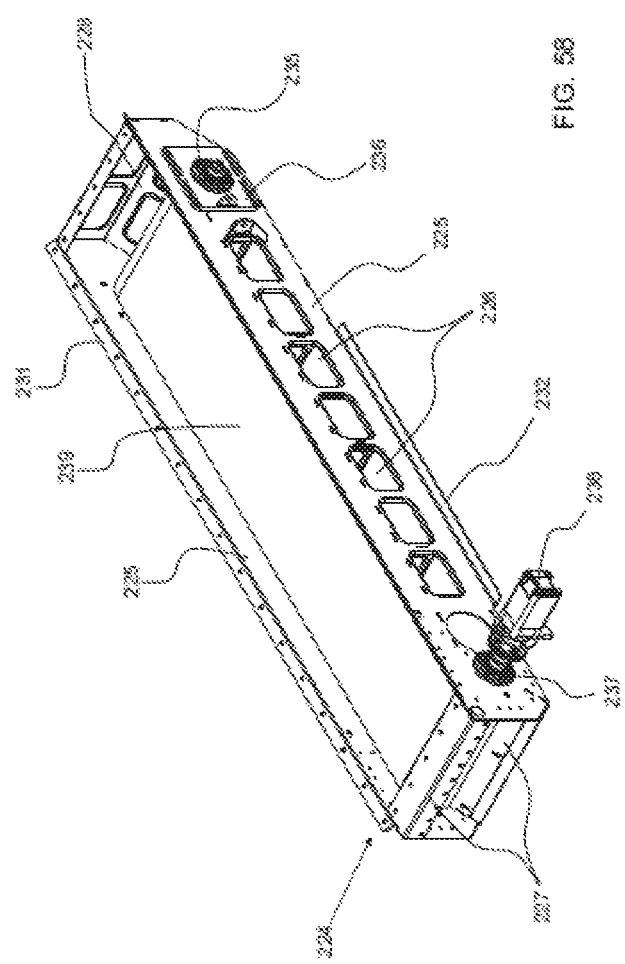
Figure 59:
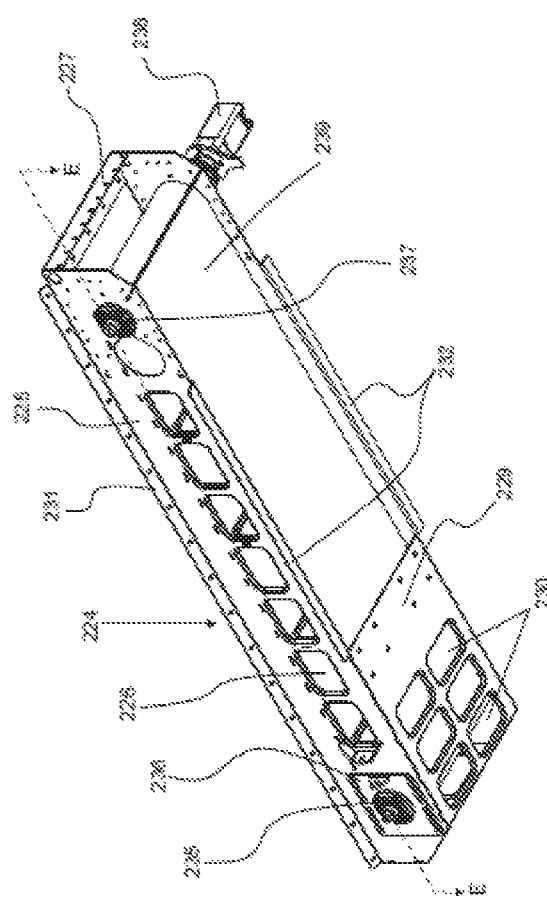
Figure 60:
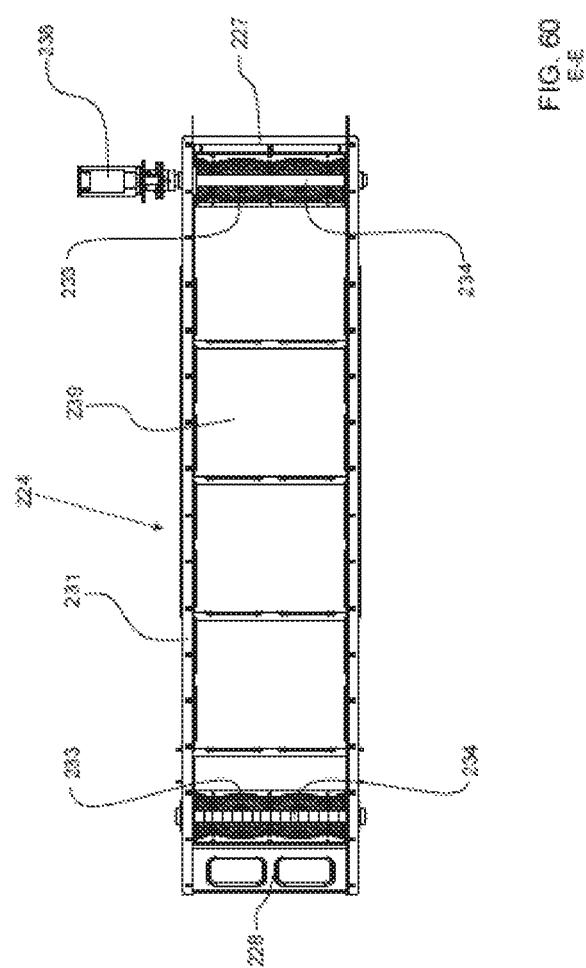

FIGS. 58 to 60 illustrate in detail the unloading base (224), comprising by vertical side walls (225) having a plurality of openings (226) and edges with interconnecting plates on the left (227) and right sides (228) of the machine, including a lower partial closing (229) on the left side of the machine having openings (230). The upper edges of the side walls (225) are folded at an angle towards the outside and upwards, forming support flaps (231) for the grain dumper (21), while the lower edges of the side walls are equally folded outwardly, but forming shorter crosswise flaps (232) for settling the set over the upper closing plate (101) of the intermediate structure (2).

The edges of the unloading base (224) each have two rubbery rollers (233), with their respective axes (234), the one of which is located on the left side of the machine being supported over bearings (235) with corresponding stretching supports (236), while the axis on the right side of the machine, besides being borne over bearings (237), also has one of its edges coupled to a hydraulic engine (238), since, on the two rollers (233) on the right hand side of the machine, a conveyor belt (239) will be placed to transport clean grains to the retractable side belt (23).

Figure 61:
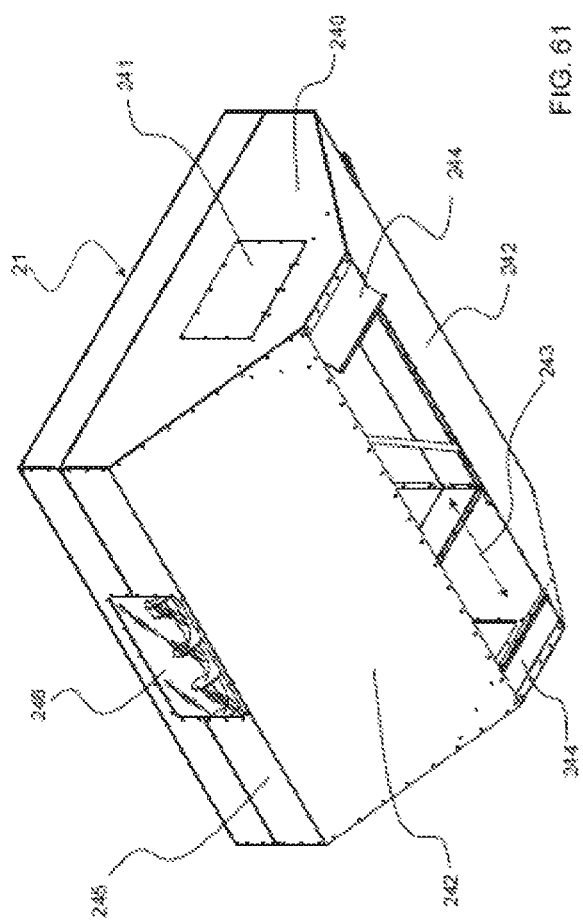

FIG. 61 illustrates the body of the grain dumper (21), which is in the form of a box with a tapered base and, having its edges defined by practically triangular vertical left hand and right hand walls (240) having inspection ports (241), the left and right walls combined with sloped side walls (242) defining a sloped profile, which is limited on its lower side by a wide rectangular opening (243) which has an appropriate size for perfect fitting over the unloading base (224), wherein the sloped side walls (242) are settled over the support flaps (231) and, at that point, internal casings (244) complete the fitting over the conveyor belt (239), thus closing the gaps between the conveyer belt and the body of the grain dumper, so to avoid grain leakage.

The sloped side walls (242) have short vertical plates (245) on their upper side, the side wall which is located towards the front end of the machine having a transparent window (246) coinciding with a transparent back window of the cockpit (13), in order to enable the operator to target the inside of the grain dumper (21) and know when its full capacity has been reached and it needs to be emptied.

Figure 62:
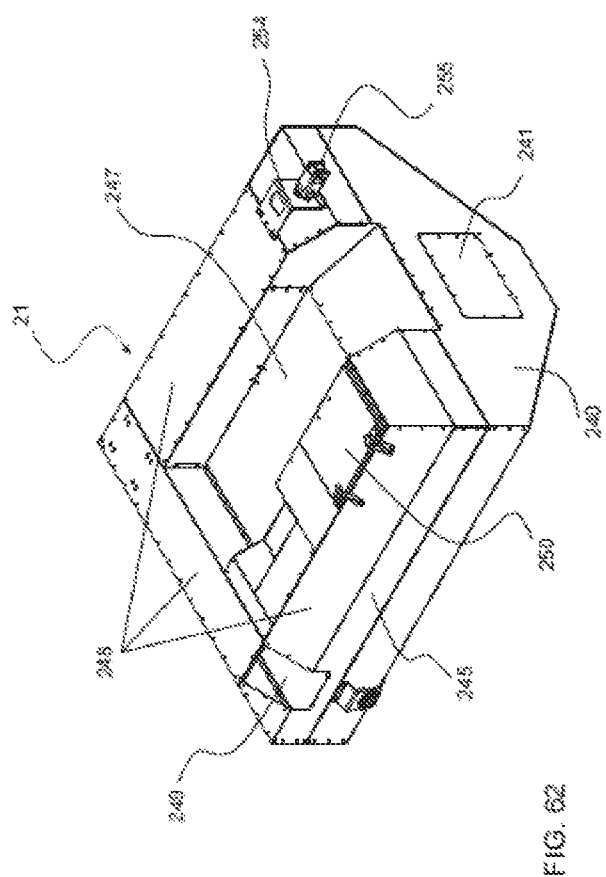
Figure 84:
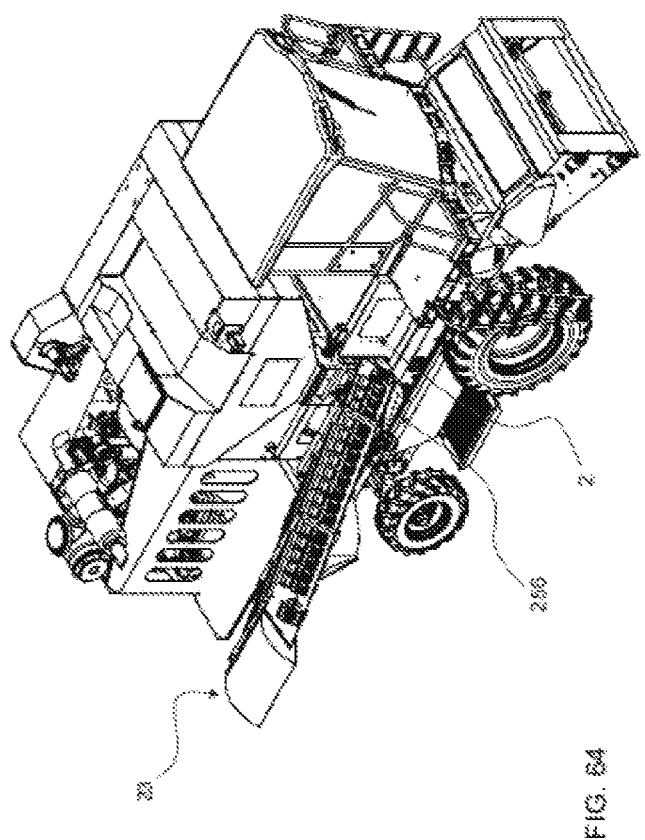

As illustrated in FIG. 62, the upper part of the grain dumper (21) has a closing dome forming a central recess (247) and a surrounding ridge (248) having a "U"-shaped geometry which has an opening (249) on the corresponding side whose fitting coincides with fixing the elbow-shaped prolongation (214) of the clean grain elevator (22), while, on the upper side, said surrounding ridge (248) has an inspection door (250) and, as seen in FIG. 63, on the internal side, the surrounding ridge houses a load leveler formed by two endless screws (251), interconnected to each other at 90° by a 90° transmission box (252) having corresponding couplings (253), while the other distal edges of the load leveler are borne over supports (254), one of the endless screws (251) being coupled to a hydraulic engine (255) with the rotation of said endless screws allowing the internal load of the grain dumper (21) to remain leveled.

Figure 66:
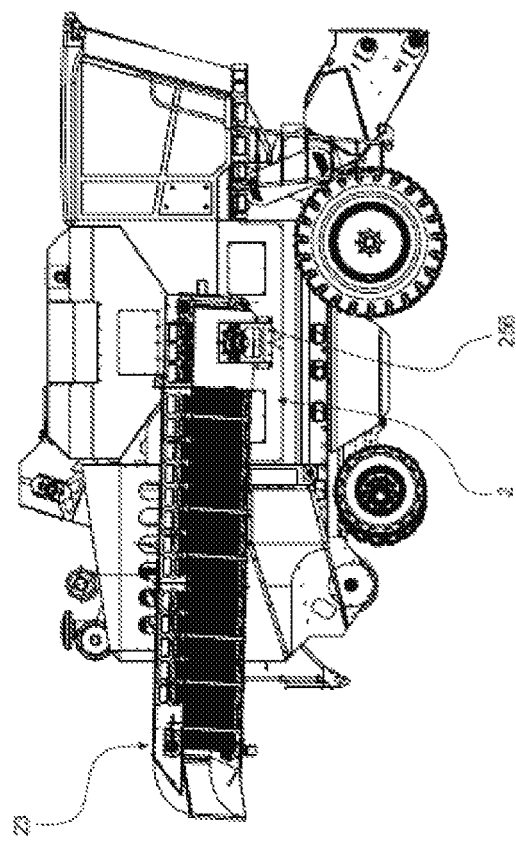

FIGS. 64 to 66 illustrate the retractable side belt (23), having its lower edge hinged to a support (256) which is fixed at the midpoint and upon the upper edge of the intermediate structure (2), allowing the retractable side belt to be put in two positions. The use position of the retractable side belt is shown in FIGS. 64 and 65. In the use position, the set remains at a sloped position, so that its upper unloading edge is substantially higher than its lower edge. FIG. 66 shows the retractable side belt (23) at a resting position, i.e. where it has been moved until it is abutting the side of the machine, in which position it occupies very little space, thus facilitating the displacement of the machine when not in operation.

Figure 67:
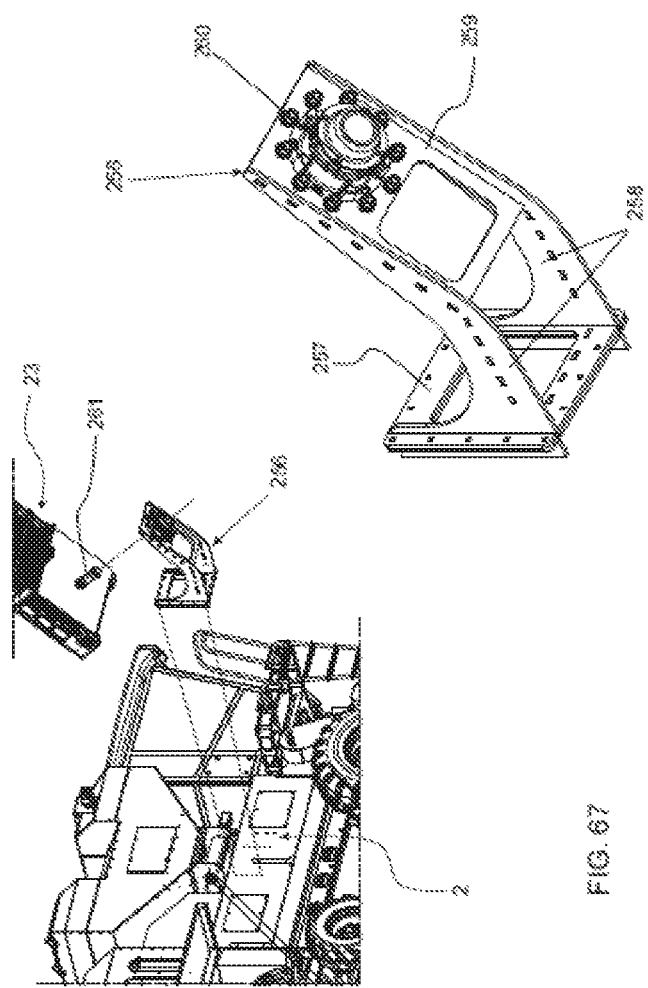

FIG. 67 illustrates in detail the support (256) of the retractable side belt, comprising an "L"-shaped plate part, whose vertical branch constitutes a plate and counter plate (257) which is fixed against the side of the intermediate structure (2), while the other branch (258) of the support has a forked shape projecting crosswise to the outside and then upwardly, and including a linking plate (259), wherein a bearing (260) is assembled which receives a pin (261) that is hinged and fixed crosswise on the lower side of the corresponding edge of the retractable side belt (23).

Figure 68:
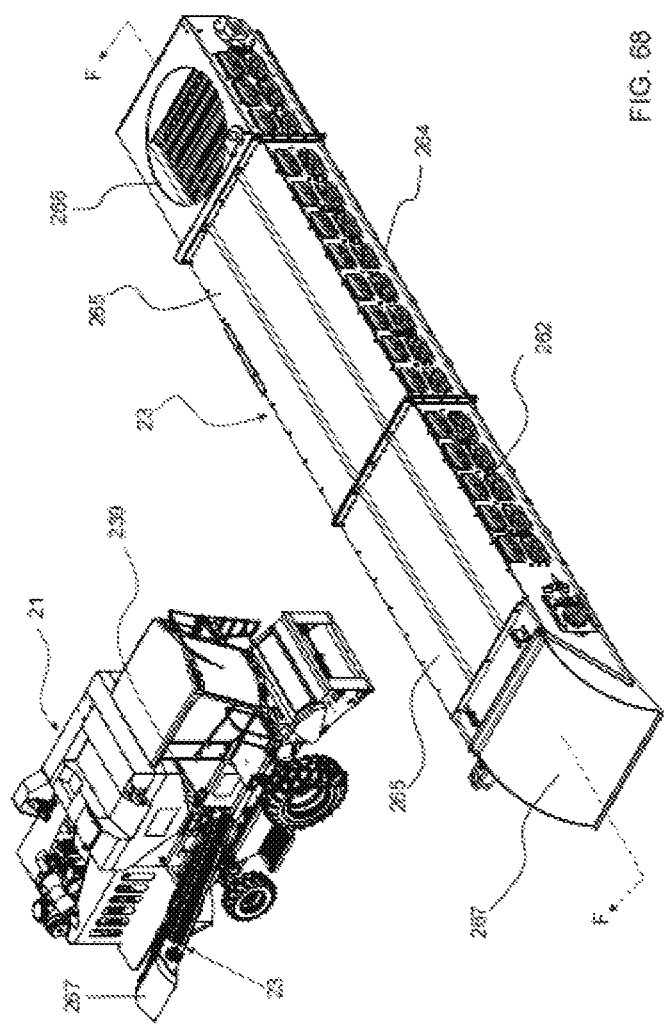
Figure 69:
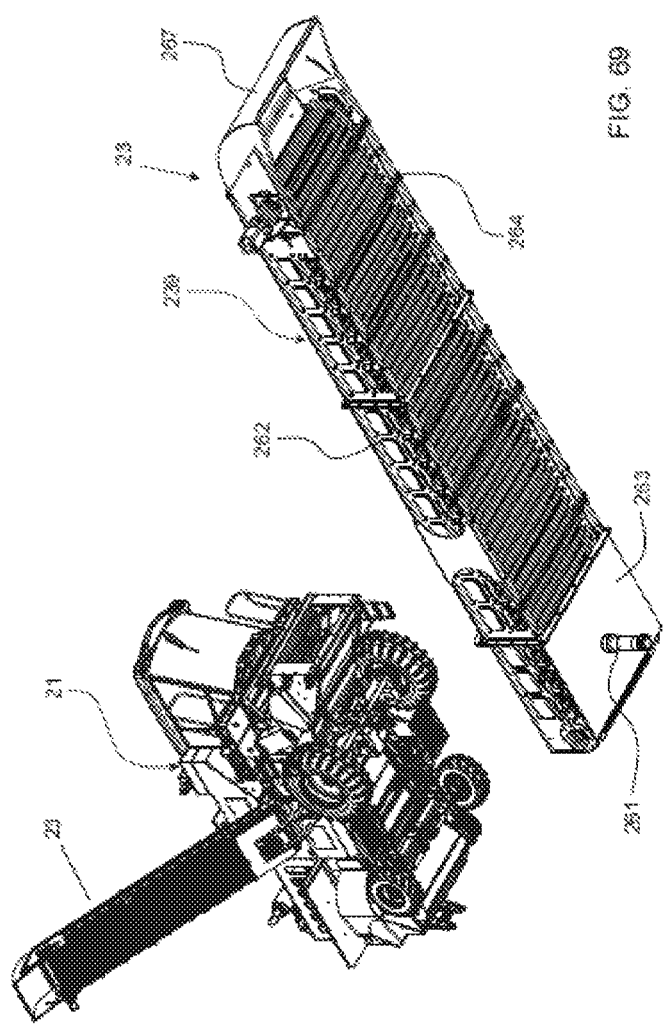

FIGS. 68 and 69 illustrate other details of the retractable side belt (23), comprising a long rectangular-shaped tube having rugged side walls (262) and on the lower side having a small initial path with a plate closing (263) having the pin (261) fixed crosswise, while the remaining part of the lower side is open and includes various structural beams (264) interconnecting the rugged side walls (262), which are also interconnected at their upper end by upper closures (265), including a wide inlet opening (266) very close to the lower edge of the rectangular-shaped tube, said opening being practically under the end of the conveyor belt (239) of the grain dumper (21), in order to receive clean grains.

The upper edge of the retractable side belt (23) ends with an outlet nozzle (267), which is turned downwards at an adjustable angle, as appropriate to guide the outlet of the transported grains.

Figure 70:
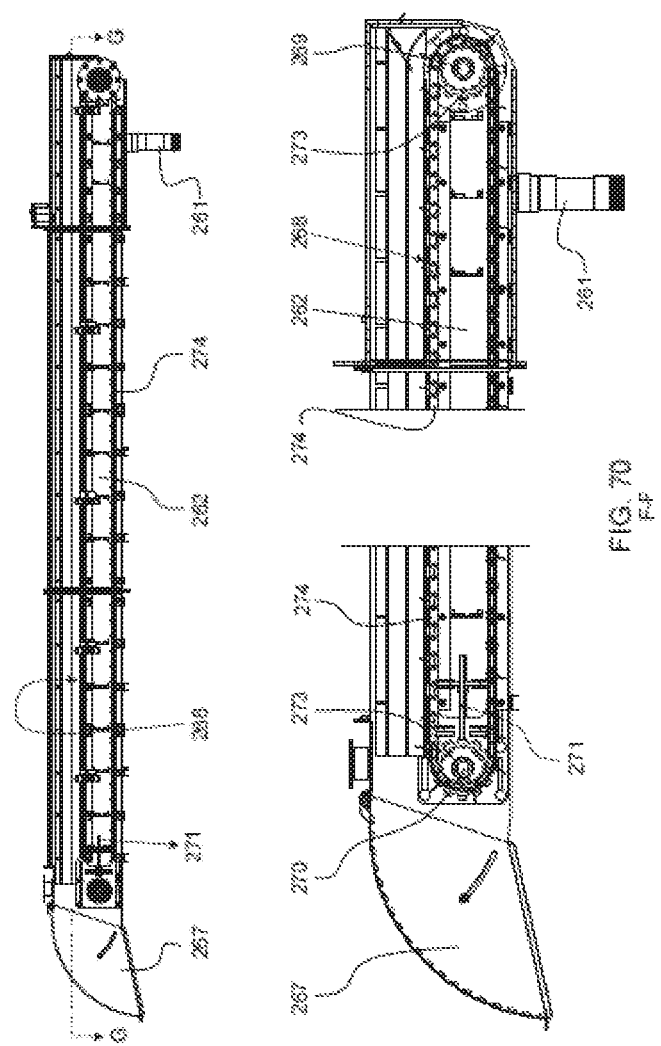
Figure 71:
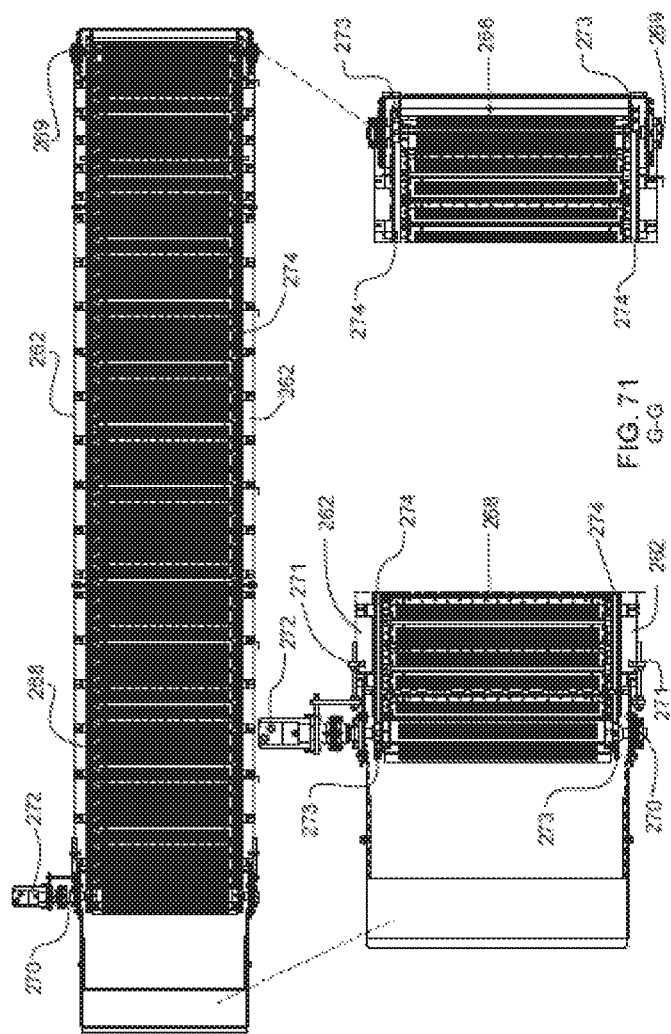

FIGS. 70 and 71 illustrate further details of the retractable side belt (23), wherein a belt-like conveyor (268) is assembled inside and moved over two axes, a moving axis (269) and a motor axis (270), both axes assembled crosswise over bearings existing upon the edges of the side walls (262), the bearing upon the side where the motor axis is located being combined to stretchers (271) and connected to a hydraulic engine (272). Each one of the two axes (269) and (270) is equally provided with a pair of gearings (273) interconnected by chains (274), one chain on each side.

Figure 72:
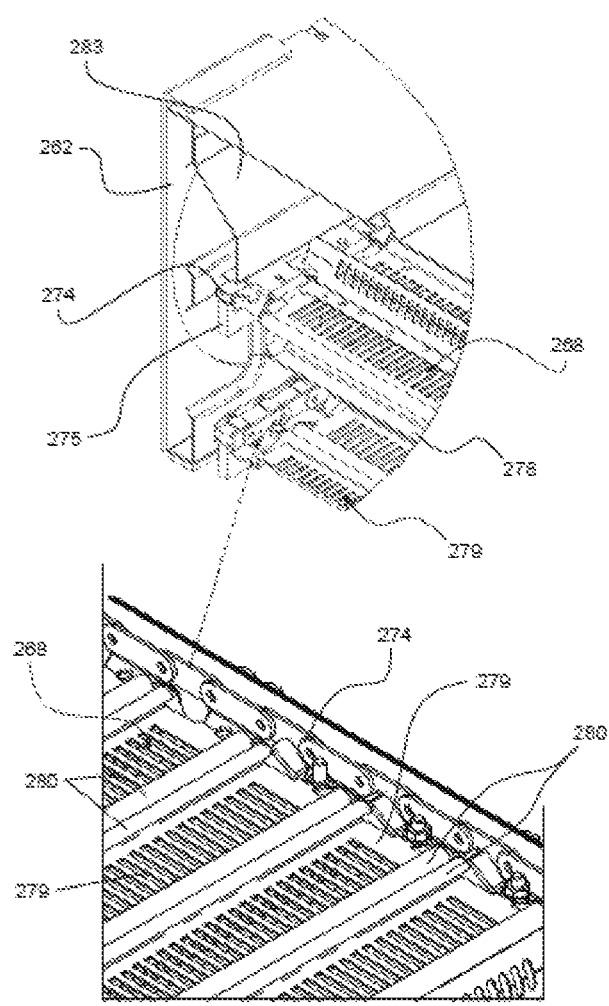
Figure 73:
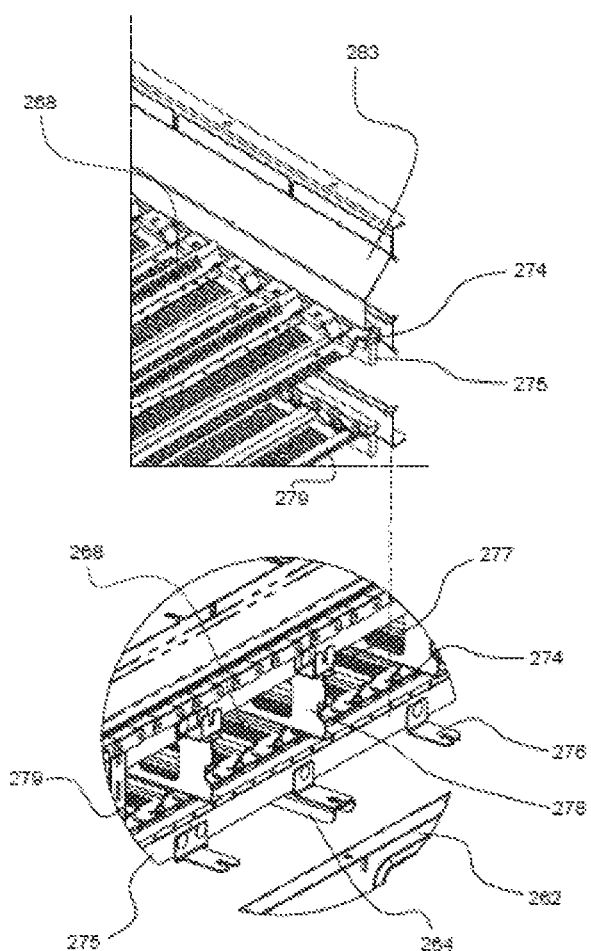
Figure 74:
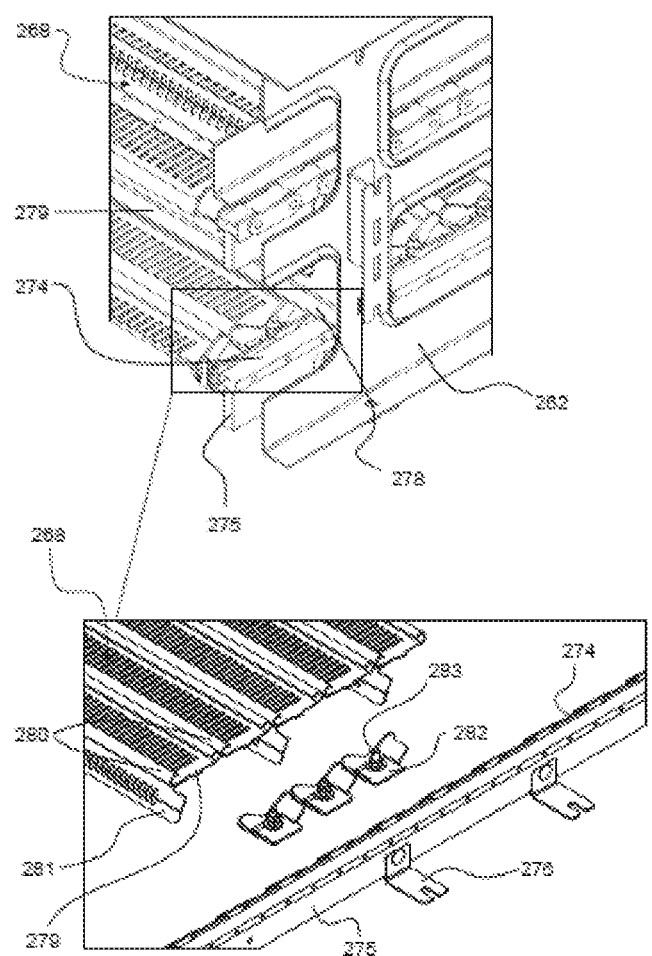

As illustrated in FIGS. 72 to 74, the upper and lower straight paths of both chains (274) slide over rails (275) fixed by "L"—(276) and "U"-shaped (277) supports, respectively, over the edges of the structural beams (264) and against the internal sides of the side walls (262), which are also interconnected by other beams (278) located between the upper and lower straight paths of the two chains (274).

The belt-like conveyor (268) is formed by crosswise plate profiles (279), the larger sides of which are turned inwardly, forming circular edges (280), one of which includes an almost crosswise fin (281), wherein each crosswise plate profile has a width corresponding to the length of a link of the chains (274), so that the circular edges (280) of all plate profiles may always abut to each other and be moved while not creating gaps. The edges of each plate profile are closed by supports (282) with a peculiar geometry, so that, on one side, plate profiles (279) are welded to the fins and, on the other side, fixed to each link of the respective chain (274).

Said crosswise plate bands (279) slide between casings (283), one on each side, located over the lengthwise paths of the two chains (274) closing the gaps along the whole length of the belt, and thus grains are accumulated between the fins (281) and kept up to the end of the conveyor (268).

Figure 75:
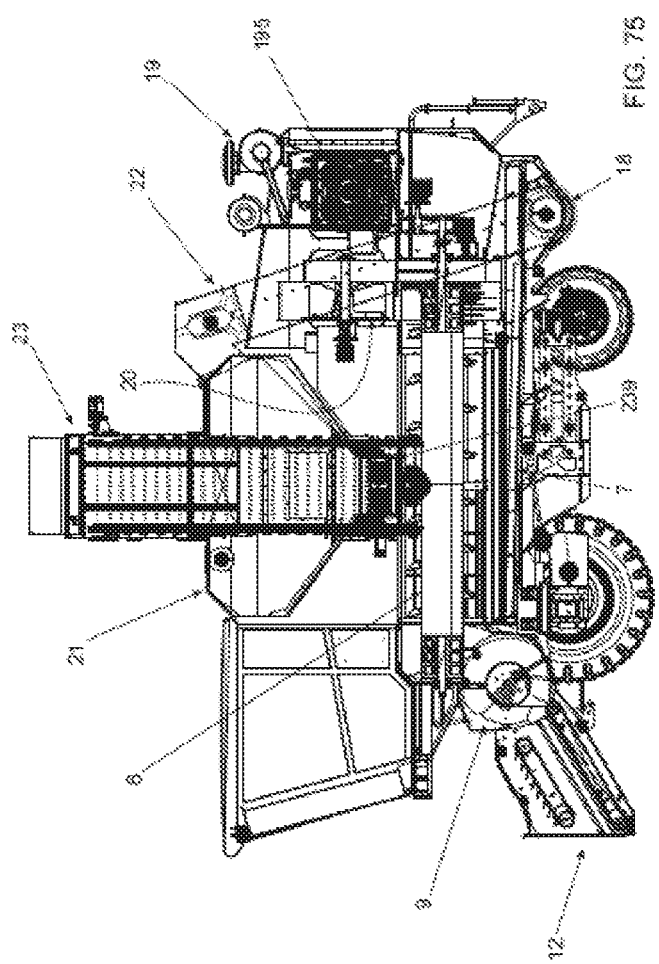
FIG. 75 is a view of the A-A section as used to clarify the operation of the set.

As previously stated, and illustrated in FIG. 75, the present agricultural motor vehicle is designed to receive and exchange a variety of implements upon its front part as formed by the hinged inlet nozzle (12). The implements usually have their parts activated by hydraulic engines, and will consequently be connected to the respective pump (195) of the motor power set (19). On the other hand, said implements are normally used to perform different services for various grain crops. Therefore, the present motor vehicle may be easily transformed into a collecting, mowing, harvesting and/or other machine. After coupling the implement to the hinged inlet nozzle (12) interconnected to the hydraulic system, plants under processing enter the hinged nozzle (12) and follow to the concentrating guiding roller (9). Upon this first movement, a first cleaning stage already occurs, with the separation of earth and sand passing through the walls in the form of sieves for said parts. Subsequently, the concentrating guiding roller (9) throws all the material to the inside of the beating cylinder (8), wherein all the material is shaken and suffers sufficient impact to enable the grains to be fully released from the rest of the plant. Under these conditions, grains and other smaller impurities pass through the sieves of the beating cylinder (8) and fall directly over the vibrating sieve (7). The material retained inside the beating cylinder (8) (leaves, branches and others such material) keeps moving rearwardly and passes through the suction cleaning set (20), wherein it is fragmented and discharged at the rear part of the machine, ending another cleaning stage. Undesired grains and materials smaller than said grains fall over the vibrating sieve (7) and pass through one more cleaning stage. The vibrating sieve (7) includes paths with different sized meshes, thus allowing undesired materials which are smaller than grains to pass through. Undesired materials are released directly over the soil, while grains which are not yet fully clean continue to move rearward and pass through the suction cleaning set (20), where the last cleaning stage is performed. The suction cleaning set aspirates lighter undesired materials such as dust and leaves, throwing them directly to the sides of the machine over the soil. Fully clean grains reach the end of the vibrating sieve (7) and, at that point, a sieve with an appropriately sized mesh allows clean grains to fall inside the collection gutter (18), where they are displaced to the lower edge of the clean grain elevator (22) to be transported upwards and thrown into the grain dumper (21), which is unloaded from its bottom, where the unloading base (224) and its respective conveyor belt (239) displaces the grains to the retractable side belt (23), whose characteristics allow it to transship the load to another place, whether it be fixed (i.e. storage) or movable, such as dumper vehicles, towable carts, railway wagons, boats or others.

Therefore, with the present motor vehicle and exchangeable different implements, the set allows for the harvest, collection and processing of different kinds of grains and cereals, such as: peanut, soy, beans, corn and other similar materials.

Figure 76:
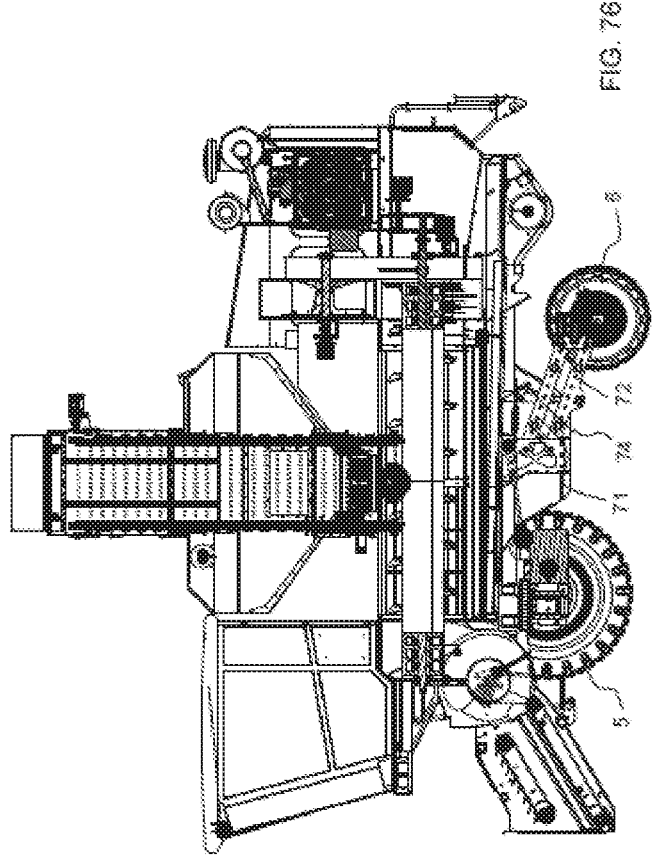
FIGS. 76 to 78 are schematic cutting views showing the height compensating pantographic system for wheels.
Figure 77:
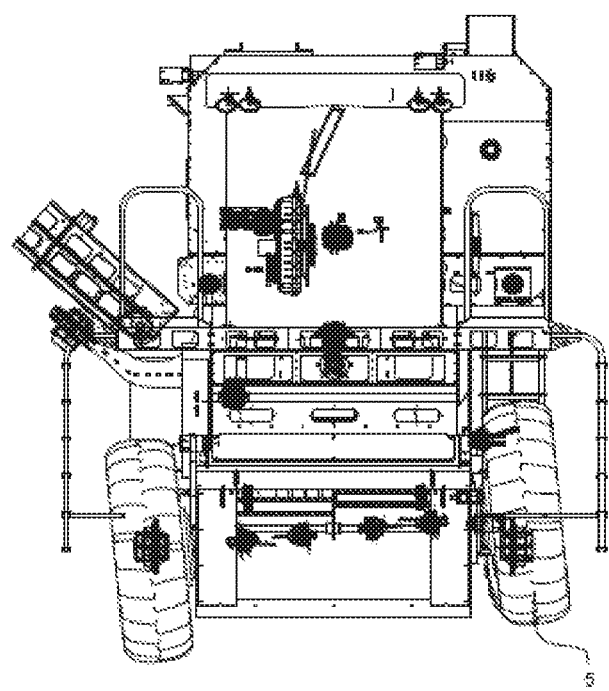
Figure 78:
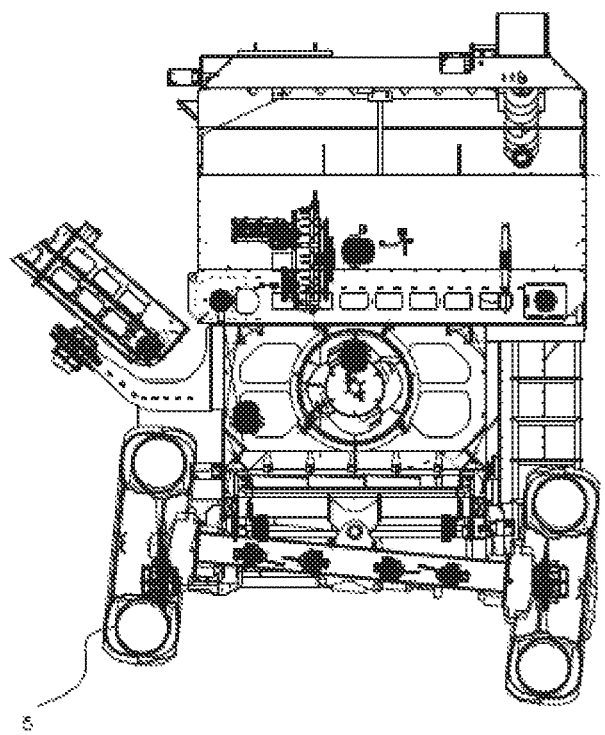

Illustrated in FIGS. 76 to 78, another enhancement introduced in the present motor vehicle is how the main lower chassis (1) of the machine is supported over the front (5) and rear (6) wheels, since both are combined to a pantographic level compensating support system, defined by the pairs of upper and lower swinging arms (71-72) and side damper (74) and front sloped hydraulic activators (55), all of which are controlled by the machine operator. Therefore, the damper and activators activate the pantographic parts so that the chassis of the machine can be moved upwards and downwards in a variety of ways. The front part, the rear part and the left and right sides can be independently raised and lowered. The raising and lowering movement as understood to be the change in height at each one of the four corners of the lower chassis (1), i.e. the following height regulations between the soil and the chassis (1) are possible: (a) only on the front left corner; (b) only on the front right corner; (c) only on the rear left corner; and (d) only on the rear right corner. All of these independent height regulation movements are combined and add the necessary resources to enable the operator to find the best possible leveling adjustment and keep the machine chassis always horizontal, consequently maintaining the vertical center of gravity of the motor device during its operation on highly sloped terrains. This considerably increases the safety rate during the operation of the machine.

The invention claimed is:

1. An agricultural motor vehicle, comprising:
   a structural set having four combined parts, comprising a lower chassis (1), an intermediate structure (2) housed overtop the lower chassis (1), and two lengthwise prolongations at a front end and a rear end of the intermediate structure (2), comprising a front complementary structure (3) and a rear complementary structure (4);
   two 4×2 wheel sets assembled underneath the lower chassis (1), comprising a set of front traction wheels (5) and a set of smaller rear wheels (6);
   a vibrating sieve (7) assembled overtop the lower chassis (1) and underneath the intermediate structure (2), wherein the vibrating sieve extends from a rear side of the front complementary structure (3) to an inside of the rear complementary structure (4);
   a beating cylinder (8) assembled lengthwise above the vibrating sieve (7) and inside the intermediate structure (2), the beating cylinder extending starting at the rear side of the front complementary structure (3) and ending inside a suction cleaning set (20);
   a concentrating guiding roller (9) assembled crosswise inside the front complementary structure (3), comprising a cylindrical case with an open front side and an open rear side, wherein the front side forms a frontal inlet opening (10) aligned to a hinged inlet nozzle (12) and the rear side forms a rear outlet (11), having both the hinged inlet nozzle and rear outlet assembled with the beating cylinder (8), the hinged inlet nozzle being tilted and having a lower front side and a higher rear side, the rear side hingedly aligned to the frontal inlet opening (10);
   a cockpit (13) assembled overtop the front complementary structure (3) and having a side door (14), the cockpit (13) occupying one third of a width of the front complementary structure (3) and having side walkways (15), guardrail frames (16) and stairs (17) on a left side and a right side of the cockpit;
   a clean grain collection gutter (18) assembled crosswise underneath the rear complementary structure (4), occupying an entire terminal crosswise extension portion of the vibrating sieve (7);
   a motor power set (19) assembled over the rear complementary structure (4), wherein the suction cleaning set (20) is assembled in front of the motor power set (19);
   a grain dumper (21) assembled crosswise over the intermediate structure (2) and located in between the cockpit (13) and the suction cleaning set (20);
   a slightly sloped clean grain elevator (22), having a lower edge interconnected to the clean grain collection gutter (18) and an upper edge flowing into and coupled to a corresponding upper part of the grain dumper (21); and
   a retractable side belt (23), having a lower edge, the lower edge connected to an upper edge of the intermediate structure (2) by a central hinge.

2. The agricultural motor vehicle of claim 1, wherein the lower chassis (1) further comprising:
   a set of quadrangular tubes, having two side stringers (24), one located on each side of the lower chassis, the side stringers (24) having side supports (32) located upon a first upper third of the side stringers, one side support on each side, each side support having a pin (33) extending crosswise outwardly, the set further comprising:
      an L-shaped support (34) fixed at a midpoint of each side stringer (24), having one located upon each side, wherein each L-shaped support comprising a fork-shaped branch (35) extending horizontally outwards configuring a support for a step (36), and a vertical branch fixed at a midpoint of an upper edge to the corresponding side stringer (24), the vertical branch having bushes (37) which, jointly with the pins (33), configure a hinging means for the rear wheels (6);
      a sloped support (38) connected to each side stringer (24), with three sloped supports located upon each side of the side stringer and one additional sloped support upon each side towards a front end of the side stringer (24), the additional sloped support integrated with a semicircular prolongation (39) which, combined with the three sloped supports (38), configures fixation points for the vibrating sieve (7);
      a set of beams comprising a rear beam (25) and two front beams (26), the set of beams interconnecting the side stringers at a midpoint, the front beams being parallel, located in close proximity to each other, and each limited at an end by lower parallel ear-shaped supports (27), the front beams also interconnected at a midpoint by a support (28), the support further comprising;
         a pair of side rectangular plates (29) having two triangular plates (30) located in between, the triangular plates parallel to each other and having their vertexes turned downward, the rectangular plates also pierced lengthwise by a bush (31) which, jointly with the lower parallel ear-shaped supports (27), forms a hinged assembly means for the set of front traction wheels (5).

3. The agricultural motor vehicle of claim 2, wherein the set of front traction wheels (5) further comprising:
   a quadrangular tube axis (40), limited at each end by a square flange (41), upon which a first transmission box (42) is fixed, each transmission box receiving a rim (43) and a respective pneumatic (44) upon a side and upon another side, the transmission box is activated by a crosswise cardan axis (45), which is interconnected at a midpoint to a second transmission box (46) having a corresponding hydraulic activating engine (47) connected upon one side, and also being fixed between two side plates (48) of a support (49), the support fixed to a center of the quadrangular tube axis (40) and comprising triangular plates interconnected on an upper side by a support bush (50), the support bush aligned with the bushes (31) of the lower chassis (1) and pierced by a hinging pin (51) that is connected to a screw (52) and a washer (53), and wherein the lower part of the support (49) also having a hinging point (54) upon each side for coupling a corresponding lower edge of a sloped hydraulic activator (55), an opposed edge of the sloped hydraulic activator being equally hinged to the lower parallel ear-shaped supports (27) of the lower chassis (1).

4. The agricultural motor vehicle of claim 2, wherein the set of rear wheels (6) further comprising:

two crosswise axes, a rocker axis (56) and a floating axis (57), both axes comprising rectangular tubes interconnected at a midpoint by a support (58), the rocker axis (56) hinged by a pin (59) and having edges coupled to a set of L-shaped vertical axes (60) interconnected on their lower sides to edges of horizontally outwardly turned axes (61) and each L-shaped axis also coupled to a roller case (62) of a rim (63) and a corresponding pneumatic (64), the L-shaped vertical axes (60) also interconnected to guiding means by radial arms (65), each radial arm further comprising:

two hinging points for a respective terminal edge of a stabilizing bar (66) and a hydraulic activator (67), the hydraulic activator having each terminal end equally hinged to a complement (68) of the support (58) at an opposed edge, wherein the floating axis (57) having two edges, each edge fixed to a support (69), and each support hingedly receiving (70) an edge of a set of an upper (71) and a lower (72) swinging arms, wherein each set is formed by ruler-shaped parallel plates having opposed edges equally hinged to the bushes (37) of the L-shaped supports (34) of the lower chassis, the sets of upper and lower swinging arms (71, 72) also having each set interconnected on an inner side to the corresponding upper and lower swinging arms on an opposite side by a multiplicity of tube beams (73), forming a pantographic suspension, which also includes a side damper (74) hinged to the pins (33) at an upper edge and also hinged equally at a lower edge to an outside intermediate path of the set of swinging arms (72), and wherein all moving parts of the side dampers (74) are covered by side caps (75) located above the steps (36).

5. The agricultural motor vehicle of claim 4, wherein the set of front traction wheels (5) further comprising:

a quadrangular tube axis (40), having a support (49) fixed at a center, and wherein a lower part of the support (49) also having a hinging point (54) upon each side for coupling to a corresponding lower edge of a sloped hydraulic activator (55), an opposed edge of the sloped hydraulic activator being equally hinged to a lower parallel ear-shaped support (27) of the lower chassis (1), the side dampers (74) and the sloped hydraulic activators (55) being independently activated and combining to form a level-compensating pantographic support system, permitted by the sets of upper and lower swinging arms (71, 72) to move the lower chassis (1) independently at each corner through variations in height, and allowing maintenance of a center of gravity of the agricultural motor vehicle.

6. The agricultural motor vehicle of claim 2, wherein the vibrating sieve (7) is shallow rectangular gutter shaped and further comprising:

a front wall (78), a pair of side walls (79), and a bottom part, the front (78) and side walls (79) interconnected by a rear beam (80), and the bottom part comprising a pair of perforated plates forming a set of sieves, a longer sieve (76) and a shorter outlet sieve (77) that has a larger mesh, each sieve having a multiplicity of lengthwise and parallel guiding rulers (81, 82) assembled above them and fitted to the size of the corresponding sieve, the guiding rulers above the longer sieve (81) having an upper indented edge (83) functioning as jaws to move material rearwardly, and the guiding rulers above the outlet sieve (82) having side scales (84) to guide material flow, wherein the set of sieves further comprising;

a complementary structure forming a frame (85) on a lower side of the set of sieves, the frame having a multiplicity of beams (86), each beam having a fixing point (87) for a downwardly sloped blade spring (88), and the blade spring having a lower edge coupled to one of the supports (38) of the lower chassis (1), allowing the vibrating sieve to vibrate by a frontward and rearward movement via the blade springs (88), the movement caused by a vibrating set (89) assembled at a lower side of the vibrating sieve (7), the vibrating set further comprising:

a pair of side supports (90), with one on each side;
an upper edge fixed against the outside of each side wall (79);
a lower edge having a support bearing (91) for a swinging axis (92);

wherein the swinging axis having a frontwardly sloping parallel arm (93) on each side, each parallel arm having a distal end equally provided with an eccentric bearing (94) pierced by an axis (95), the axis having an edge coupled to a hydraulic engine (96) and supported on a bearing (97) assembled on each side on the corresponding semicircular prolongations (39) of the lower chassis (1).

7. The agricultural motor vehicle of claim 1, wherein the intermediate structure (2) is a parallelepipedal box shape and further comprising:

a front vertical wall (98), a rear vertical wall (99), two side walls (100), an intermediate wall (105), and an upper closing (101) formed by a single plate, and wherein a lower side of the intermediate structure is fully open, a lower edge of each of the side walls forming a stringer (102) fitted and fixed over the lower chassis (1), so that the intermediate structure may be adjusted between the front complementary structure (3) and the rear complementary structure (4), and wherein the front (98), rear (99) and intermediate walls each further comprising;

an opening at each corner (103), and a central opening (104), so that the three walls form an empty hub that, combined with an upper curved plate part (106), forms a lengthwise circular housing for assembly of the beating cylinder (8);

wherein the side walls (100) having a row of a multiplicity of lower openings (107) upon the stringers (102) and also having a multiplicity of larger upper openings (108) with caps (109).

8. The agricultural motor vehicle of claim 7, wherein the front complementary structure (3) further comprising:

a box having a front wall (110) located upon two vertical planes and separated by an intermediate 90° horizontal step (111), two vertical side walls (112), a curved lower wall (113) and a vertical rear wall (114), the rear wall (114) having side fixing flaps (115) and combining to form a housing for the rear outlet (11), the housing having a circular opening (116) above the rear outlet and axially aligned to the circular central openings (104) of the intermediate structure (2) for assembly of the beating cylinder (8), and wherein the lower wall (113) is rounded and combines with roundings (117, 118) upon both of the side walls (112) and the lower wall (110) to form the frontal inlet opening (10), such that upon an internal path a circular housing is formed for assembly of the concentrating guiding roller (9), and wherein the front wall (110) having a multiplicity of rectangular openings (119) and also having, above the intermediate 90° horizontal step (111), a U-shaped support (120) that is horizontally combined with an upper part of the front wall as a rectangular frame (121), forming a support cradle for the cockpit (13), the support cradle receiving a structural complement (122) advancing to an inner side of the horizontal step (111) and upon the same plane as the U-shaped support (120), the structural complement also expanding laterally and forming a support platform (123) for the cockpit (13), the side walkways (15) and the stairs (17).

9. The agricultural motor vehicle of claim 7, wherein the rear complementary structure (4) further comprising:
a box comprising welded plates, the box forming a rear continuity of the intermediate structure (2) and having vertical walls including a front wall (124), two side walls (125) and a rear wall (126), between which an assembly compartment is formed for the motor power set (19) and for the suction cleaning set (20), the rear wall (126) having an outlet opening for inspection (127), and the front wall (124) having a circular opening (128) in axial alignment with the circular central openings (104) of the intermediate structure (2), forming an assembly tunnel for the beating cylinder (8), and the side walls (125) further comprising:
a crosswise complement at an upper edge, turned outwardly and having a rectangular shape, configuring a platform (129) over which is located a vertical surrounding casing (130) encapsulating the motor power set (19) and having set of rear foldable stairs (131) for access;
wherein the side walls (125) are prolonged downwardly and each integrated at a lower edge to the clean grain collection gutter (18), and forwardly of the collection gutter, the lower edges of the side walls each having an upwardly facing recess, forming a drawer-shaped fitting (132) to receive a terminal part of the vibrating screen (7), the terminal part formed by the larger mesh sieve (77) and ending over the clean grain collection gutter (18).

10. The agricultural motor vehicle of claim 1, wherein the hinged inlet nozzle (12) further comprising:
a box with a vertical front region, having a frame (133) and comprising a large inlet opening (134), the frame (133) integrated to two side walls (135) and an upper wall (136), the upper wall having an inspection cap (137), and a bottom of the frame having a belt (138), above which is assembled a pushing set (139), with each side wall further comprising:
a triangular portion (140) formed as the side wall tapers while extending rearwardly of the motor vehicle, the triangular portion having circular edges (141) axially and crosswise aligned, constituting hinged fitting points for the concentrating guiding roller (9) and simultaneously forming an outlet (142) having a rounded lower end (143), and adjusted on a side to the inlet opening (10) of the front complementary structure (3) and, on an opposite side, adjusted to an edge of the belt (138);
wherein the belt extends and is supported over two crosswise axes, an upper axis (144) and a lower axis (145), each axis having an edge borne upon the side walls (135) through a bearing (146), and
wherein the upper axis (144) having upon a left side edge a left gearing (147) and a corresponding left chain (149), and upon a right side edge a right gearing (148) and a corresponding right chain (150), and wherein the right chain (150) is coupled on a side to a second gearing (151), whose axis is borne over a support (152) and the corresponding side wall (135), where it is coupled to a hydraulic engine (153) that activates the belt (138), the chains (149, 150) configuring transmissions and having side protectors (161) and (162) protecting both sides of the transmissions,
wherein the hydraulic engine (153) simultaneously activates the left chain (149), which passes through an inverter stretcher (154) and is coupled to a third gearing (155) which activates a dragging set (139), the dragging set further comprising:
an upper axis (156) and a lower axis (157), with both axes borne on the side walls (135), wherein the upper axis is connected to the third gearing (155), and between the side walls (135), the upper axis (156) and the lower axis (157) are equally provided with a multiplicity of gearings (158), the gearings on the upper axis being interconnected by chains (159) to corresponding gearings on the lower axis, and the chains interconnected by multiple crosswise dragging combs (160) that move in the same direction as the belt (138);
wherein the side walls (135) are structurally complemented by tubular beams (163), having two upper beams and a lower beam, the lower beam having raising supports (164).

11. The agricultural motor vehicle of claim 8, wherein the concentrating guiding roller (9) further comprising:
a tubular hub (165), closed at each end by a blind flange (166) that is pierced by a terminal end of a crankshaft (167), the crankshaft having multiple connecting rods (168) distributed along a central portion, the connecting rods each having an identical round shaft (169), radially guided to pierce and be alternately moved through a corresponding strainer (170), the strainers distributed along the diameter of the tubular hub (165), the distribution forming a helical wing of external jaws alternately entering and exiting the tubular hub (165), wherein the helical wing is positioned between paths of two helical screws (171);
wherein both of the terminal ends of the crankshaft (167) are borne upon the side walls (112) of the front complementary structure (3), and wherein one of the terminal ends having a first gearing (172) coupled to a transmission chain (173), the transmission chain passing through stretchers (174) and coupled to a second gearing (175) which is coupled on a side to an edge of an axis (176) of a hydraulic engine (177), the hydraulic engine also borne upon one of the side walls (112) of the front complementary structure (3) and activating the concentrating guiding roller.

12. The agricultural motor vehicle of claim 7, wherein the beating cylinder (8) having a housing comprising a set of circular sieves (178) with a multiplicity of mesh sizes, the circular sieves forming a tunnel and positioned inside the circular central openings (104) of the lengthwise circular housing of the intermediate structure (2), and wherein the beating cylinder is located inside the circular sieves, extending from the rear outlet of the concentrating guiding roller (9) substantially until a rear end of the vibrating sieve (7), ending inside the suction cleaning set (20), the beating cylinder further comprising;
- a tubular housing (179) externally provided with an endless screw (180), the endless screw having along an external edge angled edges (181) radially turned outwardly, the tubular housing further comprising:
  - a pair of blind flanges with a single flange closing each end of the tubular housing, the pair comprising an external flange (182a) closing a rear end of the housing and a smaller internal flange (182b) closing a front end, the external flange having a corresponding external axis edge (183a) and the internal flange having a corresponding internal axis edge (183b), wherein the external axis edge is borne inside the suction cleaning set (20) and the internal axis edge is borne on a corresponding wall of the front complementary structure (3) adjacent to the rear outlet (11);
- wherein a multiplicity of short radial fins (184) are distributed along a rear edge of the beating cylinder (8), the radial fins having a height coinciding with a diameter of the external flange (182a), and positioned inside the suction cleaning set (20).

13. The agricultural motor vehicle of claim 9, wherein the clean grain collection gutter (18) further comprising the tapered side walls (125) of the rear complementary structure (4), each tapered side wall forming a triangular part (185) at an end, the triangular parts closed by caps thereby forming an open V-shaped gutter (186) extending a width and a length of an ending sieve (77) of the vibrating sieve set (7), the V-shaped gutter having on an inside an endless helical screw transporter (187) with a tubular hub (188), the screw transporter having an axis finishing on a terminal end in a shorter axis edge (189) and on an opposing terminal end having a longer axis edge (190), wherein both axis edges are borne upon the triangular parts (185) of the tapered side walls (125), and wherein the longer axis edge (190) pierces a lower edge of the clean grain elevator (22), becoming an integral part of the elevator.

14. The agricultural motor vehicle of claim 9, wherein the motor power set (19) is assembled crosswise over the platform (129) of the rear complementary structure (4), the motor power set further comprising:
- a plate base (191) assembled crosswise over the rear complementary structure (4), the base forming a support for an internal combustion engine (192) having a corresponding cooling unit (193) and having a camshaft with a corresponding steering wheel directly coupled to a transmission box (194), activating a multiplicity of hydraulic pumps (195), the multiplicity of hydraulic pumps interconnected to a hydraulic oil tank (196), having on a side a fuel tank (197), wherein the hydraulic oil tank and the fuel tank are both located over the intermediate structure (2).

15. The agricultural motor vehicle of claim 12, wherein the suction cleaning set (20) further comprising:
- a box comprising two adjacent chambers, a rear chamber (198) and a front chamber (199), the box assembled crosswise and occupying an entire width of the vibrating sieve (7), the rear chamber (198) having an open base configuring an aspiration nozzle (200) positioned at an end of a set of sieves (76) of the vibrating sieve (7), upon which point the suction cleaning set establishes an upward flow of air performed by an suction turbine (201) assembled at a top of the front chamber (199), the front chamber having a lengthwise axis (202) borne lengthwise upon corresponding walls of the front and rear chambers (198, 199), wherein an edge of the lengthwise axis is coupled to a hydraulic engine (203), and the suction turbine also establishes an upward flow of air in the rear chamber (198) and a downward flow of air in the front chamber (199), the front chamber further comprising:
  - a closed lower part;
  - a pair of side outlets (204), one located upon on each side of the front chamber, the side outlets curved and guided rearwardly;
- wherein within the front chamber (199) and located between the suction turbine (201) and the side outlets (204) is the rear edge with radial fins (184) of the beating cylinder (8), the external axis edge (183a) of which pierces a corresponding wall of the rear chamber (198) and, inside the rear chamber, the external axis edge (183a) receives a shredding helix (205), whose rotation shreds suctioned residues to prevent clogging of the suction turbine (201), and wherein that external axis edge (183a), after piercing the rear chamber (198), receives an elastic coupling (206) for connection to a transmission box (207) with a corresponding hydraulic engine (208) for activating the beating cylinder (8), and
- wherein one of the side outlets (204) is equally provided with shredding helices (209) assembled along an axis (210) piercing the side outlet (204) and coupled to a hydraulic engine (211).

16. The agricultural motor vehicle of claim 13, wherein the clean grain elevator (22) is assembled on a left side of the motor vehicle, the clean grain elevator further comprising:
- a tube (212) having a rectangular cross-section and a lower edge interconnected to the clean grain collection gutter (18), the tube sloping frontward from the lower edge and piercing the platform (129) of the rear complementary structure (4), and having an upper edge interconnected to the grain dumper (21), the tube further comprising;
  - a multiplicity of caps (213) allowing inspection and maintenance;
  - an elbow-shaped prolongation (214) located at the upper edge and guided behind and downwards for connection to an upper part of the grain dumper (21);
  - a sieve (215) closing the lower edge of the tube (212) and at that point a corresponding side having a circular collar (216) for transition and interconnection to the clean grain collection gutter (18), wherein the circular collar centrally passes and is borne over the longer axis edge (190), which receives a lower gearing (217) which also connects with the lower edge of the tube (212), with another axis (218) located at the upper edge of the tube, having an upper gearing (219) and activated by a hydraulic engine (220) assembled on a side of the tube (212) jointly with stretcher side supports (221);
- wherein the upper and lower gearings (219, 217) are interconnected by a chain (222), along which shelves (223) are fixed, passing bent over by the housing formed on the sieve (215) and subsequently passing upwardly towards a top end of the clean grain elevator.

17. The agricultural motor vehicle of claim 1, wherein the grain dumper (21) further comprising:
- a rectangular unloading base (224) assembled crosswise over the intermediate structure (2) and aligned with the retractable side belt (23), the unloading base comprising:
  - a pair of vertical side walls (225), having a plurality of openings (226) and edges with interconnecting plates on a left side (227) and a right side (228) of the motor vehicle, including a lower partial closing (229) on the left side having multiple openings (230), an upper edges of each side wall (225) folded at an angle outwardly and upwards, forming support flaps (231) for the grain dumper (21), and a lower edge of each side wall folded outwardly forming crosswise flaps (232) for settling of the grain dumper over a closing plate (101) of the intermediate structure (2);
  - a pair of rollers (223) upon the edges of the unloading base (224), the rollers each having a respective axis (234), the axis located on a left side of the motor vehicle being supported over bearings (235) having corresponding stretcher supports (236), and the axis located on a right side of the motor vehicle being supported over bearings (237) and also having an edge coupled to a hydraulic engine (238), with a conveyor belt (239) provided upon the pair of rollers to move clean grains to the retractable side belt (23);
- a body of the grain dumper (21) formed by a box having a tapered base and edges defined by a substantially triangular vertical left hand wall and a right hand wall (240), the walls having inspection ports (241), and combining with a pair of sloped side walls (242), defining a sloped profile limited on a bottom side by a wide rectangular opening (243) which is sized to fit over the unloading base (224), wherein the sloped side walls (242) are settled over the support flaps (231) and, at that point, having internal casings (244) completing fitting over the conveyor belt (239), closing any gaps between the belt and the body of the grain dumper to avoid leakage, the sloped side walls further comprising:
  - a short vertical plate (245) on an upper side, the vertical plate located towards the front end of the motor vehicle having a transparent window (246) coinciding with a transparent back window of the cockpit (13); and
- an upper part of the grain dumper (21) having a closing dome forming a central recess (247), and a surrounding ridge (248) having a U-shaped geometry with an opening (249) on a corresponding side having fittings coinciding with and for fixing to an elbow-shaped prolongation (214) of the clean grain elevator (22), while, on an upper side, the surrounding ridge (248) has an inspection door (250) and, on an internal side, the surrounding ridge houses a load leveler formed by two endless screws (251), interconnected at 90° by a 90° transmission box (252) having corresponding couplings (253), while distal edges of the load leveler are borne upon supports (254), and wherein one of the endless screws (251) is coupled to a hydraulic engine (255).

18. The agricultural motor vehicle of claim 1, wherein the retractable side belt (23) further comprising:
- a long rectangular-shaped tube, the tube further comprising:
  - a lower edge hinged to a support (256) fixed at a midpoint and upon an upper edge of the intermediate structure (2), the support (256) comprising an L-shaped plate whose vertical branch constitutes a plate and a counter plate (257) which is fixed against a side of the intermediate structure (2), while another branch has a forked shape (258) projecting crosswise outwardly and upwardly, and having a linking plate (259), upon which a bearing (260) is assembled that receives a pin (261) hinged and fixed crosswise on a lower side of a corresponding edge of the retractable side belt (23);
  - a pair of rugged side walls (262) having on a lower side an initial path with a plate closing (263), having the pin (261) fixed crosswise, while the remaining part of the lower side is open and includes multiple structural beams (264) interconnecting the rugged side walls (262), which are also interconnected at an upper end by an upper closure (265), including a wide inlet opening (266) near the lower edge of the rectangular-shaped tube, the inlet opening located substantially under the end of a conveyor belt (239) of the grain dumper (21), in order to receive clean grains;
- wherein an upper edge of the retractable side belt (23) ends with an outlet nozzle (267), turned downwards and having an adjustable angle, and
- wherein inside the retractable side belt (23), a belt-like conveyor (268) is assembled and moves over two axes, a moving axis (269) and a motor axis (270), wherein both axes are assembled crosswise on bearings located on the edges of the side walls (262), the bearing upon a side where the motor axis is located also being combined to stretchers (271) and connected to a hydraulic engine (272), each axis further comprising:
  - a pair of gearings (273), interconnected by chains (274), having one chain upon each side, wherein an upper and lower straight path of both chains (274) slide over rails (275), fixed by L-shaped supports (276) and U-shaped (277) supports, respectively, over an edge of the structural beams (264) and against an internal side of the corresponding side walls (262), which are also interconnected by beams (278) located between the upper and lower straight paths of the two chains (274); and
- wherein the belt-like conveyor (268) comprises crosswise plate profiles (279), having a larger side turned inwardly forming multiple circular edges (280), one circular edge including a substantially crosswise fin (281), wherein each crosswise plate profile having a width corresponding to the length of a link of the chains (274), and wherein an edge of each plate profile is closed by a support (282) having a geometry such that, on a side, the plate profiles (279) are welded to the fins and, on an opposing side, fixed to each link of the respective chain (274), with the crosswise plate profiles (279) sliding between a pair of casings (283), having one casing on each side, located over the lengthwise paths of the two chains (274) and closing the gaps along an entire length of the belt-like conveyer.

* * * * *